(12) United States Patent
Hofstetter

(10) Patent No.: US 12,131,664 B2
(45) Date of Patent: Oct. 29, 2024

(54) SIMULATED TISSUE STRUCTURES AND METHODS

(71) Applicant: Applied Medical Resources Corporation, Rancho Santa Margarita, CA (US)

(72) Inventor: Gregory K. Hofstetter, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 437 days.

(21) Appl. No.: 17/410,795

(22) Filed: Aug. 24, 2021

(65) Prior Publication Data

US 2021/0383723 A1 Dec. 9, 2021

Related U.S. Application Data

(63) Continuation of application No. 16/505,918, filed on Jul. 9, 2019, now Pat. No. 11,100,815, which is a
(Continued)

(51) Int. Cl.
*G09B 23/30* (2006.01)
*B29C 41/20* (2006.01)
(Continued)

(52) U.S. Cl.
CPC ............ *G09B 23/281* (2013.01); *B29C 41/20* (2013.01); *G09B 23/28* (2013.01); *G09B 23/30* (2013.01);
(Continued)

(58) Field of Classification Search
CPC ................................ G09B 23/28; G09B 23/30
See application file for complete search history.

(56) References Cited

U.S. PATENT DOCUMENTS 184,573 A 11/1876 Becker
2,127,774 A 8/1938 Jacobs
(Continued)

FOREIGN PATENT DOCUMENTS

CA 2 293 585 A1 12/1998
CN 2421706 Y 2/2001
(Continued)

OTHER PUBLICATIONS

Society of Laparoendoscopic Surgeons, "Future Technology Session: The Edge of Innovation in Surgery, Space, and Business," http://www.laparoscopytoday.com/endourology/page/2/, Figure 1B: http://laparoscopy.blogs.com/laparoscopy_today/images/6-1/6-1VlaovicPicB.jpg , Sep. 5-8, 2007, 10 pgs.
(Continued)

*Primary Examiner* — Kurt Fernstrom
(74) *Attorney, Agent, or Firm* — Shirin Bozorgui; Patrick Ikehara

(57) ABSTRACT

Simulated tissue structures and methods of manufacturing are provided. The simulated tissue structures are particularly useful for placement inside abdominal simulators for practicing laparoscopic surgical techniques. One simulated tissue structure includes a combination of two materials that are attached together wherein one of the materials forms a hollow anatomical structure configured to contain the other material. The two materials are attached in an anatomically advantageous manner such that the inner surface of the outer material closely conforms to the outer surface of the inner material. Another simulated tissue structure includes a plurality of layers wherein at least one layer is applied by printing the layer with at least one stencil to impart one or more functional characteristic to the simulated tissue structure.

20 Claims, 45 Drawing Sheets

Related U.S. Application Data continuation of application No. 15/185,360, filed on Jun. 17, 2016, now Pat. No. 10,354,556, which is a continuation of application No. PCT/US2016/018697, filed on Feb. 19, 2016.

(60) Provisional application No. 62/118,179, filed on Feb. 19, 2015, provisional application No. 62/119,542, filed on Feb. 23, 2015.

(51) Int. Cl.
  *G09B 23/28* (2006.01)
  *G09B 23/34* (2006.01)
  *B29L 31/00* (2006.01)

(52) U.S. Cl.
  CPC ........ *G09B 23/34* (2013.01); *B29L 2031/753* (2013.01); *B29L 2031/7532* (2013.01)

(56) References Cited

U.S. PATENT DOCUMENTS

| | | |
|---|---|---|
| 2,284,888 A | 6/1942 | Arneil, Jr. |
| 2,324,702 A | 7/1943 | Hoffman et al. |
| 2,345,489 A | 3/1944 | Lord |
| 2,495,568 A | 1/1950 | Coel |
| 3,766,666 A | 10/1973 | Stroop |
| 3,775,865 A | 12/1973 | Rowan |
| 3,789,518 A | 2/1974 | Chase |
| 3,921,311 A | 11/1975 | Beasley et al. |
| 3,991,490 A | 11/1976 | Markman |
| 4,001,951 A | 1/1977 | Fasse |
| 4,001,952 A | 1/1977 | Kleppinger |
| 4,321,047 A | 3/1982 | Landis |
| 4,323,350 A | 4/1982 | Bowden, Jr. |
| 4,332,569 A | 6/1982 | Burbank |
| 4,371,345 A | 2/1983 | Palmer et al. |
| 4,386,917 A | 6/1983 | Forrest |
| 4,459,113 A | 7/1984 | Boscaro Gatti et al. |
| 4,481,001 A * | 11/1984 | Graham ............... G09B 23/285 434/267 |
| 4,596,528 A | 6/1986 | Lewis et al. |
| 4,726,772 A | 2/1988 | Amplatz |
| 4,737,109 A | 4/1988 | Abramson |
| 4,789,340 A | 12/1988 | Zikria |
| 4,832,978 A | 5/1989 | Lesser |
| 4,867,686 A | 9/1989 | Goldstein |
| 4,907,973 A | 3/1990 | Hon |
| 4,938,696 A | 7/1990 | Foster et al. |
| 4,940,412 A | 7/1990 | Blumenthal |
| 5,061,187 A | 10/1991 | Jerath |
| 5,083,962 A | 1/1992 | Pracas |
| 5,104,328 A | 4/1992 | Lounsbury |
| 5,149,270 A | 9/1992 | McKeown |
| 5,180,308 A | 1/1993 | Garito et al. |
| 5,230,630 A | 7/1993 | Burgett |
| 5,273,435 A | 12/1993 | Jacobson |
| 5,295,694 A | 3/1994 | Levin |
| 5,310,348 A | 5/1994 | Miller |
| 5,318,448 A | 6/1994 | Garito et al. |
| 5,320,537 A | 6/1994 | Watson |
| 5,358,408 A | 10/1994 | Medina |
| 5,368,487 A | 11/1994 | Medina |
| 5,380,207 A | 1/1995 | Siepser |
| 5,403,191 A | 4/1995 | Tuason |
| 5,425,644 A | 6/1995 | Szinicz |
| 5,425,731 A | 6/1995 | Daniel et al. |
| 5,472,345 A | 12/1995 | Eggert |
| 5,518,406 A | 5/1996 | Waters |
| 5,518,407 A | 5/1996 | Greenfield et al. |
| 5,520,633 A | 5/1996 | Costin |
| 5,541,304 A | 7/1996 | Thompson |
| 5,620,326 A | 4/1997 | Younker |
| 5,720,742 A | 2/1998 | Zacharias |
| 5,722,836 A | 3/1998 | Younker |
| 5,727,948 A | 3/1998 | Jordan |
| 5,743,730 A | 4/1998 | Clester et al. |
| 5,762,458 A | 6/1998 | Wang et al. |
| 5,769,640 A | 6/1998 | Jacobus et al. |
| 5,775,916 A * | 7/1998 | Cooper ............... G09B 23/28 434/272 |
| 5,785,531 A | 7/1998 | Leung |
| 5,800,178 A | 9/1998 | Gillio |
| 5,803,746 A | 9/1998 | Barrie et al. |
| 5,807,378 A | 9/1998 | Jensen et al. |
| 5,810,880 A | 9/1998 | Jensen et al. |
| 5,814,038 A | 9/1998 | Jensen et al. |
| 5,850,033 A | 12/1998 | Mirzeabasov et al. |
| 5,855,583 A | 1/1999 | Wang et al. |
| 5,873,732 A | 2/1999 | Hasson |
| 5,873,863 A | 2/1999 | Komlosi |
| 5,908,302 A | 6/1999 | Goldfarb |
| 5,947,743 A | 9/1999 | Hasson |
| 5,951,301 A | 9/1999 | Younker |
| 6,080,181 A | 6/2000 | Jensen et al. |
| 6,083,008 A | 7/2000 | Yamada et al. |
| 6,113,395 A | 9/2000 | Hon |
| 6,234,804 B1 | 5/2001 | Yong |
| 6,271,278 B1 | 8/2001 | Park et al. |
| 6,336,812 B1 | 1/2002 | Cooper et al. |
| 6,398,557 B1 | 6/2002 | Hoballah |
| 6,413,264 B1 | 7/2002 | Jensen et al. |
| 6,474,993 B1 | 11/2002 | Grund et al. |
| 6,485,308 B1 | 11/2002 | Goldstein |
| 6,488,507 B1 | 12/2002 | Stoloff et al. |
| 6,497,902 B1 | 12/2002 | Ma |
| 6,511,325 B1 | 1/2003 | Lalka et al. |
| 6,517,354 B1 | 2/2003 | Levy |
| 6,568,941 B1 | 5/2003 | Goldstein |
| 6,589,057 B1 | 7/2003 | Keenan et al. |
| 6,620,174 B2 | 9/2003 | Jensen et al. |
| 6,654,000 B2 | 11/2003 | Rosenberg |
| 6,659,776 B1 | 12/2003 | Aumann et al. |
| 6,773,263 B2 | 8/2004 | Nicholls et al. |
| 6,780,016 B1 | 8/2004 | Toly |
| 6,817,973 B2 | 11/2004 | Merril et al. |
| 6,820,025 B2 | 11/2004 | Bachmann et al. |
| 6,854,976 B1 | 2/2005 | Suhr |
| 6,857,878 B1 | 2/2005 | Chosack et al. |
| 6,863,536 B1 | 3/2005 | Fisher et al. |
| 6,866,514 B2 | 3/2005 | Von Roeschlaub et al. |
| 6,887,082 B2 | 5/2005 | Shun |
| 6,929,481 B1 | 8/2005 | Alexander et al. |
| 6,939,138 B2 | 9/2005 | Chosack et al. |
| 6,950,025 B1 | 9/2005 | Nguyen |
| 6,960,617 B2 | 11/2005 | Omidian et al. |
| 6,997,719 B2 | 2/2006 | Wellman et al. |
| 7,008,232 B2 | 3/2006 | Brassel |
| 7,018,327 B1 | 3/2006 | Conti |
| 7,025,064 B2 | 4/2006 | Wang et al. |
| 7,056,123 B2 | 6/2006 | Gregorio et al. |
| 7,080,984 B1 | 7/2006 | Cohen |
| 7,118,582 B1 | 10/2006 | Wang et al. |
| 7,255,565 B2 | 8/2007 | Keegan |
| 7,269,532 B2 | 9/2007 | David et al. |
| 7,272,766 B2 | 9/2007 | Sakezles |
| 7,300,450 B2 | 11/2007 | Vleugels et al. |
| 7,364,582 B2 | 4/2008 | Lee |
| 7,404,716 B2 | 7/2008 | Gregorio et al. |
| 7,419,376 B2 | 9/2008 | Sarvazyan et al. |
| 7,427,199 B2 | 9/2008 | Sakezles |
| 7,431,189 B2 | 10/2008 | Shelton, IV et al. |
| 7,441,684 B2 | 10/2008 | Shelton, IV et al. |
| 7,465,168 B2 | 12/2008 | Allen et al. |
| 7,467,075 B2 | 12/2008 | Humphries et al. |
| 7,544,062 B1 | 6/2009 | Hauschild et al. |
| 7,549,866 B2 | 6/2009 | Cohen et al. |
| 7,553,159 B1 | 6/2009 | Arnal et al. |
| 7,575,434 B2 | 8/2009 | Palakodeti |
| 7,594,815 B2 | 9/2009 | Toly |
| 7,621,749 B2 | 11/2009 | Munday |
| 7,646,901 B2 | 1/2010 | Murphy et al. |
| 7,648,367 B1 | 1/2010 | Makower et al. |
| 7,648,513 B2 | 1/2010 | Green et al. |

(56) References Cited

U.S. PATENT DOCUMENTS

| | | |
|---|---|---|
| 7,651,332 B2 | 1/2010 | Dupuis et al. |
| 7,677,897 B2 | 3/2010 | Sakezles |
| 7,775,916 B1 | 8/2010 | Mahoney |
| 7,780,451 B2 | 8/2010 | Willobee et al. |
| 7,802,990 B2 | 9/2010 | Korndorffer et al. |
| 7,803,151 B2 | 9/2010 | Whitman |
| 7,806,696 B2 | 10/2010 | Alexander et al. |
| 7,819,799 B2 | 10/2010 | Merril et al. |
| 7,833,018 B2 | 11/2010 | Alexander et al. |
| 7,837,473 B2 | 11/2010 | Koh |
| 7,850,454 B2 | 12/2010 | Toly |
| 7,850,456 B2 | 12/2010 | Chosack et al. |
| 7,854,612 B2 | 12/2010 | Frassica et al. |
| 7,857,626 B2 | 12/2010 | Toly |
| 7,866,983 B2 | 1/2011 | Hemphill et al. |
| 7,931,470 B2 | 4/2011 | Alexander et al. |
| 7,931,471 B2 | 4/2011 | Senagore et al. |
| 7,988,992 B2 | 8/2011 | Omidian et al. |
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,017,107 B2 | 9/2011 | Thomas et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,465,771 B2 | 6/2013 | Wan et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Hendrickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,096,744 B2 | 8/2015 | Wan et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,387,276 B2 | 7/2016 | Sun et al. |
| 9,427,496 B2 | 8/2016 | Sun et al. |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 10,540,912 B2 * | 1/2020 | Ogawa ............... B32B 27/306 |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0126746 A1 * | 7/2004 | Toly ..................... G09B 23/28 |
| | | 434/262 |
| 2004/0248072 A1 | 12/2004 | Gray et al. |
| 2005/0008997 A1 | 1/2005 | Herman |
| 2005/0026125 A1 | 2/2005 | Toly |
| 2005/0064378 A1 | 3/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyama |
| 2005/0214727 A1 | 9/2005 | Stoianovici et al. |
| 2006/0046235 A1 | 3/2006 | Alexander et al. |
| 2006/0232664 A1 | 10/2006 | Toly |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 | 7/2007 | Yarin et al. |
| 2007/0197895 A1 | 8/2007 | Nycz et al. |

(56) References Cited

U.S. PATENT DOCUMENTS

| | | |
|---|---|---|
| 2007/0225734 A1 | 9/2007 | Bell et al. |
| 2007/0238081 A1 | 10/2007 | Koh |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III et al. |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |
| 2008/0317818 A1 | 12/2008 | Griffith et al. |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0246747 A1 | 10/2009 | Buckman, Jr. |
| 2009/0298034 A1 | 12/2009 | Parry et al. |
| 2009/0314550 A1 | 12/2009 | Layton |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1* | 7/2010 | Nguyen ............... G09B 23/30 434/272 |
| 2010/0196867 A1 | 8/2010 | Geerligs et al. |
| 2010/0204713 A1 | 8/2010 | Ruiz Morales |
| 2010/0209899 A1 | 8/2010 | Park |
| 2010/0248200 A1 | 9/2010 | Ladak |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0285094 A1 | 11/2010 | Gupta |
| 2010/0324541 A1 | 12/2010 | Whitman |
| 2011/0020779 A1 | 1/2011 | Hannaford et al. |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1* | 1/2012 | Hendrickson ........ G09B 23/30 434/273 |
| 2012/0016362 A1 | 1/2012 | Heinrich et al. |
| 2012/0028231 A1 | 2/2012 | Misawa et al. |
| 2012/0034587 A1 | 2/2012 | Toly |
| 2012/0045743 A1 | 2/2012 | Okano et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaiser et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1 | 1/2014 | Thilenius |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0187855 A1 | 7/2014 | Nagale et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1* | 12/2014 | Black ............... G09B 23/32 434/272 |
| 2014/0371761 A1 | 12/2014 | Juanpera |
| 2014/0378995 A1 | 12/2014 | Kumar et al. |
| 2015/0031008 A1* | 1/2015 | Black ............. G09B 23/285 434/272 |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |

(56) References Cited

U.S. PATENT DOCUMENTS

| | | |
|---|---|---|
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlock |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0058534 A1 | 3/2016 | Derwin et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0125762 A1 | 5/2016 | Becker et al. |
| 2016/0133158 A1 | 5/2016 | Sui et al. |
| 2016/0140876 A1 | 5/2016 | Jabbour et al. |
| 2016/0194378 A1 | 7/2016 | Cass et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |
| 2016/0232819 A1 | 8/2016 | Hofstetter et al. |
| 2016/0235494 A1 | 8/2016 | Shelton, IV et al. |
| 2016/0256187 A1 | 9/2016 | Shelton, IV et al. |
| 2016/0256229 A1 | 9/2016 | Morgan et al. |
| 2016/0262736 A1 | 9/2016 | Ross et al. |
| 2016/0262745 A1 | 9/2016 | Morgan et al. |
| 2016/0293055 A1 | 10/2016 | Hofstetter |
| 2016/0296144 A1 | 10/2016 | Gaddam et al. |

FOREIGN PATENT DOCUMENTS

| | | |
|---|---|---|
| CN | 2751372 Y | 1/2006 |
| CN | 2909427 Y | 6/2007 |
| CN | 101313842 A | 12/2008 |
| CN | 101528780 A | 9/2009 |
| CN | 201364679 Y | 12/2009 |
| CN | 201955979 U | 8/2011 |
| CN | 102458496 A | 5/2012 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 102596275 B | 6/2014 |
| CN | 103845757 A | 6/2014 |
| CN | 103886797 A | 6/2014 |
| CN | 103396562 B | 7/2015 |
| CN | 105194740 A | 12/2015 |
| CN | 105504166 A | 4/2016 |
| DE | 9102218 U1 | 5/1991 |
| DE | 41 05 892 A1 | 8/1992 |
| DE | 93 20 422 U1 | 6/1994 |
| DE | 44 14 832 A1 | 11/1995 |
| DE | 19716341 A1 | 9/2000 |
| EP | 1 024 173 A1 | 8/2000 |
| EP | 0 990 227 B1 | 4/2002 |
| EP | 1 609 431 A1 | 12/2005 |
| EP | 0 870 292 B1 | 7/2008 |
| EP | 2 068 295 A2 | 6/2009 |
| EP | 2 218 570 A1 | 8/2010 |
| FR | 2 691 826 A1 | 12/1993 |
| FR | 2 917 876 A1 | 12/2008 |
| GB | 2488994 A | 9/2012 |
| JP | 10 211160 A | 8/1998 |
| JP | 2001005378 A | 1/2001 |
| JP | 2006187566 A | 7/2006 |
| JP | 2009063787 A | 3/2009 |
| JP | 2009236963 A | 10/2009 |
| JP | 3162161 U | 8/2010 |
| JP | 2011113056 A | 6/2011 |
| JP | 2013127496 A | 6/2013 |
| KR | 101231565 B1 | 2/2013 |
| MX | PA 02004422 A | 11/2003 |
| PT | 106230 | 9/2013 |
| WO | WO 1994/06109 A1 | 3/1994 |
| WO | WO 1996/042076 A1 | 12/1996 |
| WO | WO 1998/58358 A1 | 12/1998 |
| WO | WO 1999/01074 A1 | 1/1999 |
| WO | WO 2000/36577 A1 | 6/2000 |
| WO | WO 2002/38039 A2 | 5/2002 |
| WO | WO 2002/038039 A3 | 5/2002 |
| WO | WO 2004/032095 A1 | 4/2004 |
| WO | WO 2004/082486 A1 | 9/2004 |
| WO | WO 2005/071639 A1 | 8/2005 |
| WO | WO 2005/083653 A1 | 9/2005 |
| WO | WO 2006/083963 A2 | 8/2006 |
| WO | WO 2007/068360 A1 | 6/2007 |
| WO | WO 2008/021720 A2 | 2/2008 |
| WO | WO 2008/103383 A1 | 8/2008 |
| WO | WO 2009/000939 A1 | 12/2008 |
| WO | WO 2009/089614 A1 | 7/2009 |
| WO | WO 2010/094730 A1 | 8/2010 |
| WO | WO 2011/035410 A1 | 3/2011 |
| WO | WO 2011/046606 A1 | 4/2011 |
| WO | WO 2011/127379 A2 | 10/2011 |
| WO | WO 2011/151304 A1 | 12/2011 |
| WO | WO 2012/149606 A1 | 11/2012 |
| WO | WO 2012/168287 A1 | 12/2012 |
| WO | WO 2012/175993 A1 | 12/2012 |
| WO | WO 2013/048978 A1 | 4/2013 |
| WO | WO 2013/103956 A1 | 7/2013 |
| WO | WO 2014/022815 A1 | 2/2014 |
| WO | WO 2014/093669 A1 | 6/2014 |
| WO | WO 2014/197793 A1 | 12/2014 |
| WO | WO 2015/148817 A1 | 10/2015 |
| WO | WO 2016/138528 A1 | 9/2016 |
| WO | WO 2016/183412 A1 | 11/2016 |
| WO | WO 2016/198238 A1 | 12/2016 |
| WO | WO 2016/201085 A1 | 12/2016 |
| WO | WO 2017/031214 A1 | 2/2017 |
| WO | WO 2017/042301 A1 | 3/2017 |

OTHER PUBLICATIONS

European Patent Office, International Search Report for International Application No. PCT/US2011/053859 A3, mailed on Apr. 5, 2012, entitled "Portable Laparoscopic Trainer," 8 pgs.

European Patent Office, The International Search Report and Written Opinion fo rInternational Application No. PCT/US2012/60997, entitled "Simulated Tissue Structure for Surgical Training," mailed Mar. 7, 2013, 8 pgs.

European Patent Office, The International Search Report and Written Opinion for International Application No. PCT/US2012/070971, entitled "Advanced Surgical Simulation," mailed Mar. 18, 2013, 10 pgs.

(56) References Cited

OTHER PUBLICATIONS

Human Patient Simulator, Medical Education Technologies, Inc., http://www.meti.com (1999) all, printed Apr. 12, 2013, 24 pgs.
The International Bureau of WIPO, International Preliminary Report on Patentability and Written Opinion for International Application No. PCT/US2011/053859, entitled "Portable Laparoscopic Trainer," dated Apr. 2, 2013, 9 pgs.
European Patent Office, The International Search Report and Written Opinion for International Application No. PCT/US2013/062363, entitled "Surgical Training Model for Laparoscopic Procedures," mailed Jan. 22, 2014, 11 pgs.
European Patent Office, The International Search Report and Written Opinion for International Application No. PCT/US2013/061949, entitled "Surgical Training Model for Laparoscopic Procedures," mailed Feb. 17, 2014, 7 pgs.
Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).
European Patent Office, The International Search Report and Written Opinion for International Application No. PCT/US2013/062269, entitled "Surgical Training Model for Transluminal Procedures," mailed Feb. 17, 2014, 8 pgs.
European Patent Office, The International Search Report and Written Opinion for International Application No. PCT/US2013/061557, entitled "Surgical Training Model for Laparoscopic Procedures," mailed Feb. 10, 2014, 9 pgs.
European Patent Office, The International Search Report and Written Opinion for International Application No. PCT/US2013/061728, entitled "Surgical Training Model for Laparoscopic Procedures," mailed Oct. 18, 2013, 9 pgs.
Limps and Things, EP Guildford MATTU Hernia Trainer, http://limbsandthings.com/us/products/tep-guildford-mattu-hernia-trainer/, printed May 29, 2014, 11 pgs.
Simulab, Hernia Model, http://www.simulab.com/product/surgery/open/hernia model, printed printed May 29, 2014, 4 pgs.
McGill Laparoscopic Inguinal Hernia Simulator, Novel Low-Cost Simulator for Laparoscopic Inguinal Hernia Repair, Feb. 8, 2011, 1 pg.
University of Wisconsin-Madison Biomedical Engineering, Inguinal Hernia Model, http://bmedesign.engr.wisc.edu/projects/s10/hernia_model/, printed May 29, 2014, 62 pgs.
The International Bureau of WIPO, International Preliminary Report on Patentability for International Application No. PCT/US2012/070971, entitled "Advanced Surgical Simulation," dated Jun. 24, 2014, 7 pgs.
European Patent Office, The International Search Report and Written Opinion of the International Searching Authority for International Application No. PCT/US2014/038195, entitled "Hernia Model", mailed Oct. 15, 2014, 20 pgs.
European Patent Office, The International Search Report and Written Opinion of the International Searching Authority for International Application No. PCT/US2014/048027, entitled "First Entry Model", mailed Oct. 17, 2014, 10 pgs.
The International Bureau of WIPO, International Preliminary Report on Patentability for International Application No. PCT/US2012/060997, entitled "Simulated Tissue Structure For Surgical Training" dated Apr. 22, 2014, 6 pgs.
European Patent Office, The International Search Report and Written Opinion for International Application No. PCT/US2014/019840, entitled "Advanced Surgical Simulation Constructions and Methods," mailed Jul. 4, 2014, 8 pgs.
Kurashima, et al., "A tool for training and evaluation of Laparoscopic inguinal hernia repair; the Global Operative Assessment of Laparoscopic Skills—Groin Hernia" American Journal of Surgery, Paul Hoeber, New York, NY, US vol. 201, No. 1, Jan. 1, 2011, pp. 54-61 XP027558745.
European Patent Office, The International Search Report and Written Opinion for International Application No. PCT/US2014/042998, entitled "Gallbladder Model," mailed Jan. 7, 2015, 20 pgs.

The International Bureau of WIPO, International Preliminary Report on Patentability, for PCT application No. PCT/US2013/053497, entitled Simulated Stapling and Energy Based Ligation for Surgical Training, mailed Feb. 12, 2015, 6 pgs.
The International Bureau of WIPO, International Preliminary Report on Patentability for International Application No. PCT/US2013/062363, entitled "Surgical Training Model for Laparoscopic Procedures," mailed Apr. 9, 2015, 9 pgs.
The International Bureau of WIPO, International Preliminary Report on Patentability for International Application No. PCT/US2013/062269, entitled "Surgical Training Model for Laparoscopic Procedures," mailed Apr. 9, 2015, 6 pgs.
The International Bureau of WIPO, International Preliminary Report on Patentability for International Application No. PCT/US2013/061557, entitled "Surgical Training Model for Laparoscopic Procedures," mailed Apr. 9, 2015, 6 pgs.
The International Bureau of WIPO, International Preliminary Report on Patentability for International Application No. PCT/US2013/061728, entitled "Surgical Training Model for Laparoscopic Procedures," mailed Apr. 9, 2015, 7 pgs.
The International Bureau of WIPO, International Preliminary Report on Patentability for International Application No. PCT/US2013/061949, entitled "Surgical Training Model for Laparoscopic Procedures," mailed Apr. 9, 2015, 6 pgs.
The International Bureau of WIPO, International Preliminary Report on Patentability for International Application No. PCT/US2014/019840, entitled "Simulated Tissue Structure For Surgical Training," dated Sep. 11, 2015, 8 pgs.
European Patent Office, The International Search Report and Written Opinion for International Application No. PCT/US2015/020574, entitled "Advanced First Entry Model for Surgical Simulation," mailed Jun. 1, 2015, 12 pgs.
European Patent Office, The International Search Report and Written Opinion for International Application No. PCT/US2015/022774, entitled "Simulated Dissectible Tissue," mailed Jun. 11, 2015, 13 pgs.
Anonymous: Silicone rubber—from Wikipedia, the free encyclopedia, pp. 1-6, XP055192375, Retrieved from the Internet: URL:http://en.wikipedia.org/w.index.php?title=Silicone_rubber&oldid=596456058 (retrieved on May 29, 2015).
Lamouche, et al., "Review of tissue simulating phantoms with controllable optical, mechanical and structural properties for use in optical coherence tomography," Biomedical Optics Express, Jun. 1, 2012, 18 pgs., vol. 3, No. 6.
The International Bureau of WIPO, International Preliminary Report on Patentability for International Application No. PCT/US2014/038195, entitled "Hernia Model," mailed Nov. 26, 2015, 16 pgs.
The International Bureau of WIPO, International Preliminary Report on Patentability for International Application No. PCT/US2014/042998, entitled "Gallbladder Model," dated Dec. 30, 2015, 15 pgs.
European Patent Office, International Search Report and Written Opinion for International Application No. PCT/US2013/053497, titled "Simulated Stapling and Energy Based Ligation for Surgical Training," dated Nov. 5, 2013, 8 pgs.
The International Bureau of WIPO, International Preliminary Report on Patentability for International Application No. PCT/US2014/048027, entitled "First Entry Model," dated Feb. 4, 2016, 8 pgs.
European Patent Office, International Search Report and Written Opinion for International Application No. PCT/US2015/059668, entitled "Simulated Tissue Models and Methods," dated Apr. 26, 2016, 20 pgs.
Australian Patent Office, Patent Examination Report No. 1 for Australian Application No. 2012358851, titled "Advanced Surgical Simulation," dated May 26, 2016, 3 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2016/032292, entitled "Synthetic Tissue Structures for Electrosurgical Training and Simulation," dated Jul. 14, 2016, 11 pgs.

(56) References Cited

OTHER PUBLICATIONS

European Patent Office, International Search Report and Written Opinion for International Application No. PCT/US2016/018697, entitled "Simulated Tissue Structures and Methods," dated Jul. 14, 2016, 21 pgs.
European Patent Office, International Search Report and Written Opinion for International Application No. PCT/US2016/034591, entitled "Surgical Training Model for Laparoscopic Procedures," dated Aug. 8, 2016, 18 pgs.
European Patent Office, The International Search Report and Written Opinion of the International Searching Authority for International Application No. PCT/US2016/036664, entitled "Hysterectomy Model", mailed Aug. 19, 2016, 15 pgs.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", mailed Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.
European Patent Office, The International Search Report and Written Opinion of the International Searching Authority for International Application No. PCT/US2016/041852 titled "Simulated Dissectible Tissue", mailed Oct. 13, 2016, 12 pgs.
3D-MED Corporation, "Validated Training Course for Laparoscopic Skills," https://www.3-dmed.com/sites/default/files/product-additional/product-spec/Validated%20Training%20Course%20for%20Laparoscopic%20Skills.docx__3.pdf , printed Aug. 23, 2016, pp. 1-6.
3D-MED Corporation, "Loops and Wire #1," https://www.3-dmed.com/product/loops-and-wire-1 , printed Aug. 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.
European Patent Office, Invitation to Pay Additional Fees for International Application No. PCT/US2016/062669, titled "Simulated Dissectible Tissue", mailed Feb. 10, 2017, 8 pgs.
European Patent Office, The International Search Report and Written Opinion of the International Searching Authority for International Application No. PCT/US2016/055148 titled "Hysterectomy Model", mailed Feb. 28, 2017, 12 pgs.
European Patent Office, Examination Report for European Application No. 14733949.3 titled "Gallbladder Model," mailed Dec. 21, 2016, 6 pgs.
European Patent Office, The International Search Report and Written Opinion of the International Searching Authority for International Application No. PCT/US2016/062669 titled "Simulated Dissectible Tissue," mailed Apr. 5, 2017, 19 pgs.
European Patent Office, The International Search Report and Written Opinion of the International Searching Authority for International Application No. PCT/US2017/020389 titled "Simulated Tissue Cartridge", mailed May 24, 2017, 13 pgs.
The International Bureau of WIPO, International Preliminary Report on Patentability and Written Opinion for International Application No. PCT/US2015/059668, entitled "Simulated Tissue Models and Methods," dated May 26, 2017, 16 pgs.
The International Bureau of WIPO, International Preliminary Report on Patentability for International Application No. PCT/US2016/018697, entitled "Simulated Tissue Structures and Methods," dated Aug. 31, 2017, 14 pgs.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 2017, 14 pgs.
The International Bureau of WIPO, International Preliminary Report on Patentability for International Application No. PCT/US2016/036664, entitled "Hysterectomy Model," dated Dec. 21, 2017, 10 pgs.
The International Bureau of WIPO, International Preliminary Report on Patentability for International Application No. PCT/US2016/041852, entitled "Simulated Dissectible Tissue," dated Jan. 25, 2018, 12 pgs.
European Patent Office, Extended European Search Report for European Patent Application No. EP 17202365.7, titled "Gallbladder Model", dated Jan. 31, 2018, 8 pgs.
The International Bureau of WIPO, International Preliminary Report on Patentability for International Application No. PCT/US2016/043277, entitled "Appendectomy Model," dated Feb. 1, 2018, 9 pgs.
The International Bureau of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2018/018895, entitled "Synthetic Tissue Structures for Electrosurgical Training and Simulation," mailed May 17, 2018, 12 pgs.
The International Bureau of WIPO, International Preliminary Report on Patentability for International Application No. PCT/US2016/062669, entitled "Simulated Dissectible Tissue," dated May 31, 2018, 11 pgs.
European Patent Office, The International Search Report and Written Opinion for International Application No. PCT/US2018/018036, entitled "Laparoscopic Training System," mailed Jun. 8, 2018, 13 pgs.
European Patent Office, The International Search Report and Written Opinion for International Application No. PCT/US2017/039113, entitled "Simulated Abdominal Wall," mailed Aug. 7, 2017, 13 pgs.
European Patent Office, Extended European Search Report for European Patent Application No. EP 18177751.7, titled "Portable Laparoscopic Trainer," dated Jul. 13, 2018, 8 pgs.
European Patent Office, The International Search Report and Written Opinion for International Application No. PCT/US2018/034705, entitled "Laparoscopic Training System," mailed Aug. 20, 2018, 14 pgs.
The International Bureau of WIPO, International Preliminary Report on Patentability for International Application No. PCT/US2017/020389, entitled "Simulated Tissue Cartridge," dated Sep. 13, 2018, 8 pgs.
European Patent Office, Extended European Search Report for European Patent Application No. EP 18184147.9, titled "First Entry Model," dated Nov. 7, 2018, 7 pgs.
The International Bureau of WIPO, International Preliminary Report on Patentability for International Application No. PCT/US2017/039113, entitled "Simulated Abdominal Wall," dated Jan. 10, 2019, 8 pgs.
European Patent Office, Extended European Search Report for European Patent Application No. EP 18210006.5, titled "Surgical Training Model for Laparoscopic Procedures," dated Jan. 21, 2019, 7 pgs.
European Patent Office, Extended European Search Report for European Patent Application No. EP 18207214.0, titled "Synthetic Tissue Structures for Electrosurgical Training and Simulation," dated Mar. 28, 2019, 6 pgs.
European Patent Office, Extended European Search Report for European Patent Application No. EP 18216002.8, titled "Surgical Training Model for Laparoscopic Procedures," dated Apr. 2, 2019, 6 pgs.
European Patent Office, Extended European Search Report for European Patent Application No. EP 18216005.1, titled "Surgical Training Model for Laparoscopic Procedures," dated Apr. 2, 2019, 7 pgs.

(56) References Cited

OTHER PUBLICATIONS

European Patent Office, Extended European Search Report for European Patent Application No. EP 19159065.2, titled "Simulated Tissue Structures and Methods," dated May 29, 2019, 8 pgs.
The International Bureau of WIPO, International Preliminary Report on Patentability for International Application No. PCT/US2018/018036, entitled "Laparoscopic Training System," dated Aug. 29, 2019, 8 pgs.
The International Bureau of WIPO, International Preliminary Report on Patentability for International Application No. PCT/US2018/018895, entitled "Synthetic Tissue Structures for Electrosurgical Training and Simulation," dated Sep. 6, 2019, 7 pgs.
European Patent Office, Extended European Search Report for European Patent Application No. EP 19215545.5, titled "Advanced First Entry Model for Surgical Simulation," dated Mar. 36, 2020, 8 pgs.
European Patent Office, Extended European Search Report for European Patent Application No. EP 20153338.7, titled "Advanced Surgical Simulation Constructions and Methods," dated Mar. 5, 2020, 7 pgs.
European Patent Office, Extended European Search Report for European Patent Application No. EP 20158500.7, titled "Surgical Training Device," dated May 14, 2020, 9 pgs.
"Surgical Female Pelvic Trainer (SFPT) with Advanced Surgical Uterus," Limbs & Things Limited, Issue 1, Jul. 31, 2003, URL:https://www.accuratesolutions.it/wp-content/uploads/2012/08/Surgical_Female_Pelvic_Trainer_SFPT_with_Advanced_Uterus_User_Guide.pdf, retrieved Feb. 21, 2020, 2 pgs.
European Patent Office, Extended European Search Report for European Patent Application No. EP 20186713.2, titled "Simulated Dissectible Tissue," dated Nov. 10, 2020, 12 pgs.
European Patent Office, Extended European Search Report for European Patent Application No. 22212824.1, titled "Surgical Training Model for Laparoscopic Procedures," dated Feb. 28, 2023, 20 pgs.
European Patent Office, Extended European Search Report for European Patent Application No. 22214865.2, titled "Gallbladder Model," dated Feb. 28, 2023, 18 pgs.
Condino et al.; "How to build patient-specific synthetic abdominal anatomies. An innovative approach from physical toward hybrid surgical simulators," The International Journal of Medical Robotics and Computer Assisted Surgery, Apr. 27, 2011, vol. 7, No. 2, pp. 202-213.
Wilkes et al.; "Closed Incision Management with Negative Pressure Wound Therapy (CIM): Biomechanics," Surgical Innovation 19(1), URL:https://journals.sagepub.com/doi/pdf/10.1177/1553350611414920, Jan. 1, 2012, pp. 67-75.
European Patent Office, Extended European Search Report for European Patent Application No. EP 21182654.0, titled "Simulated Dissectible Tissue," dated Oct. 22, 2021, 13 pgs.
European Patent Office, Extended European Search Report for European Patent Application No. EP 21191452.8, titled "Advanced Surgical Simulation Constructions and Methods," dated Dec. 13, 2021, 8 pgs.
European Patent Office, Extended European Search Report for European Patent Application No. 21159294.4, titled "Surgical Training Model for Laparoscopic Procedures," dated May 4, 2021, 7 pgs.
European Patent Office, Extended European Search Report for European Patent Application No. EP 22172093.1, titled "Hysterectomy Model," dated Jul. 20, 2022, 9 pgs.
European Patent Office, Extended European Search Report for European Patent Application No. EP 22151452.4, titled "Portable Laparoscopic Trainer," dated Apr. 13, 2022, 8 pgs.
European Patent Office, Extended European Search Report for European Patent Application No. 23186659.1, titled "Hysterectomy Model," dated Mar. 5, 2024, 11 pgs.
European Patent Office, Partial Extended European Search Report for European Patent Application No. 23180886.6, titled "Simulated Dissectible Tissue," dated Sep. 20, 2023, 16 pgs.
European Patent Office, Extended European Search Report for European Patent Application No. 23200455.6, titled "Simulated Training Model for Laparoscopic Procedures," dated Dec. 4, 2023, 7 pgs.
European Patent Office, Extended European Search Report for European Patent Application No. 23180886.6, titled "Simulated Dissectible Tissue," dated Dec. 21, 2023, 14 pgs.

\* cited by examiner

SIMULATED TISSUE STRUCTURES AND METHODS

CROSS-REFERENCE TO RELATED APPLICATIONS

This application is a continuation application of U.S. application Ser. No. 16/505,918, entitled "Simulated tissue structures and methods," filed Jul. 9, 2019, which is a continuation application of U.S. application Ser. No. 15/185,360, entitled "Simulated tissue structures and methods," filed Jun. 17, 2016 now U.S. Pat. No. 10,354,556, which claims the benefit of and is a continuation of International Application No. PCT/US2016/018697 entitled "Simulated tissue structures and methods" filed on Feb. 19, 2016 which claims priority to and benefit of U.S. Provisional Patent Application No. 62/118,179 entitled "Method of making simulated tissue using stencils" filed on Feb. 19, 2015 and U.S. Provisional Patent Application No. 62/119,542 entitled "Foam-on-mandrel method of making simulated anatomy" filed on Feb. 23, 2015 all of which are incorporated herein by reference in their entireties.

FIELD OF THE INVENTION

This application relates to surgical training tools, and in particular, to simulated tissue structures and organ models for teaching and practicing surgical procedures and methods for making them.

BACKGROUND OF THE INVENTION

A highly-skilled operation technique is required of surgeons, in general, and, in particular, for performing laparoscopic surgical procedures. In laparoscopic surgery, several small incisions are made in the abdomen for the insertion of trocars or small cylindrical tubes approximately 5 to 10 millimeters in diameter through which surgical instruments and a laparoscope are placed into the abdominal cavity. The laparoscope illuminates the surgical field and sends a magnified image from inside the body to a video monitor giving the surgeon a close-up view of organs and tissues. The surgeon performs the operation by manipulating the surgical instruments placed through the trocars while watching the live video feed on a monitor. Because the surgeon does not observe the organs and tissues directly with the naked eye, visual information is obtained by a two-dimensional image on a monitor instead of a three-dimensional observation. The loss of information when presenting a three-dimensional environment via a two-dimensional image is substantial. In particular, depth perception is reduced when viewing a two-dimensional image as a guide for manipulating instruments in three dimensions.

Furthermore, because the trocars are inserted through small incisions and rest against the abdominal wall, the manipulation of instruments is restricted by the abdominal wall which has a fulcrum effect on the instrument. The fulcrum effect defines a point of angulation that constrains the instrument to limited motion. Also, hand motion in one linear direction causes magnified tip motion in the opposite direction. Not only is the instrument motion viewed on the screen in the opposite direction, but also, the magnified tip motion is dependent on the fraction of the instrument length above the abdominal wall. This lever effect not only magnifies motion but also magnifies tool tip forces that are reflected to the user. Hence, the operation of an instrument with a fulcrum requires intentional learning and practice and is not intuitively obvious.

Also, surgical instruments are placed through ports having seals which induce a stick-slip friction caused by the reversal of tool directions. For example, stick-slip friction may arise from the reversal of tool directions when, for example, quickly changing from pulling to pushing on tissue. During such motion, rubber parts of the seals rub against the tool shaft causing friction or movement of the seal with the seal before the friction is overcome and the instrument slides relative to the seal. Stick-slip friction, or oil-canning, at the seal and instrument interface creates a non-linear force.

Hand-eye coordination skills are necessary and must be practiced in order to correlate hand motion with tool tip motion especially via observation on a video monitor. Also, in laparoscopic surgery, tactile sensation through the tool is diminished. Because haptics are reduced or distorted, the surgeon must develop a set of core haptic skills that underlie proficient laparoscopic surgery. The acquisition of all of these skills is one of the main challenges in laparoscopic training and the present invention is aimed at improving systems and methods for laparoscopic skills training and technique performance.

Not only do new practitioners have to learn laparoscopic skills, but also, experienced laparoscopic surgeons seek to polish old skills as well as to learn and practice new surgical techniques that are unique to newly introduced surgical procedures. While training can be acquired in the operating room, interest in devising faster and more efficient training methods, preferably outside the operating room has increased. Surgeons that attain a reasonable level of skills outside the operating room are better prepared when they enter the operating room and, thereby, valuable operating room experience can thus be optimized, lowering the risk to patients and reducing costs. To acquaint surgeons with basic surgical skills outside the operating room, various simulators have been devised and tested. An example of a surgical simulator is the SIMSEI® laparoscopic trainer manufactured by Applied Medical Resources Corporation in California and described in U.S. Pat. No. 8,764,452 incorporated by reference herein in its entirety. The SIMSEI® laparoscopic trainer employs three-dimensional live or fake organs inside a simulated abdominal cavity that is obscured from direct observation by the user.

Use of a live human or animal organ in a laparoscopic simulator requires freshness for the internal organ. Also, live organs require sanitary arrangements to be made to protect the trainee from being infected by germs and the like. Additional costs are also required for the sanitary management and sterilization of instruments which are used after the exercise of a surgical operation is performed. Also, the used live organ must be properly disposed. Furthermore, the smell of a live organ can be fowl and may distract the trainee from focusing on techniques and skills. Therefore, artificial organs and tissues that simulate live organs and tissues are desirable so that live organs can be replaced in surgical training.

Many artificial organs have been used in place of live human or animal organs in surgical training. Typically, these artificial organ models are made of silicone, urethane elastomer, styrene elastomer or the like. These artificial organs must respond properly when incised, manipulated or sutured, for example, and provide the same feeling and tactile characteristics as in real life surgery. However, many artificial organs lack certain properties and realism that are necessary to bridge the gap between artificial and real organs. Furthermore, the degree of realism must be targeting to provide means for teaching the skills that are peculiar to laparoscopic skills training. As such, certain realisms may be more important in a laparoscopic environment when compared to an open surgical environment. Therefore, there is a need for artificial organs and tissues and, in particular, for artificial organs and tissues that are targeted for laparoscopic skills training. The present invention sets forth new artificial organs and tissues that are realistic and targeted for laparoscopic skills training. The present invention also provides the methods of manufacturing such artificial organs and tissues.

SUMMARY OF THE INVENTION

According to one aspect of the invention, a simulated tissue structure and method of manufacturing it are provided. The simulated tissue structure includes a combination of two materials that are attached together wherein one of the materials forms a hollow anatomical structure configured to contain the other material. The two materials are attached in an anatomically advantageous manner such that the inner surface of the outer material closely conforms to the outer surface of the other. Also, the internal material has a different and more rigid characteristic relative to the external material and the anatomical geometry formed by the outer material would normally make insertion of the internal material into the external geometry damaging to the outer geometry, difficult to accomplish and would reduce the realism arising from compensations, such as repairing and gluing, necessary due to damaging insertion. The method of manufacture of the present invention includes the step of applying a first material in an uncured state directly onto the second material in a solid state to encase or encompass in whole or in part the second material; the second material defines the size and shape of at least part of the first material and forms a unitary and connected construction with the first material that is also easy to remove from a mandrel.

According to another aspect of the invention, a method of making a simulated tissue structure is provided. The method includes the step of providing a mandrel having a proximal end, a distal end and a longitudinal axis wherein the distal end of the mandrel includes an interlocking portion having a length. The method includes the step of providing an inner portion of a simulated tissue structure. The inner portion has a lumen sized and configured to receive the interlocking portion such that the entire length of the interlocking portion is located inside the lumen. The method includes the step of placing the inner portion onto the mandrel. The method further includes the step of placing the interlocking portion of the mandrel into the lumen of the inner portion. The method includes the steps of rotating the mandrel about the longitudinal axis, applying uncured silicone onto the inner portion, curing the silicone to form an outer portion that surrounds the inner portion, and removing the inner portion and the outer portion as one unit from the mandrel.

According to another aspect of the invention, a method of making a simulated tissue structure is provided. The method includes the step of providing a simulated anatomical structure. The method includes the step of providing a mandrel having a longitudinal axis, a proximal end and a distal end. The mandrel is configured to removably attach to the simulated anatomical structure. The method includes the step of connecting the simulated anatomical structure to the mandrel at a location along the longitudinal axis. The method includes the step of rotating the mandrel and connected simulated anatomical structure. The method includes the step of applying a second material in an uncured state to the mandrel and to the simulated anatomical structure. The method includes the step of allowing the second material to cure onto the simulated anatomical structure and mandrel to form a simulated tissue structure in which the simulated anatomical structure is surrounded in a thin shell of the second material. The simulated tissue structure has at least one lumen defined by the second material cured onto the mandrel. The method includes the steps of attaching the second material to the simulated anatomical structure, and removing the simulated anatomical structure with the attached second material.

According to another aspect of the invention, a simulated tissue structure is provided. The simulated anatomical structure has a proximal end and a distal end of a first material located inside a thin shell of a second material having a proximal end and a distal end. The simulated anatomical structure is attached to the second material. The simulated anatomical structure has a first diameter and a first lumen at the proximal end and the second material has a second lumen having a second diameter at the proximal end wherein the first lumen is substantially aligned with the second lumen.

According to another aspect of the invention, a method of making a simulated tissue structure is provided. The method includes the step of providing a planar first base layer. The method includes the step of providing a first stencil having at least one hole, and applying the first stencil onto the first base layer. The method includes the step of
   applying a first stencil layer onto the first base layer via the first stencil.

The method includes the steps of removing the first stencil, providing a planar second base layer, and applying a second base layer over the stencil layer and first base layer. The method further includes the step of adhering the second base layer to the first base layer.

According to another aspect of the invention, a simulated tissue structure is provided. The simulated tissue structure includes a planar first base layer having a first side and a second side defining a substantially uniform thickness therebetween. The simulated tissue structure includes a planar second base layer having a first side and a second side defining a substantially uniform thickness therebetween. The second side of the second base layer faces the first side of the first base layer. The second base layer is adhered to the first base layer. The simulated tissue structure further includes at least one functional layer comprising a functional material located between the first base layer and the second base layer wherein the functional layer is formed via a stencil having at least one hole for applying the functional material.

DETAILED DESCRIPTION OF THE INVENTION

Figure 1A:
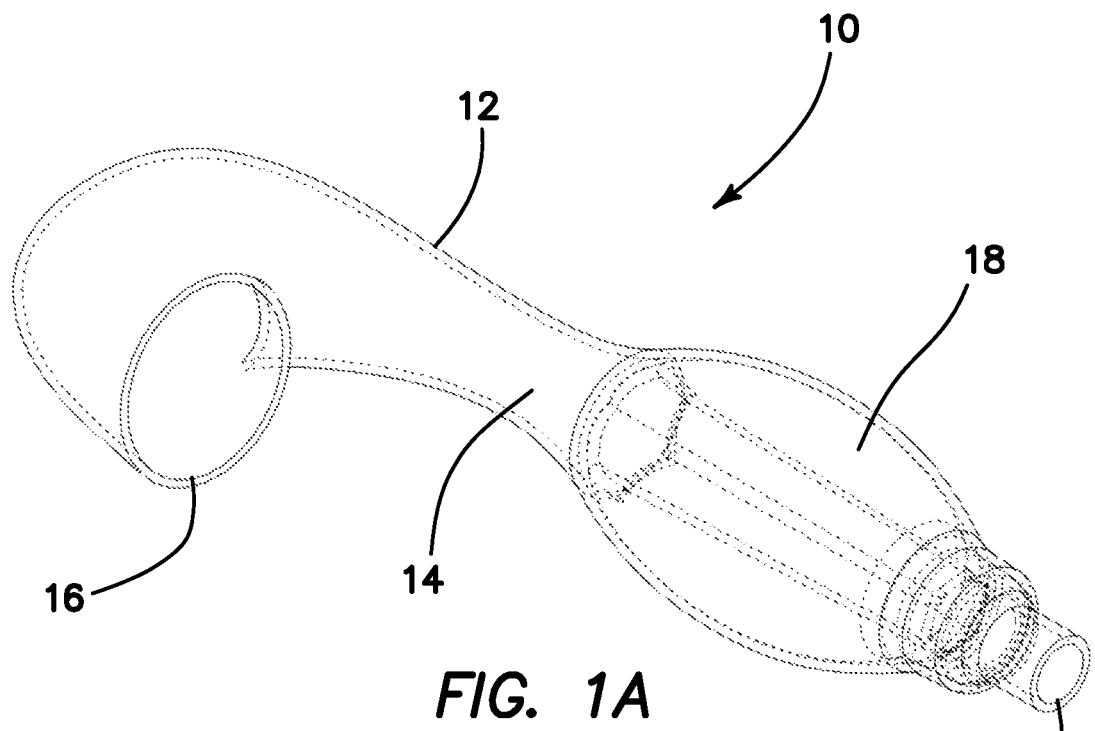
FIG. 1A is a top perspective, transparent view of a simulated tissue structure comprising an inner portion and an outer portion wherein the outer portion forms an artificial fallopian tube and the inner portion forms an ectopic pregnancy according to the present invention.
Figure 1B:
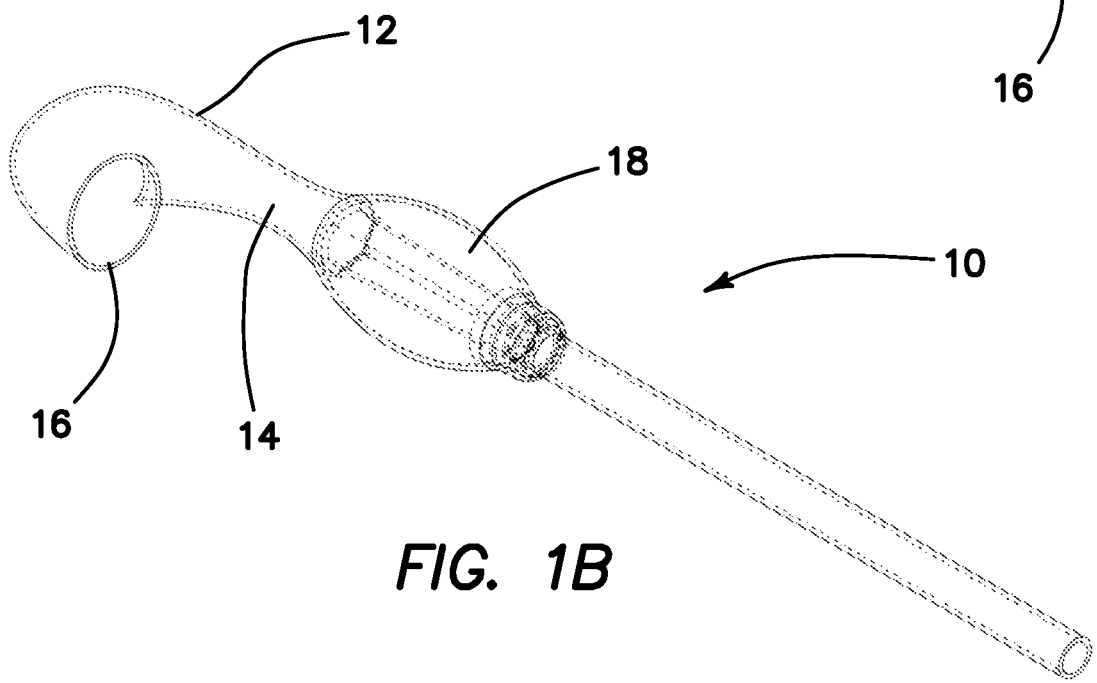
FIG. 1B is a top perspective, transparent view of a simulated tissue structure comprising an inner portion and an outer portion wherein the outer portion forms an artificial fallopian tube and the inner portion forms an ectopic pregnancy according to the present invention.
Figure 1C:
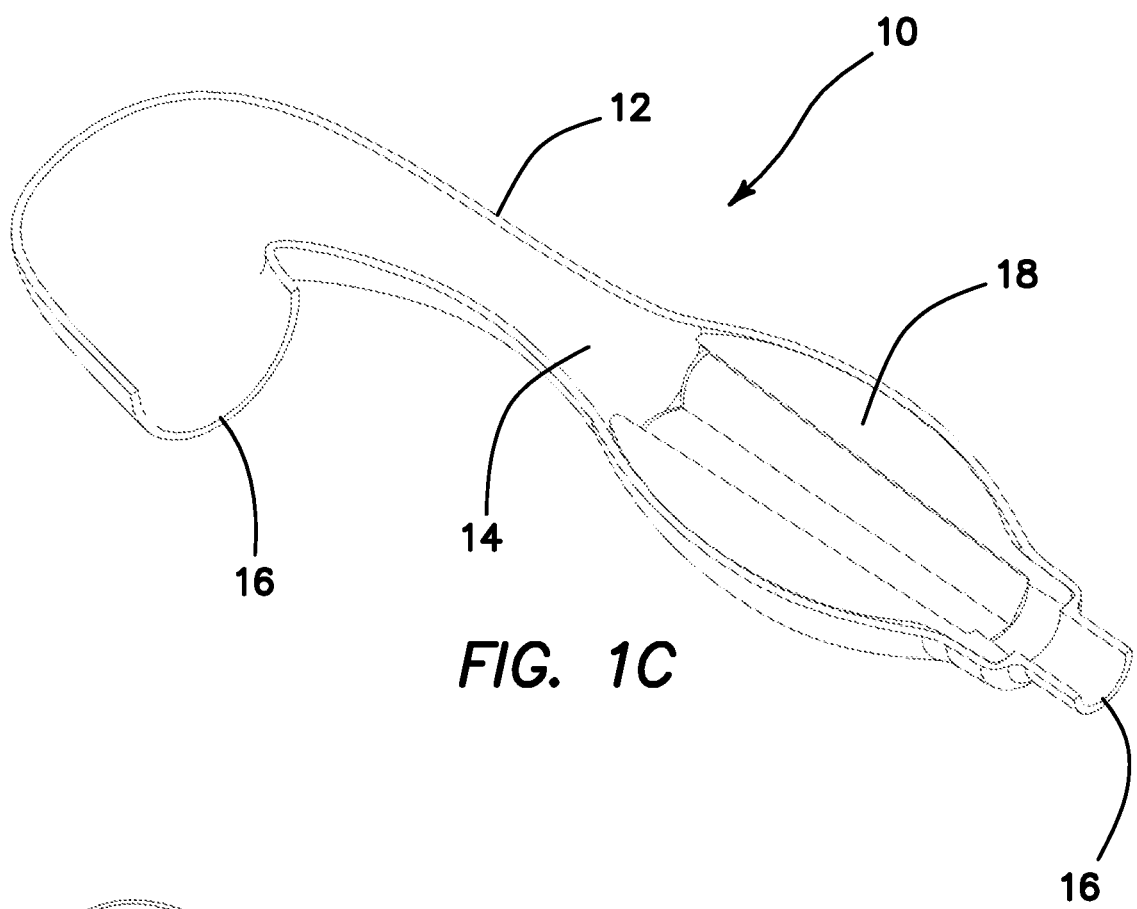
FIG. 1C is a top perspective, cross-sectional view of a simulated tissue structure comprising an inner portion and an outer portion wherein the outer portion forms an artificial fallopian tube and the inner portion forms an ectopic pregnancy according to the present invention.
Figure 1D:
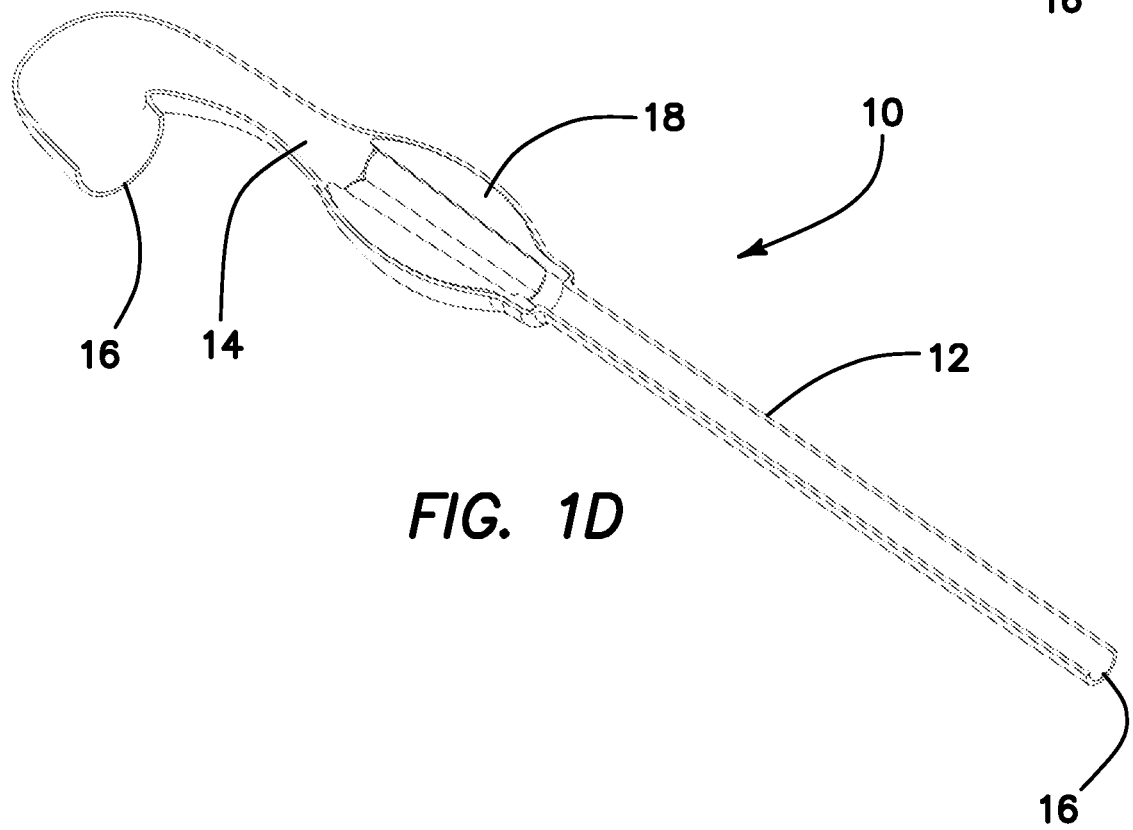
FIG. 1D is a top perspective, cross-sectional view of a simulated tissue structure comprising an inner portion and an outer portion wherein the outer portion forms an artificial fallopian tube and the inner portion forms an ectopic pregnancy according to the present invention.
Figure 2A:
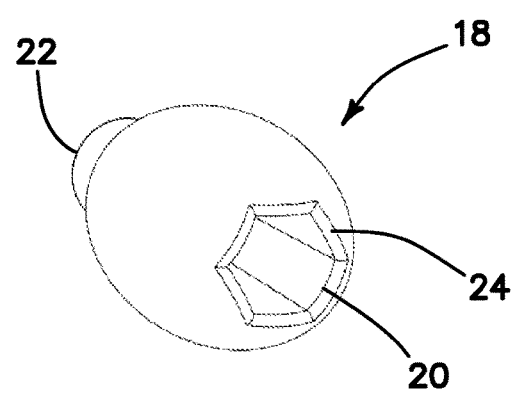
FIG. 2A is a top perspective view of an inner portion of FIG. 1 according to the present invention.
Figure 2B:
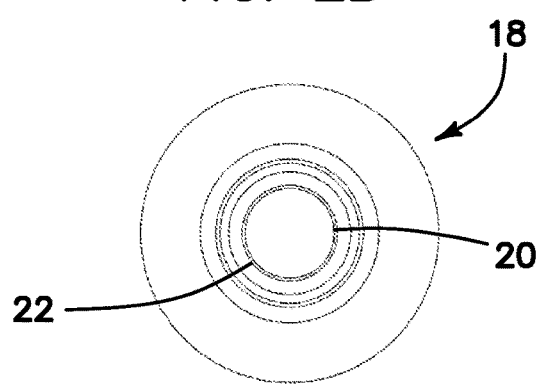
FIG. 2B is a top view of an inner portion of FIG. 1 according to the present invention.
Figure 2D:
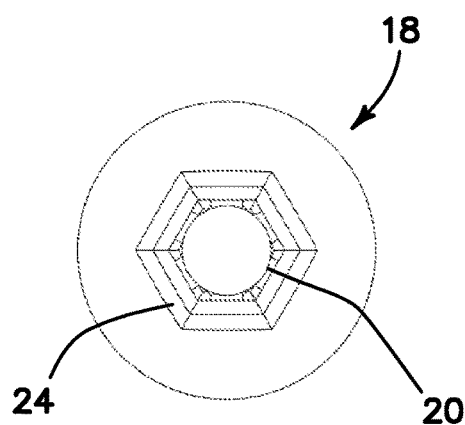
FIG. 2D is a bottom view of an inner portion of FIG. 1 according to the present invention.
Figure 2C:
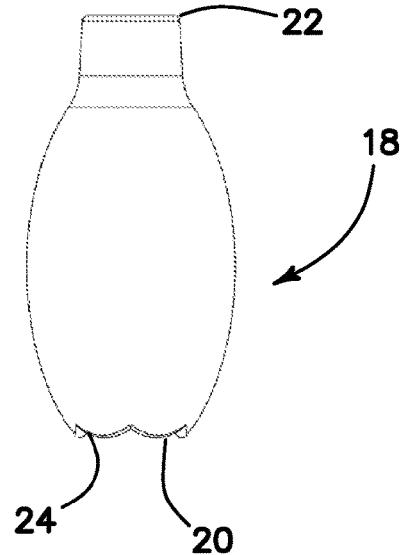
FIG. 2C is a side view of an inner portion of FIG. 1 according to the present invention.

Turning now to FIGS. 1A-1D, there is shown a simulated tissue structure 10 according to the present invention. The simulated tissue structure 10 includes a silicone outer portion 12 having an outer surface and an inner surface. The interior surface defines an interior cavity 14. The interior cavity 14 is interconnected with at least one opening 16. The cavity 14 of the simulated tissue structure 10 of FIGS. 1A-1D includes two openings 16 and the cavity 14 is lumen-like and generally elongated. In particular, the outer portion 12 is configured to have a size and shape of a tissue structure, organ, or at least a part of an anatomy. For example, as shown in FIGS. 1A-1D, the outer portion 12 is configured in shape and size to represent a fallopian tube of the female human anatomy. FIGS. 1B and 1C illustrate a proximal elongation that is longer so as to integrally form a fallopian tube than shown in FIGS. 1A and 1C so as to be optionally connectable to a separately formed fallopian tube extension. The proximal opening 16 can be connected to an artificial uterus and/or a separately formed fallopian tube extension and the distal opening 16 includes longitudinal cuts to mimic the fallopian tube. The outer portion 12 is made of silicone such as platinum cured room temperature vulcanization silicone (PCRTVS). The outer portion 12 can also be made of any other type of silicone material, polymer, rubber, elastomer and the like.

The simulated tissue structure 10 further includes an inner portion 18 that is located inside the cavity 14 of the outer portion 12. The inner portion 18 includes an outer surface and an inner surface. The inner surface of the outer portion 12 closely conforms to the outer surface of the inner portion 18. The foam inner portion 18 is connected to the outer portion 12. In the variation shown in FIGS. 1A-1D, the foam inner portion 18 is connected to the outer portion 12 near the proximal end of the fallopian tube and is configured to represent an ectopic pregnancy and as such is dark in color such as black or brown. The inner portion 18 is made of foam material. The foam material can be urethane foam, silicone foam or any other suitable foam. If urethane foam is used for the inner portion 18, the silicone outer portion 12 will not stick as much to the urethane foam and the silicone outer portion 12 will be more easily removable relative to the inner portion 18 making it advantageous for facilitating and simulating surgical removal of the simulated ectopic pregnancy. If silicone foam is used for the inner portion 18, the silicone outer portion 12 will stick more to the silicone foam inner portion 18 and the silicone outer portion 12 will be harder to remove relative to the inner portion 18 making it advantageous for increasing the level of difficulty and surgical skill required in removing the simulated ectopic pregnancy. The inner portion 18 has a longitudinal axis, an outer perimeter and a width or outer diameter defined by the outer perimeter measured perpendicular to the longitudinal axis. The outer diameter of the inner portion 18 is equal to or less than the width or inner diameter of the outer portion at the same position along the longitudinal axis. The length of the inner portion 18 is shorter than the outer portion 12 along the longitudinal axis. The outer portion 12 at a location either proximal to the proximal end of the inner portion 18 or distal to the distal end of the inner portion 18 has a width or inner diameter that is smaller than the width or outer diameter of the proximal end of the inner portion or has a width or inner diameter that is smaller than the width or outer diameter of the distal end of the inner portion, respectively. In another variation as shown in FIGS. 1A-1D, the outer portion 12 at a location proximal to the proximal end of the inner portion 18 and distal to the distal end of the inner portion 18 has a width or inner diameter that is smaller than the width or outer diameter of the proximal end of the inner portion and has a width or inner diameter that is smaller than the width or outer diameter of the distal end of the inner portion, respectively. Such a configuration, encapsulates the inner portion 18 within the outer portion preventing its migration along the longitudinal direction. The inner portion 18 is captured between constrictions in the outer portion at opposite ends of the inner portion.

Turning now to FIGS. 2A-2D, there is shown various views of an inner portion 18 made of foam material. The inner portion 18 has an outer surface and an inner surface. The outer surface is bulbous in shape. The inner portion 18 includes a lumen 20 defined by the inner surface. The lumen 20 extends between a proximal opening 22 at the proximal end and a distal opening 24 at the distal end. The lumen 20 is configured to fit over a mandrel. As such, at least part of the lumen 20 has a non-circular cross-section so that inner portion 18 does not move with respect to the mandrel when the mandrel rotates. The cross-sectional shape of the lumen 20 is hexagonal although the invention is not so limited and the cross-section can be elongate, a slot, triangular, square, pentagonal or any other shape that keeps the foam inner portion from spinning freely while on the mandrel. Means other than the cross-sectional shape of the lumen 20, such a pin or other locking device, can be employed to secure the foam inner portion 18 to the mandrel 20.

Figure 3A:
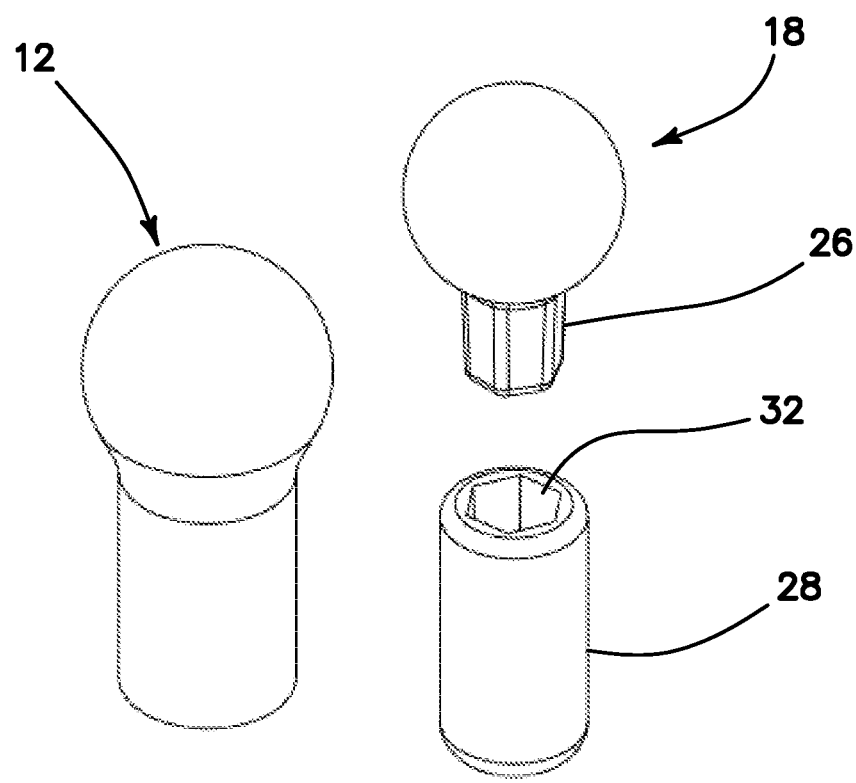
FIG. 3A is an exploded, top perspective view of an inner portion, an outer portion, adapter and mandrel according to the present invention.
Figure 3B:
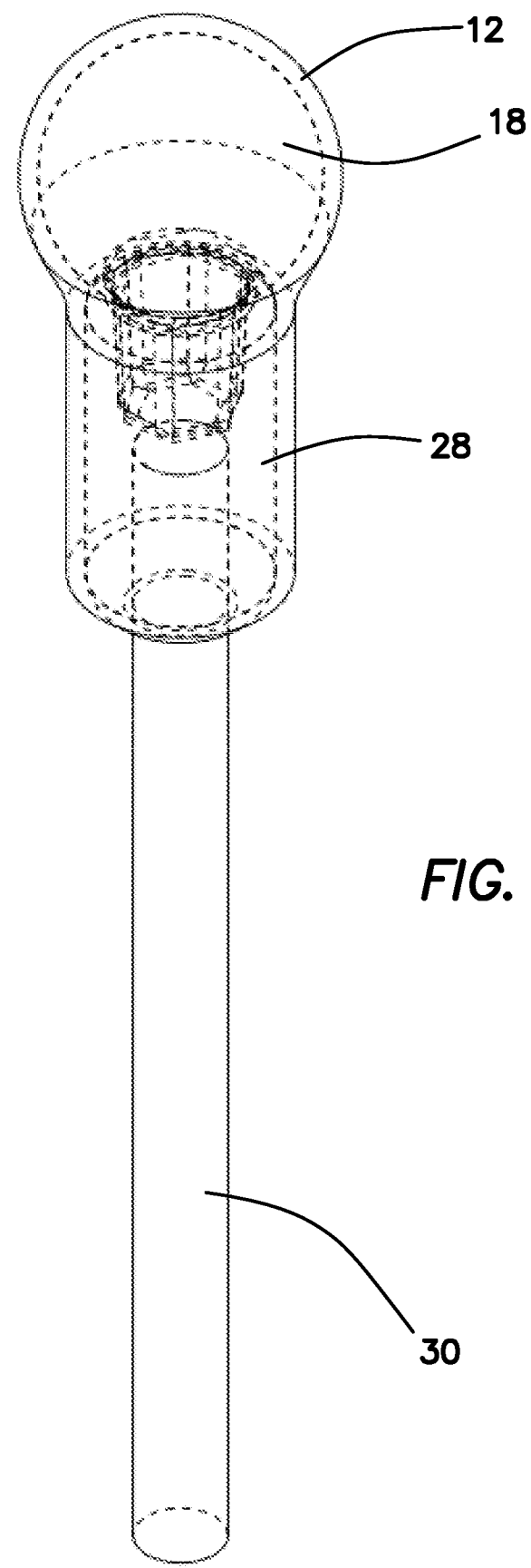
FIG. 3B is a top perspective view of an inner portion, outer portion adapter and mandrel according to the present invention.
Figure 3C:
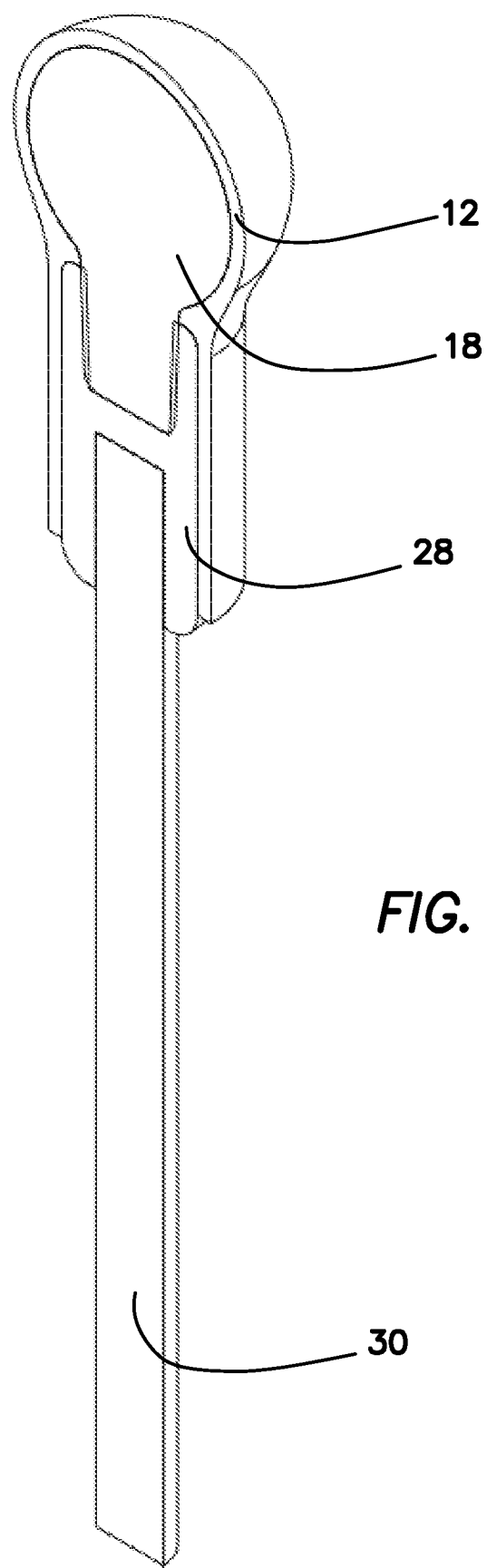
FIG. 3C is a top perspective, cross-sectional view of an inner portion, outer portion, adapter and a mandrel according to the present invention.
Figure 3D:
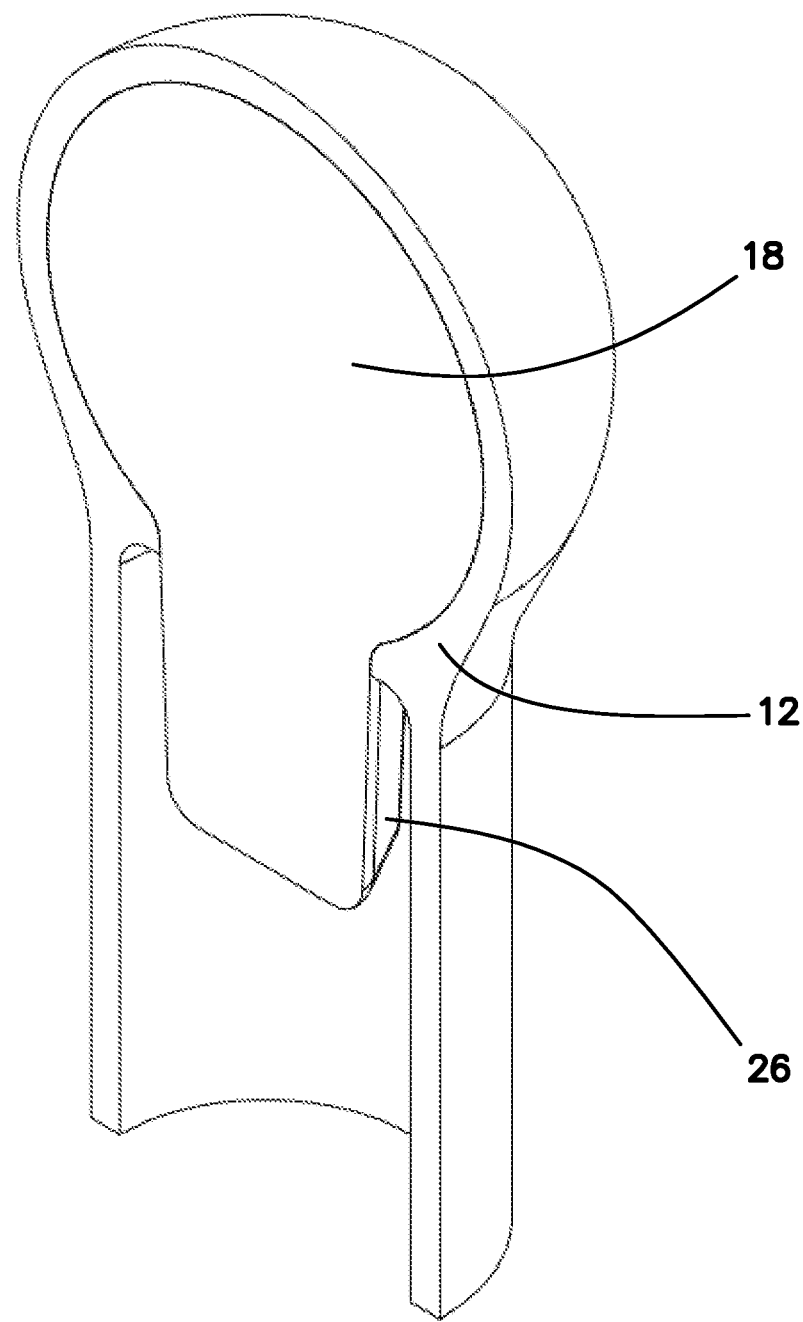
FIG. 3D is a top perspective, cross-sectional view of an inner portion and outer portion according to the present invention.
Figure 3E:
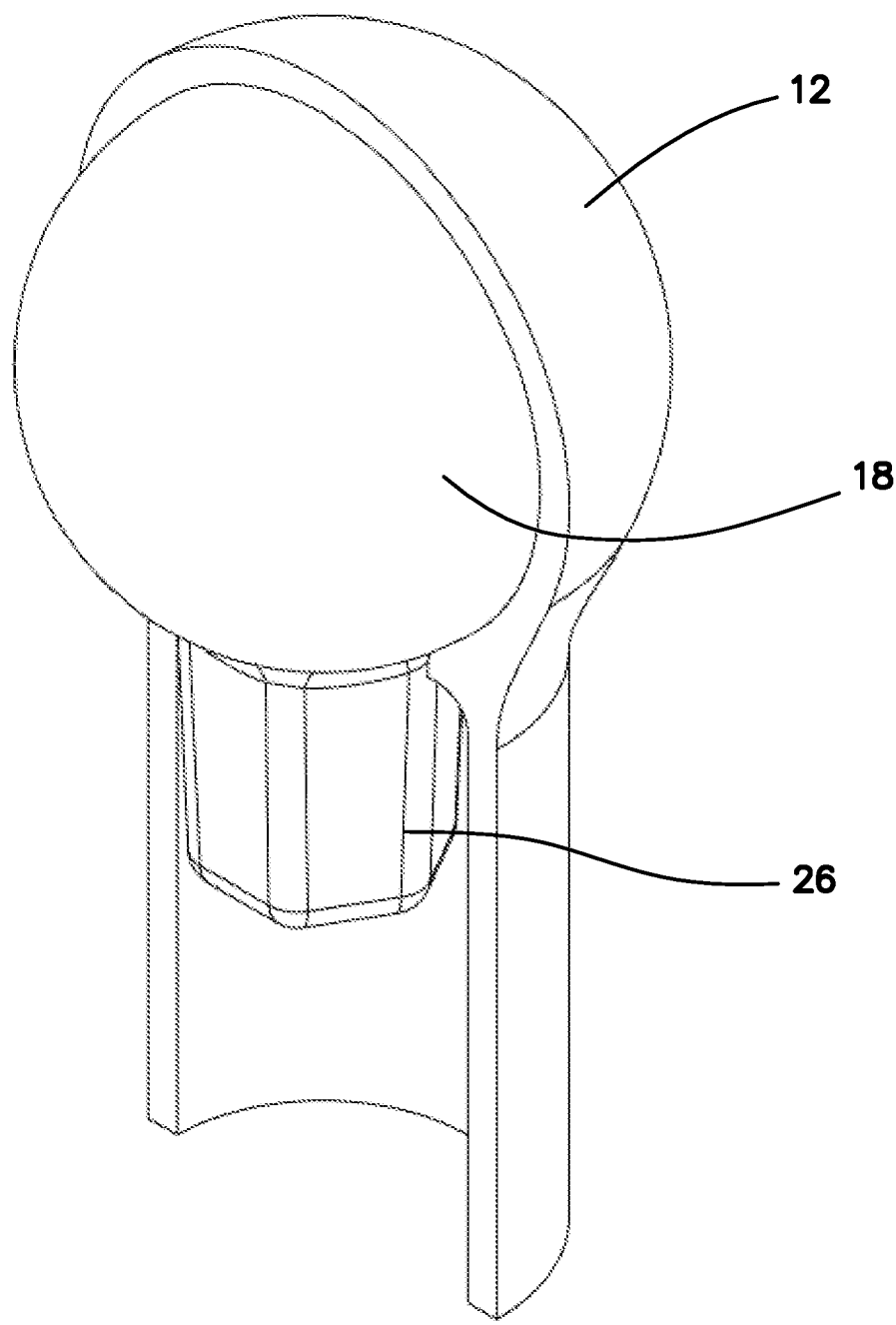
FIG. 3E is a top perspective, partial cross-sectional view of an inner portion and outer portion according to the present invention.

Alternatively, and turning now to FIGS. 3A-3E, the inner portion 18 may or may not have a lumen 20 configured to mount onto a mandrel. Instead, the inner portion 18 is formed with a male boss 26 as shown in FIGS. 3A-3E. The male boss 26 includes an outer surface that has a non-circular cross-section. The cross-section of the male boss 26 taken perpendicular to the longitudinal axis is elongate, a slot, triangular, square, pentagonal, hexagonal or any other shape that keeps the inner portion from spinning freely while on the mandrel 30. The mandrel 30 is a standard elongate cylindrical rod with a circular cross-section as shown in FIGS. 3A-3C. An adapter 28 is provided and configured to connect to the distal end of the mandrel 30. The adapter 28 includes a female boss 32 having a shaped that is sized and configured for receiving the male boss 26 of the inner portion 18 to secure the inner portion 18 to the mandrel 30 such that the inner portion 18 does not rotate relative the mandrel 30 during the manufacturing process when the mandrel 30 is rotating. The foam inner portion 18 and the mandrel 30 are configured to have interlocking geometry between the mandrel 30 and the inner portion 18. The geometry is achieved during the design process and is incorporated into the molds used to manufacture both the forming mandrels and the foam inner portion 18. The shape between the two can be any geometry that keeps the components from freely spinning on each other. FIGS. 3D-3E shows the outer portion 12 connected to the inner portion 18 in a final product removed from the mandrel 30.

The method of manufacturing the simulated tissue structure 10 will now be described. A mandrel 30 is used to manufacture the simulated anatomy. The mandrel 30 is typically connected to motor that rotates the mandrel 30 about its longitudinal axis. A mold, typically a mold having a desired shape such as a shape of an anatomical portion to be formed, is attached to the mandrel 30. When the motor is turned on, the mandrel 30 rotates and uncured silicone such as uncured PCRTVS is applied to the rotating mold that is connected to the mandrel 30. As the uncured silicone begins to cure, it assumes the shape of the underlying mold. Uncured silicone is applied such as by painting layers, spraying, or dipping the mold. When the application of silicone is completed, the uncured silicone is allowed to cure and then the resulting simulated tissue structure 10 is removed from mold and the mandrel 30 to create a hollow tissue structure of a desired shape. Typical hollow organs that can be created using this method include rectums, ovaries, fallopian tubes, vasculature, uteri and other organs.

Figure 4:
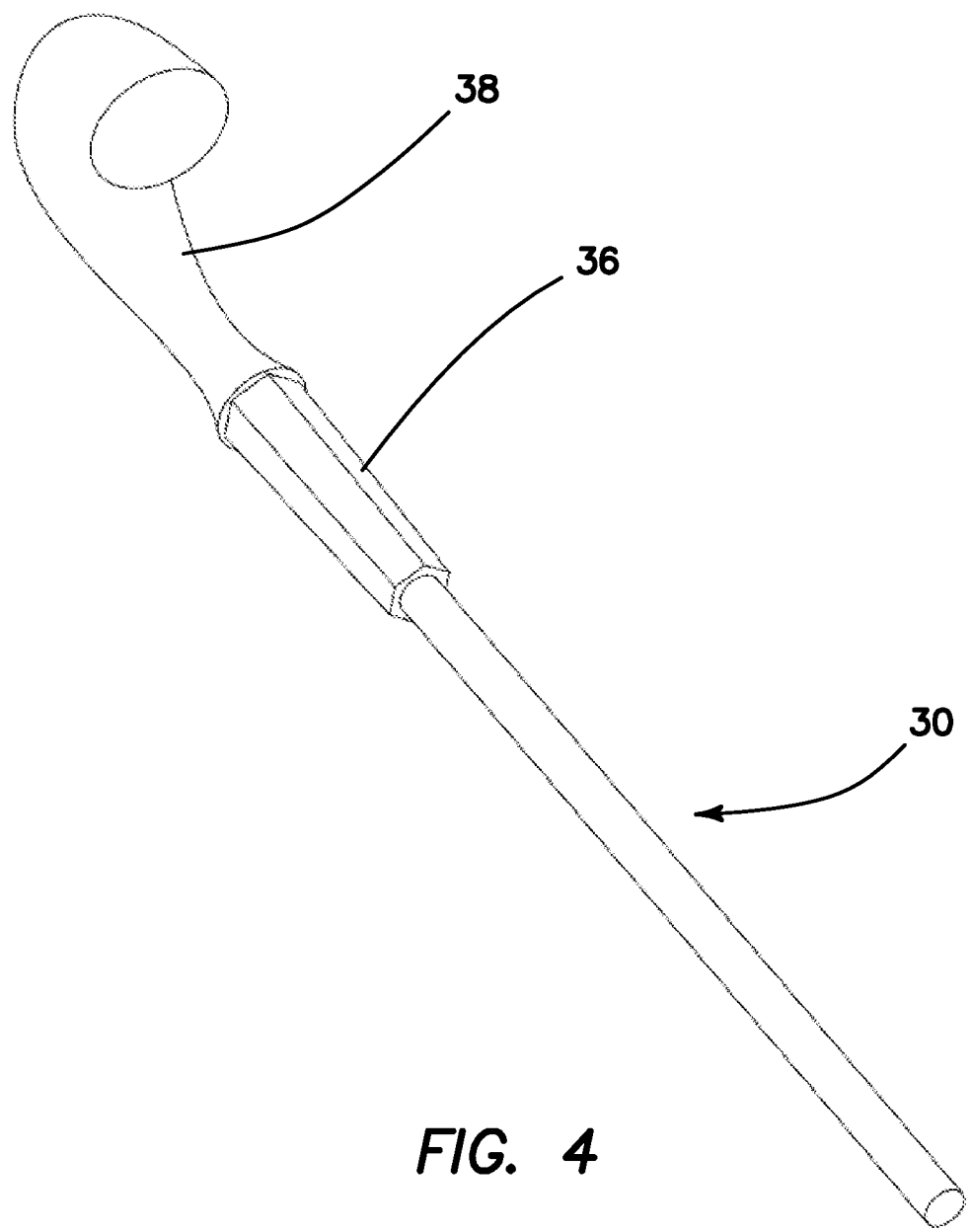
FIG. 4 is top perspective view of a mandrel according to the present invention.

Turning now to FIG. 4, there is shown a mandrel 30 according to the present invention. The mandrel 30 is an elongate cylindrical rod having a circular cross-section at the proximal end or other-shaped proximal end configured for connection to a motor. At least part of the mandrel 30, the interlocking portion 36, is configured to interlock with a pre-formed foam inner portion 18. The interlocking portion 36 is configured to be inserted into a complementary-shaped lumen 20 of the foam inner portion 18. In one variation, the interlocking portion 36 has a hexagonal cross-section that is sized to fit inside a lumen 20 having a hexagonal cross-section. The foam inner portion 18 is designed to be part of the final simulated tissue structure 10. In one variation of the mandrel 30, the mandrel 30 includes at least one anatomical portion 38. In the variation shown in FIG. 4, the anatomical portion 38 is located at the distal end of the mandrel 30 and the interlocking portion 36 is located proximal to the anatomical portion 38 along the longitudinal axis and the cylindrical portion of the mandrel 30 is located proximal to the interlocking portion 36. The anatomical portion 38 is configured to represent at least part of an anatomy. In particular, the anatomical portion 38 is configured to mimic a hollow part of an anatomy. In FIG. 4, the anatomical portion 38 is configured to simulate a fallopian tube or distal end of a fallopian tube of a female human anatomy. As such, the anatomical portion 38 is curved and has a larger diameter distal end. The anatomical portion 38 is connected to the mandrel 30 at a location distal to the interlocking portion 36 although the invention is not so limited and the interlocking portion may be located in between two anatomical portions 38 or be formed as part of the anatomical portion 38. The portion of the mandrel 30 that is proximal to the interlocking portion 36 also serves as a second or proximal anatomical portion 38 such as the proximal end of a fallopian tube.

Figure 5:
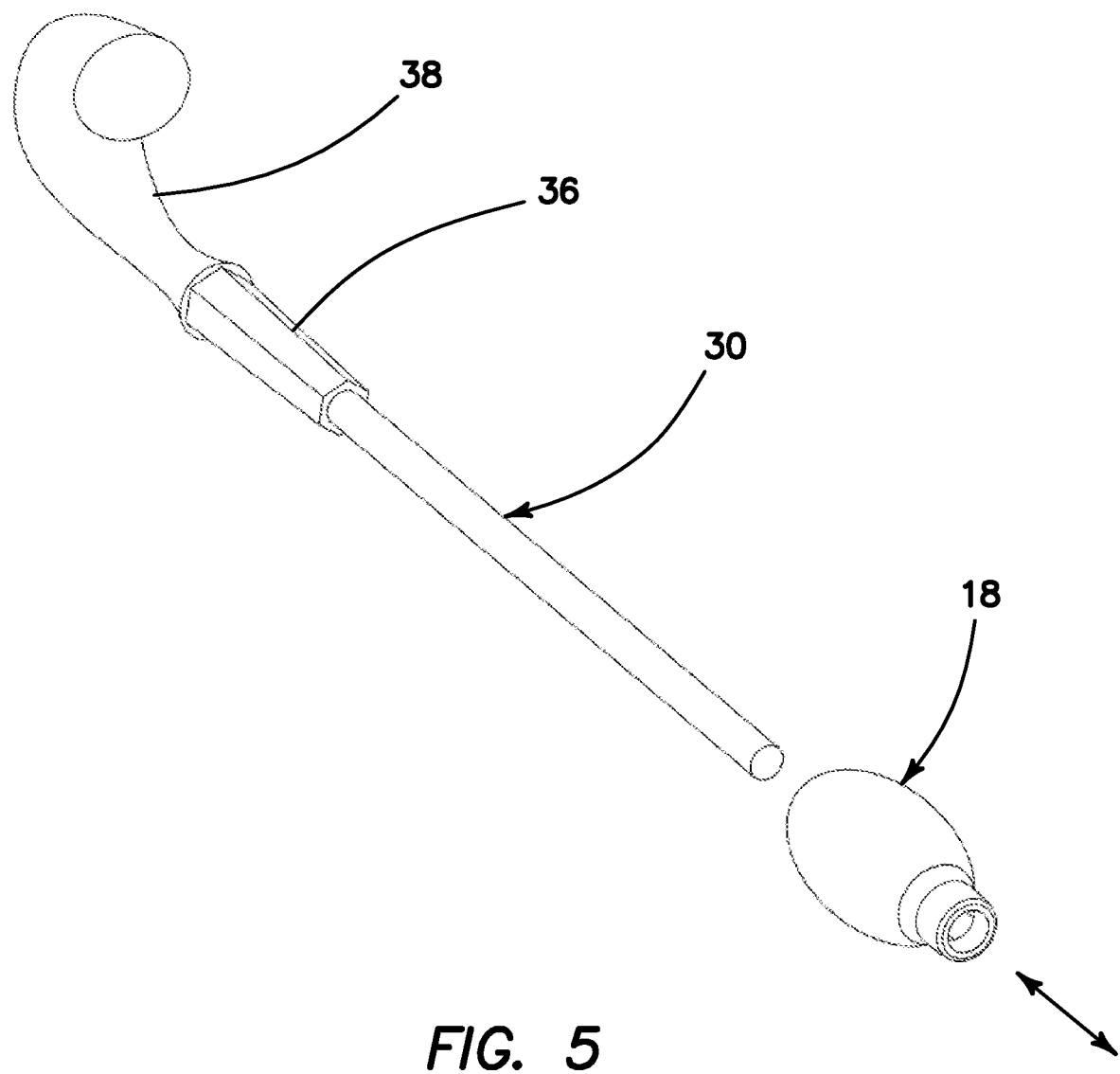
FIG. 5 is a top perspective view of a portion of a mandrel and inner portion according to the present invention.
Figure 6:
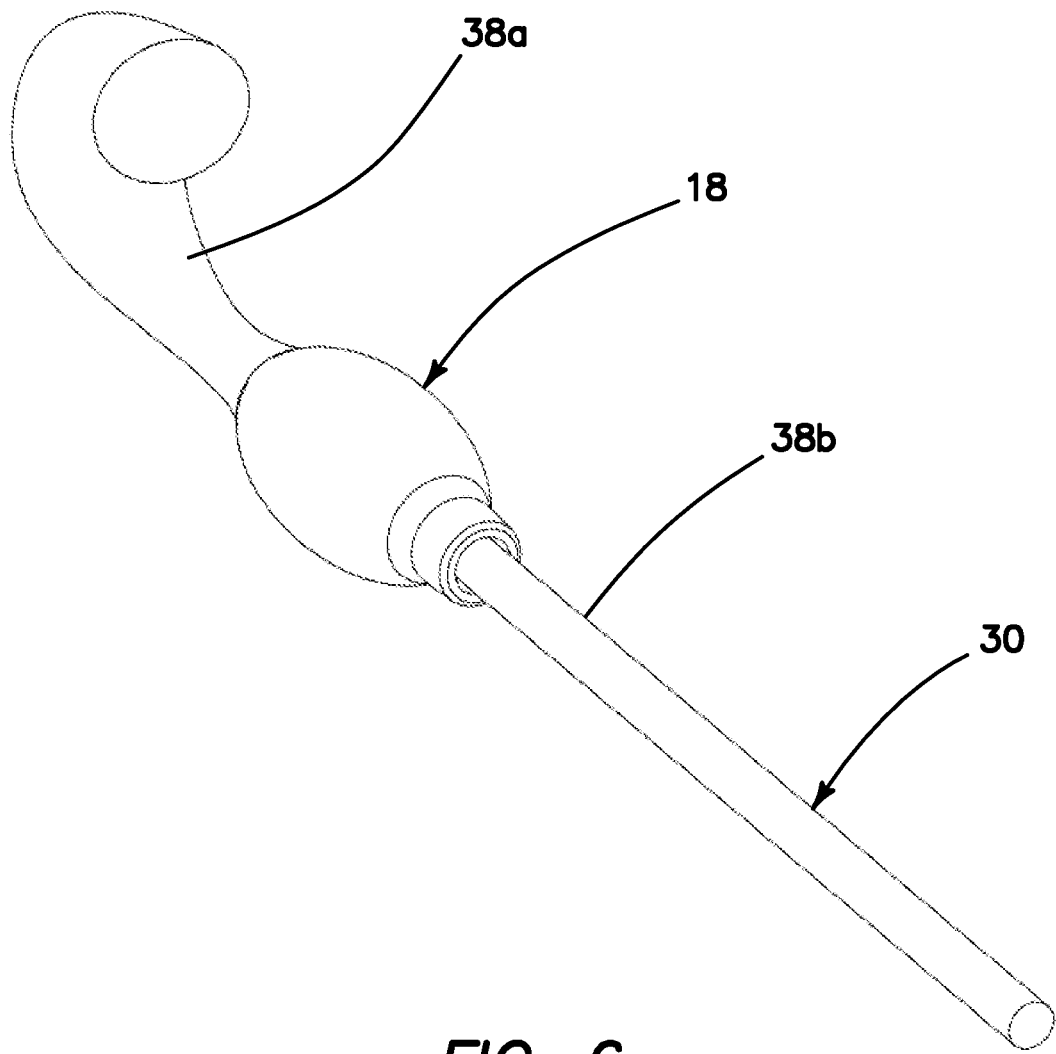
FIG. 6 is a top perspective view of a portion of a mandrel and inner portion according to the present invention.
Figure 7B:
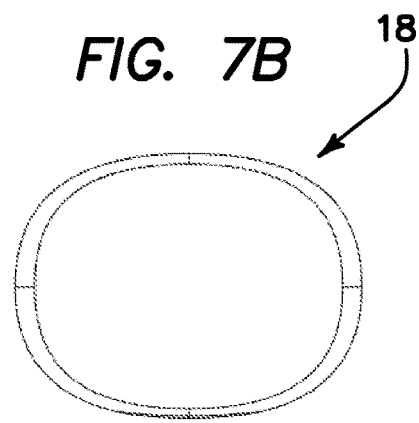
FIG. 7B is a top view of an inner portion according to the present invention.
Figure 7A:
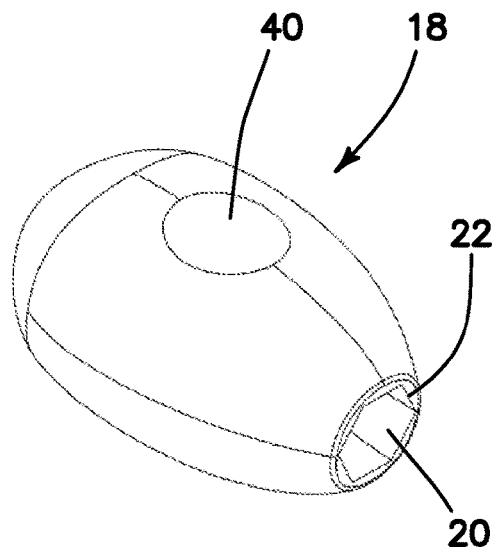
FIG. 7A is a top perspective view of an inner portion according to the present invention.
Figure 7D:
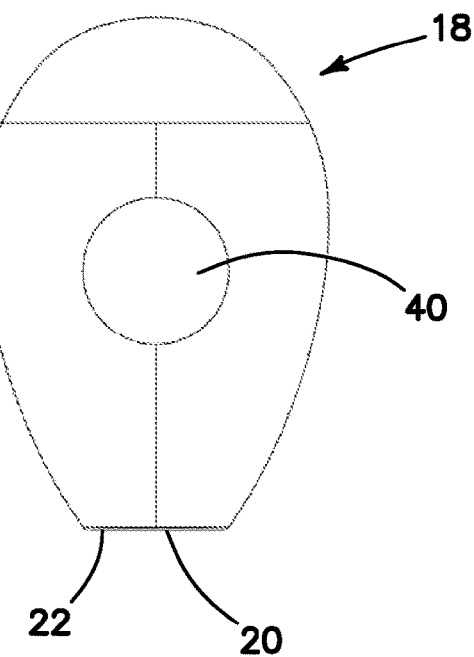
FIG. 7D is a side view of an inner portion according to the present invention.
Figure 7C:
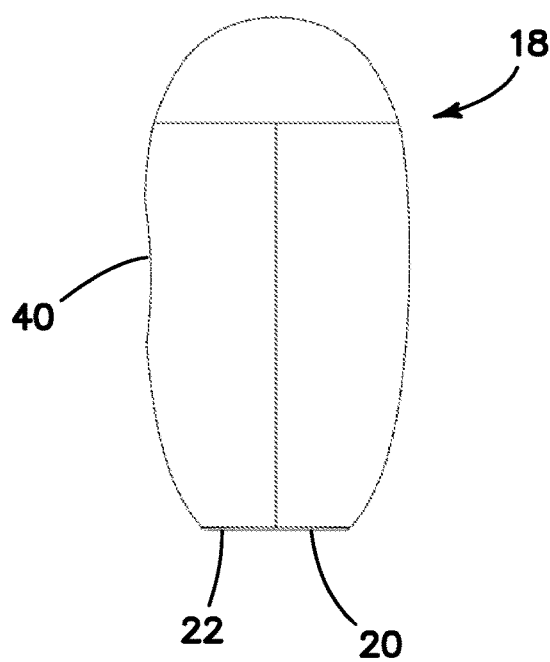
FIG. 7C is a side view of an inner portion according to the present invention.

Turning now to FIG. 5, there is shown a mandrel 30 in juxtaposition with an inner portion 18 according to the present invention. The inner portion 18 of FIG. 5 is shaped like an ectopic pregnancy of FIGS. 2A-2D. The proximal end 34 of the mandrel 30 is inserted into the distal opening 24 of the lumen 20 of the inner portion 18. The inner portion 18 is moved along the cylindrical portion of the mandrel 30 toward the interlocking portion 36. The inner portion 18 slides along the longitudinal axis of the mandrel 30. The hexagonal shape of the interlocking portion 36 of the mandrel 30 is aligned with the hexagonal shape of the lumen 20 of the inner portion 18 and the interlocking portion 36 of the mandrel 30 is inserted into the lumen 20 of the inner portion 18. The inner portion 18 securely locks onto the mandrel 30 with a slight interference fit which prevents it from rotating relative to the mandrel 30 or easily sliding distally or proximally along the mandrel 30. The mandrel 30 is connected to the inner portion 18 in the location of the interlocking portion 36 via an interference fit as shown in FIG. 6. The mandrel 30 and the attached inner portion 18 are then connected to a motor (not shown) configured to receive and connect with the proximal end of the mandrel 30. The motor is configured to rotate the mandrel 30 and the attached inner portion 18 about its longitudinal axis.

As the mandrel 30 and attached inner portion 18 is rotated, uncured silicone such as PCRTVS is applied to cover at least the anatomical portion 38A and inner portion 18 and where applicable, a second anatomical portion 38B that is proximal to the interlocking portion 36 as shown in FIG. 6. As the mandrel 30 rotates, more uncured silicone is applied to achieve a desired thickness of material that will form the outer portion 12. The uncured silicone begins to cure and additional uncured silicone can be continuously applied. The uncured silicone is applied on and over the mandrel 30 and inner portion 18 together. Uncured silicone may be applied with a brush, spray, by dipping or other manner. Rotation of the mandrel 30 prevents the silicone from curing to form unevenly covered areas. After the silicone is cured, the outer portion 12 is formed comprising the silicone layer about the mandrel 30. Hence, the outer surface of the inner portion 18 will define the size and shape of at least part of the inner surface of the outer portion 12 and the outer surface of the anatomical portion 38 will define the size and shape of at least part of the inner surface of the outer portion 12 in a substantially continuous manner such that both the inner portion 18 and the anatomical portion(s) 38 define the size and shape of the outer portion 12. The anatomical portion 38 is adjacent to the inner portion 18 located on the mandrel 30 and the outer portion of uncured silicone is applied to both in a seamless way to form a unitary simulated tissue structure 10. The inner portion 18 is removable from the mandrel 30 together with the outer portion 18 whereas the anatomical portion 38 of the mandrel 30 remains fixed to the mandrel 30. Hence, uncured silicone is applied to the inner portion 18 that is removable from the mandrel 30 and becomes integral with and attached to the outer portion 12 wherein the anatomical portion 38 which serves as a mold for at least another portion of the outer portion 12 is not removable from the mandrel 30 at least when the outer portion 12 and inner portion 18 are being removed.

Once the silicone cures, the outer portion 12 on the second anatomical portion 38B is rolled along the mandrel 30 towards the inner portion 18 or proximal end of the mandrel 30 and then the inner portion 18 and silicone outer portion 12 can be easily removed from the mandrel 30 as a single unit. The rolling of proximal end of the outer portion 12 helps to relieve any frictional forces between the outer portion 12 and the mandrel 30 to facilitate removal of the final anatomical model. As explained earlier, if the inner portion 18 is made of silicone foam then the uncured silicone will, as it cures, interlock, attach and connect with the silicone foam more strongly than if the inner portion 18 was made of urethane foam. This stronger bond will help in removing the silicone outer layer 12 and the attached inner portion 18 together more easily. Mold release or resist can be applied to the anatomical portion 38 and cylindrical portion of the mandrel 30 to facilitate removal of the outer portion 12 and inner portion 18 resulting in the simulated tissue structure 10 of FIG. 1.

This method can be used to make fallopian tubes with ectopic pregnancies as just described above wherein the inner portion 18 simulates an ectopic pregnancy and the silicone outer portion 12 simulates the fallopian tube. The process can be used to make a wide range of other anatomies. The method adapted for making ovaries and ovaries with cysts with fallopian tubes will be described hereinbelow. Other anatomies that can be simulated include healthy and fibroid uteri. The foam of the inner portion 18 can be rigid or flexible and, as described above, it can be made of urethane, silicone or other material. Also, the simulated tissue could be any material other than silicone that can be applied to a mandrel by dipping, painting, spraying, etc.

Also, the method can be combined with a the steps of providing a mesh sleeve, for example, made of nylon mesh, placing the mesh sleeve onto the mandrel 30 and, applying the material of the outer portion 12 such as uncured silicone. The uncured silicone if applied to the mesh will pour over the mesh material and cure integrally into the mesh. Similarly, mesh applied to uncured silicone will cure integrally together. The mesh advantageously makes the outer portion 12 capable of holding sutures for the practice of suturing certain anatomies.

Turning now to FIGS. 7A-7D, there is shown various views of an inner portion 18 made of foam material. The inner portion 18 has an outer surface and an inner surface. The outer surface is bulbous in shape and configured to represent a human female ovary. The inner portion 18 includes a lumen 20 defined by the inner surface. The lumen 20 extends from the proximal opening 22 at the proximal end into the inner portion 18. The lumen 20 does not extend through the inner portion 18 and only has one opening 22 at the proximal end. The lumen 20 is configured to fit over a mandrel 30. As such, at least part of the lumen 20 has a non-circular cross-section so that inner portion 18 does not move with respect to the mandrel 30 when inner portion 18 is mounted on the mandrel 30 and the mandrel 30 rotates. The cross-sectional shape of the lumen 20 is hexagonal although the invention is not so limited and the cross-section can be elongate, a slot, triangular, square, pentagonal or any other shape that keeps the inner foam portion 18 from spinning freely while on the mandrel 30. Means other than the cross-sectional shape of the lumen 20, such as a pin or lock, can be employed to secure the foam inner portion 18 to the mandrel 20. Of course, the inner portion 18 may or may not have a lumen 20 configured to mount onto a mandrel. Alternatively, the inner portion 18 is formed with a male boss 26 as shown in FIGS. 3A-3C for connecting the inner portion 18 to the mandrel 30. The inner portion 18 of FIGS. 7A-7D Includes two flatter outer surfaces interconnected by two curved side surfaces. The shape of the cross-section taken perpendicular to the longitudinal axis of the inner portion 18 is oval, elliptical, elongated or otherwise has a longer length relative to its width. The outer surface of the inner portion 18 includes a dimple 40. The dimple 40 is a concavity formed in the outer surface of the inner portion 18. The dimple 40 is sized and configured to receive an artificial cyst, fibroid, or tumor (not shown). The artificial cyst, fibroid or tumor 42 is separately made to simulate a real cyst, fibroid or tumor and sized and configured to fit inside the dimple 40. The artificial cyst, fibroid or tumor can be made of silicone or foam and can be appropriately dyed to accurately represent the respective structure. The artificial cyst, fibroid or tumor 42 is placed with some adhesive if necessary into the dimple 40 and uncured silicone of the outer portion 12 is then applied to both the dimple insert and the inner portion 18. In another variation, dimples 40 are not provided and simulated cysts 42 are attached directly to the outer surface of the inner portion 18. In yet another variation, the simulated cysts 42 are formed integrally with the inner portion 18 and optionally of the same material as the inner portion 18.

Figure 8:
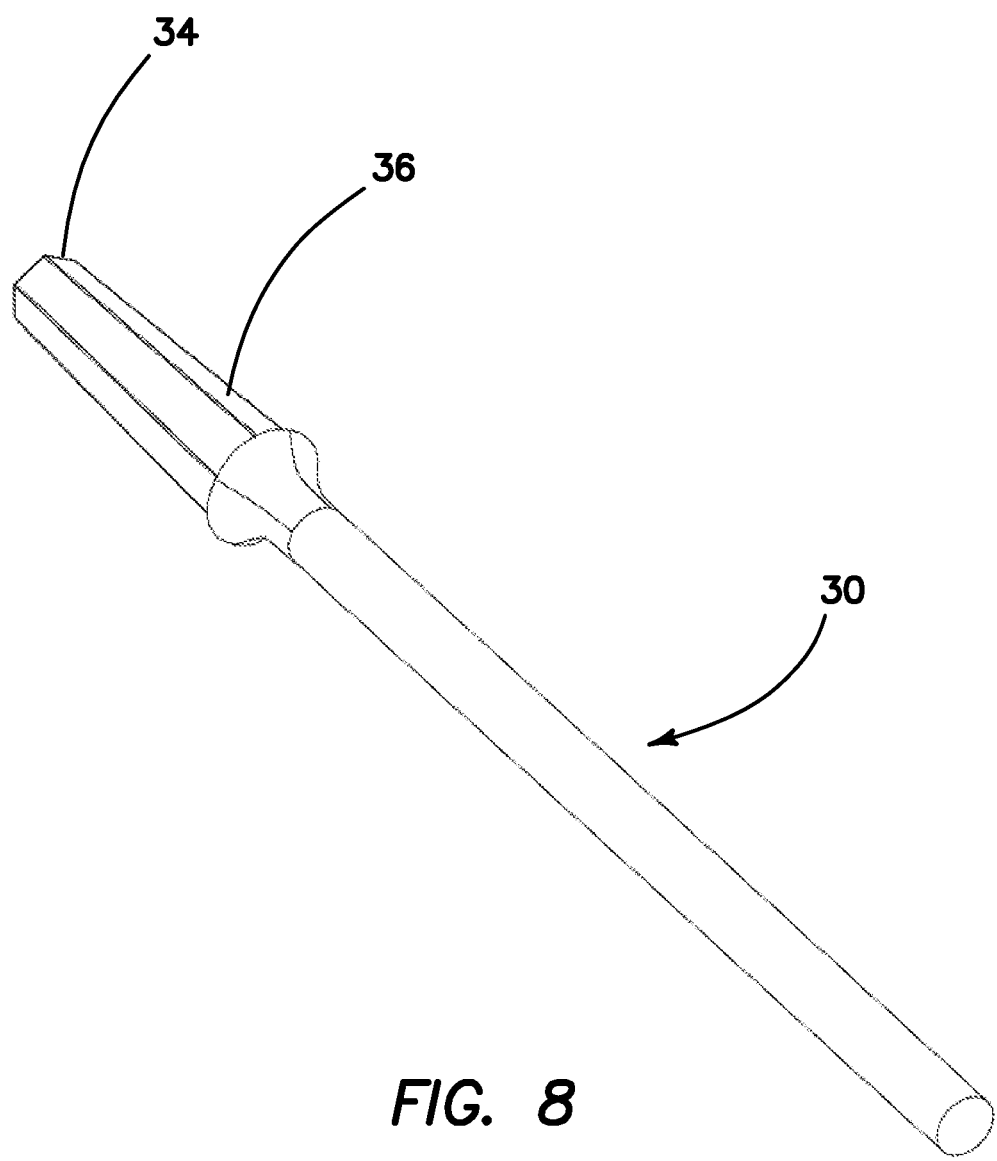
FIG. 8 is top perspective view of a mandrel according to the present invention.

Turning now to FIG. 8, there is shown a mandrel 30 according to the present invention. The mandrel 30 is an elongate cylindrical rod having a circular cross-section. The mandrel 30 includes an interlocking portion 36 configured to interlock with a pre-formed foam inner portion 18. In one variation shown in FIG. 8, the mandrel 30 includes an interlocking portion 36 located at the distal end 34 of the mandrel 30. The interlocking portion 36 is configured to be inserted into a complementary-shaped lumen 20 of the foam inner portion 18. In one variation, the interlocking portion 36 has a hexagonal cross-section that is sized to fit inside a lumen 20 having a hexagonal cross-section. The foam inner portion 18 is designed to be part of the final simulated tissue structure 10.

Figure 9:
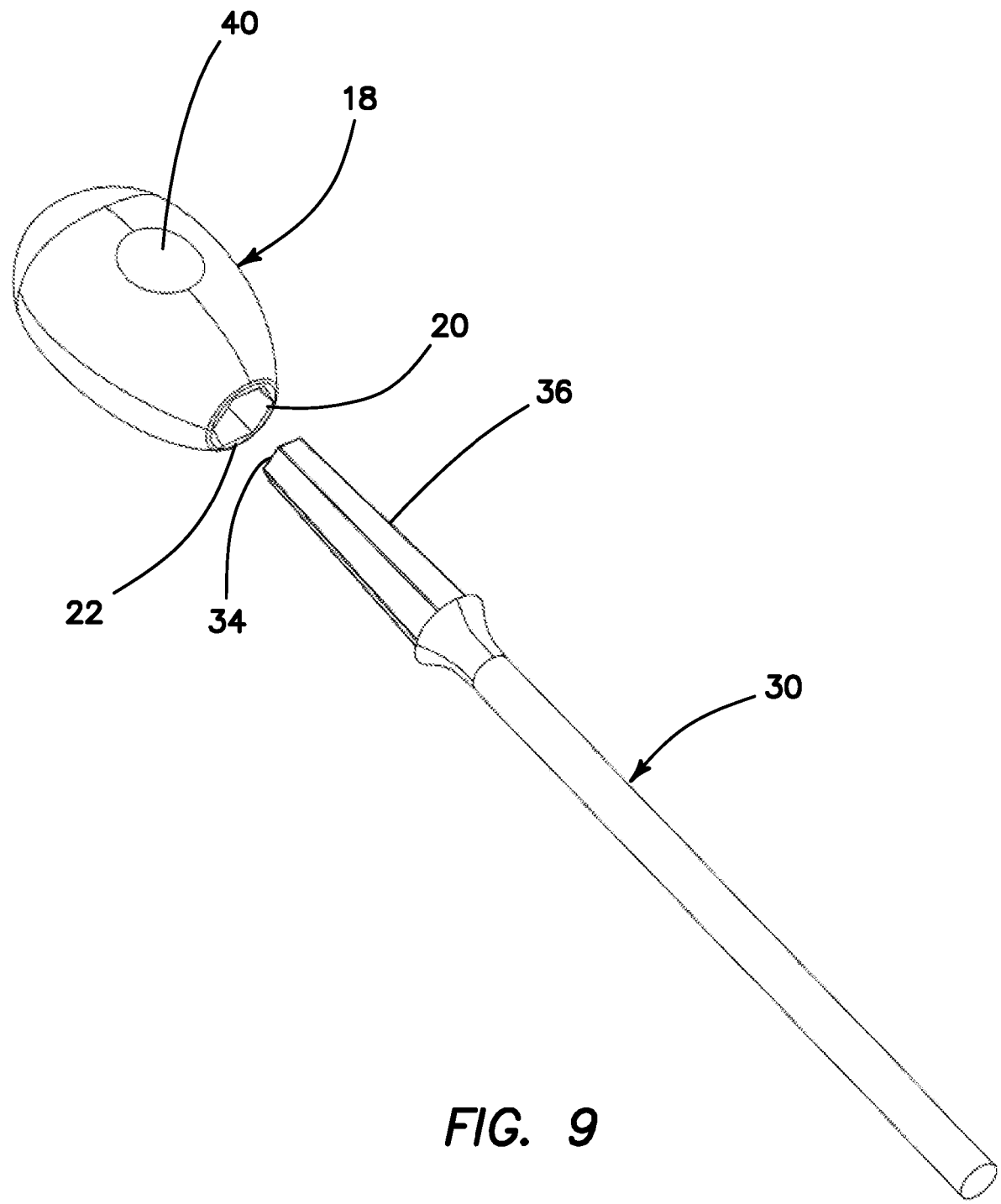
FIG. 9 is a top perspective view of a portion of a mandrel and inner portion according to the present invention.
Figure 10:
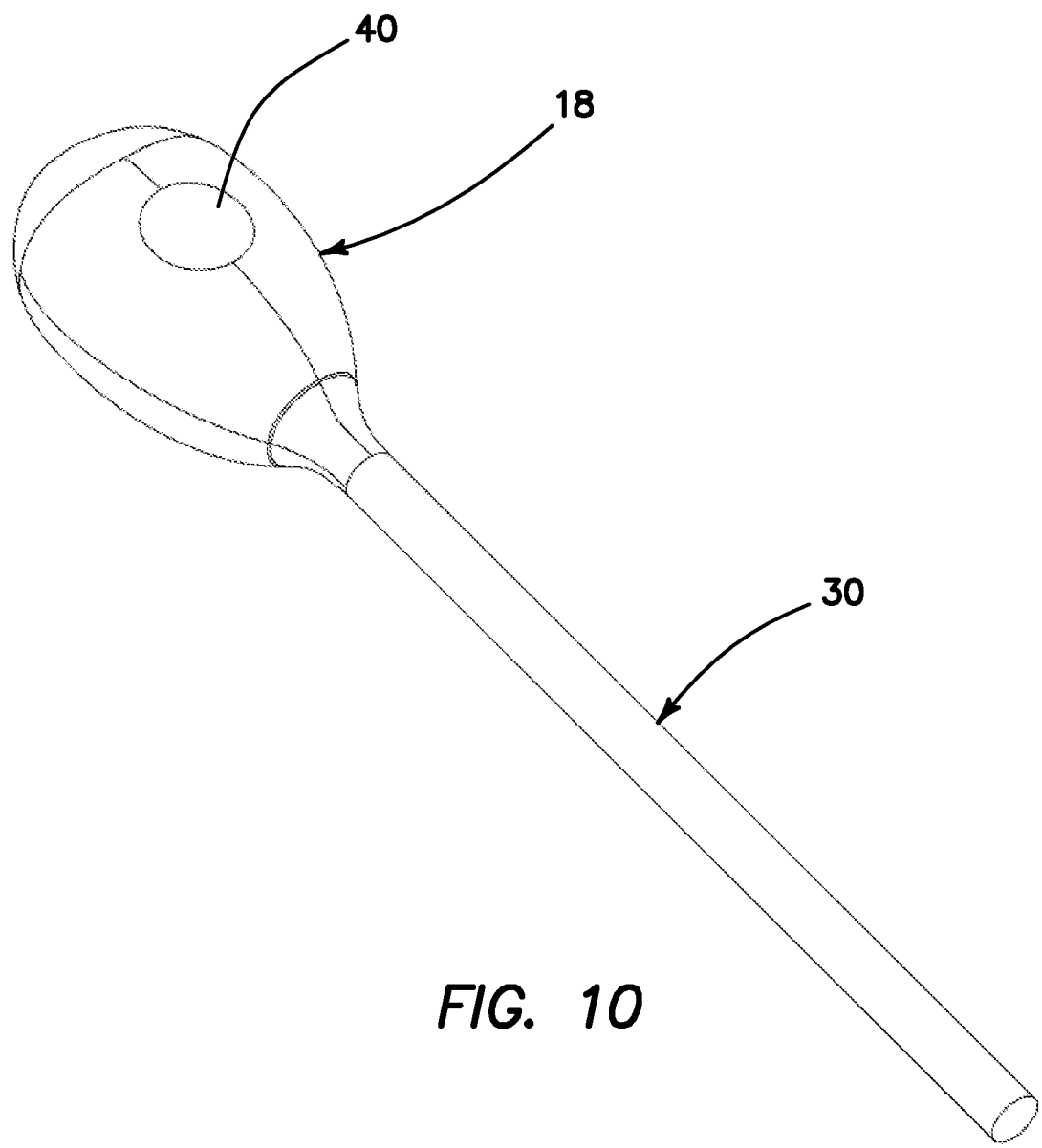
FIG. 10 is a top perspective view of a portion of a mandrel and inner portion according to the present invention.

Turning now to FIG. 9, there is shown a mandrel 30 in juxtaposition with an inner portion 18 according to the present invention. The inner portion 18 of FIG. 9 is shaped like an ovary of FIGS. 7A-7D. The distal end 34 of the mandrel 30 is inserted into the proximal opening 22 of the lumen 20 of the inner portion 18. The hexagonal shape of the distal end 34 of the mandrel 30 is aligned with the hexagonal shape of the lumen 20 of the inner portion 18 and the interlocking portion 36 of the mandrel 30 is inserted into the lumen 20 of the inner portion 18. The inner portion 18 securely locks onto the mandrel 30 with a slight interference fit. The mandrel 30 connected to the inner portion 18 via an interference fit is shown in FIG. 10. The mandrel 30 and the attached inner portion 18 are then connected to a motor (not shown) configured to receive and connect with the proximal end of the mandrel 30. The motor is configured to rotate the mandrel 30 and the attached inner portion 18 about its longitudinal axis.

Figure 11:
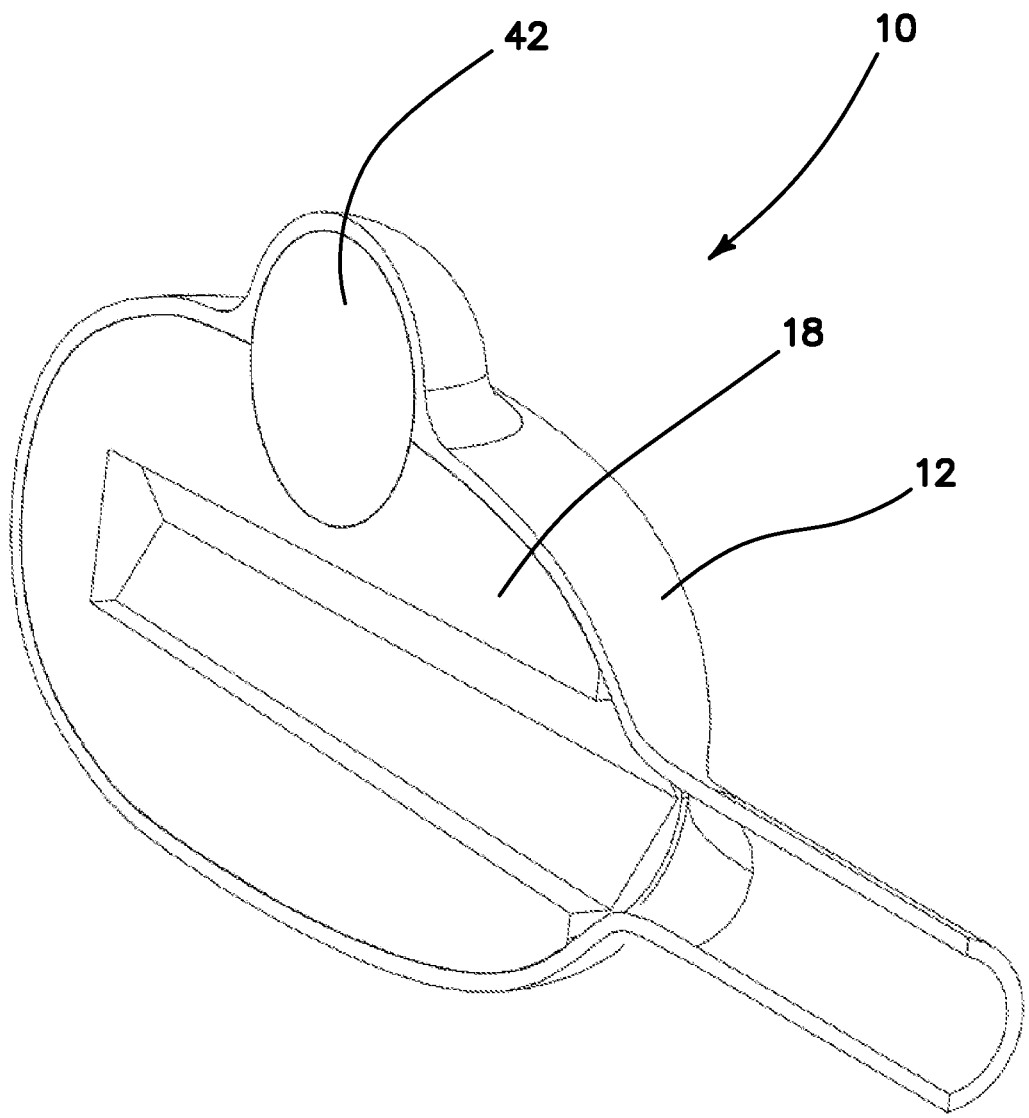
FIG. 11 is a top perspective, cross-sectional view of a simulated tissue structure according to the present invention.

A simulated cyst, tumor or other anatomical variation is placed in the dimple 40 and attached thereto or held in place with adhesive or with the simultaneous application of wet silicone constituting the outer portion 18. As the mandrel 30 and attached inner portion 18 and attached cysts are rotated uncured silicone, such as PCRTVS, is applied to cover at least the inner portion 18 and attached cysts. As the mandrel 30 rotates, more uncured silicone is applied to achieve a desired thickness of material. The uncured silicone begins to cure and additional uncured silicone can be continuously applied. The uncured silicone is applied on the inner portion 18 and may also be applied on the mandrel 30. Uncured silicone may be applied with by painting with a brush, spraying, dipping or other manner. Rotation of the mandrel 30 prevents the silicone from curing to form unevenly covered areas. After the silicone is completely cured, the outer portion 12 is formed comprising the silicone layer about the mandrel 30. Hence, the outer surface of the inner portion 18 will define the size and shape of at least part of the inner surface of the outer portion 12. Once the silicone cures, a portion of it at the mandrel 30 may be rolled distally along the longitudinal axis. The inner portion 18 may be grasped and pulled distally to remove the construct from the mandrel 30. The foam inner portion 18 and silicone outer portion 12 can be easily removed from the mandrel 30 as a single unit. The resulting simulated tissue structure 10 as removed from the mandrel 30 is illustrated in FIG. 11. As explained earlier, if the inner portion 18 is made of silicone foam, then the uncured silicone will, as it cures, interlock and connect with the silicone foam more strongly than if the inner portion 18 was made of urethane foam. This stronger bond will help in removing the silicone outer layer 12 and the attached inner portion 18 as a unit more easily. Mold release or resist can be applied to the mandrel 30 to facilitate removal of the outer portion 12 and inner portion 18 together resulting in the simulated tissue structure 10.

Figure 12:
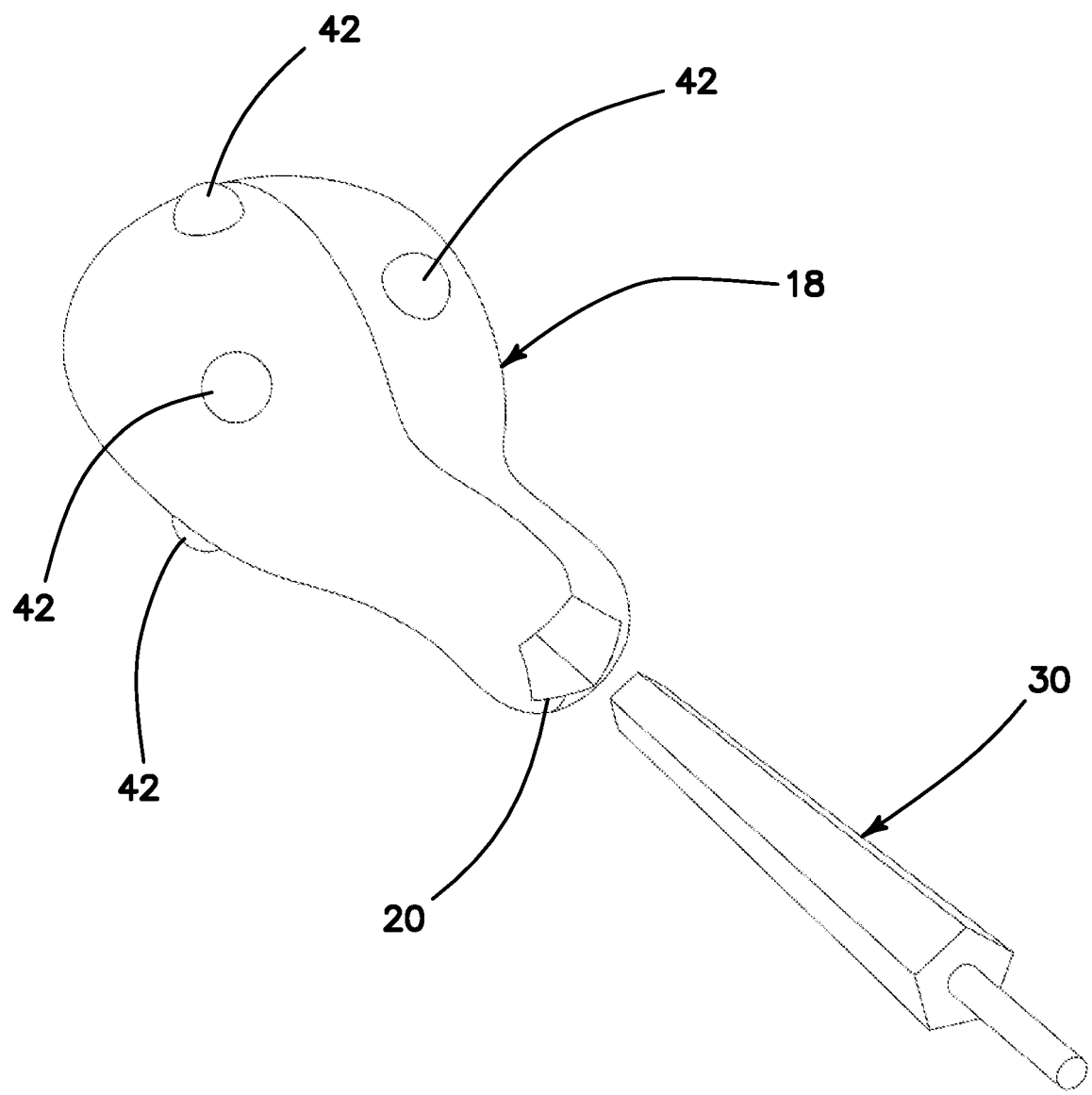
FIG. 12 is a top perspective view of an inner portion and a mandrel according to the present invention.
Figure 13:
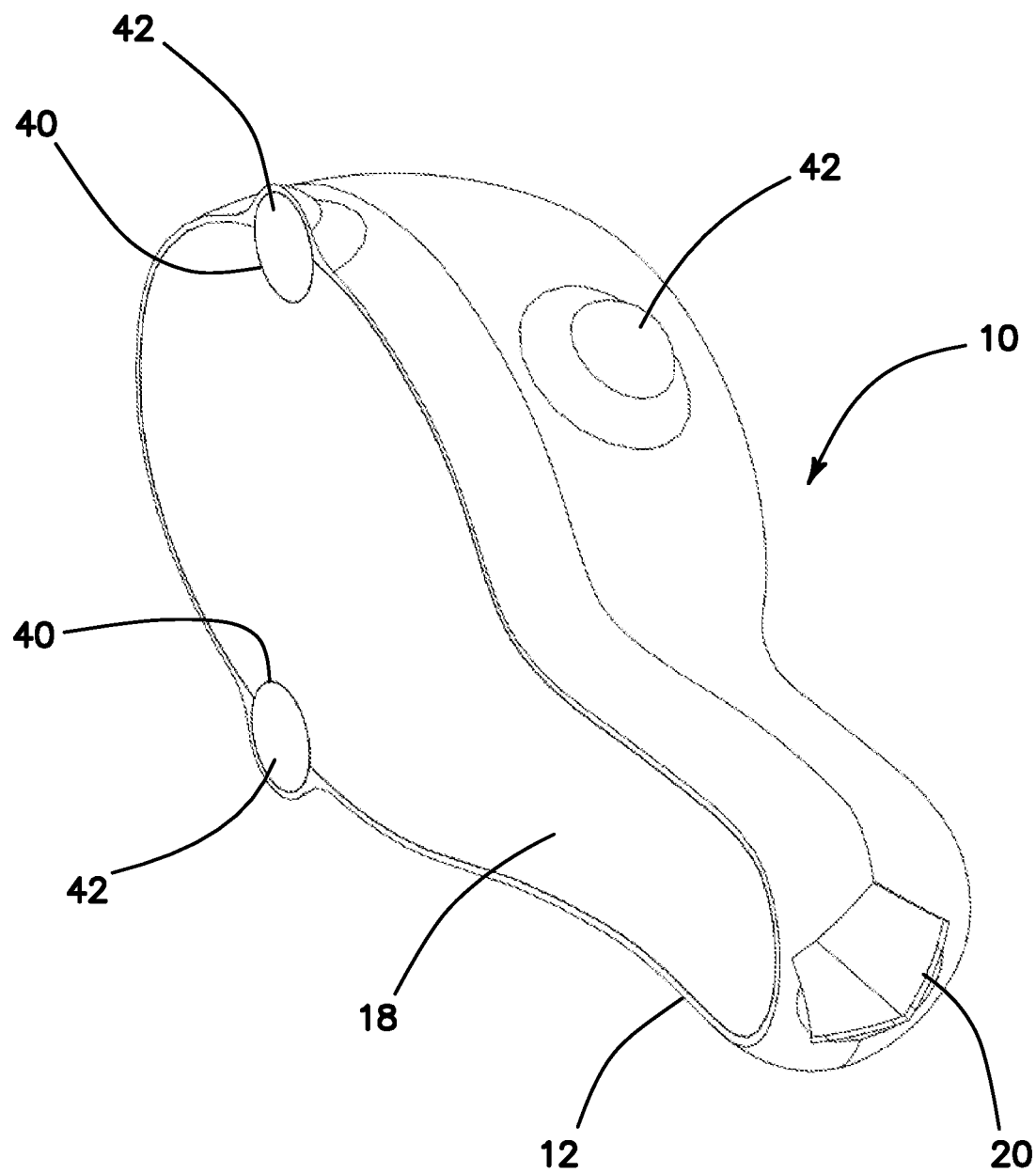
FIG. 13 is a top perspective, cross-sectional view of a simulated tissue structure according to the present invention.

Turning now to FIG. 12, there is shown another variation in which an inner portion 18 is sized and configured to resemble a uterus. The inner portion 18 is shown with one or more simulated cysts 42 attached to the inner portion 18 in the location of dimples 40 if dimples 40 are provided for seating the simulated cysts 42. It should be noted that simulated cysts are used interchangeably with tumor, fibroid, or other similar anatomical or general surgical target throughout the specification. The inner portion 18 includes a lumen 20 opening at the proximal end. The lumen 20 is sized and configured such that the inner portion 18 does not rotate relative to the mandrel 30. The mandrel 30 is shorter such that the proximal end of the resulting simulated tissue structure 10 is shaped substantially realistically. The same methods described above are utilized to form the resulting structure 10 shown in FIG. 13 in which the simulated tumors 42 are embedded between the outer portion 12 and the inner portion 18. The lumen 20 at the proximal end of the simulated tissue structure 10 simulates the uterine canal and since the inner portion 18 is made of foam a practitioner is able to grasp and pull on the simulated tissue structure during the simulated surgery without risk of tearing as would likely be the case if the inner portion made of silicone, for example. The practitioner will approach the target cysts 42 and cut through the outer portion 12 and dissect the cysts 42 from the simulated uterus 10.

The present invention creates a simulated tissue structure 10 that advantageously combines silicone material with foam material that are attached in an anatomically advantageous manner to represent ectopic pregnancies, cysts, fibroids, tumors or other anatomical portion in combination with a hollow anatomical structure. The method includes applying silicone directly onto the inner portion to form the outer portion and simultaneously mold the outer portion to the inner portion in an integral fashion to form a unitary construction. Otherwise, the silicone outer portion would have to be formed separately on a mandrel and removed once cured. Then, the formed hollow silicone structure would have to be cut open and a foam piece would then be inserted into the silicone structure. Cutting open the silicone structure would be the only way to accommodate a size and shape of foam material while retaining the anatomical characteristics such as narrowed tubular structures on one or more ends of the foam inner portion. After the foam inner portion is inserted, the cut silicone would then have to be glued back together to complete the anatomy in question creating an inferior simulated tissue structure. By using the foam inner portion 18 as part of the forming mandrel 30 that is removable and integrated into the simulated tissue structure, the present invention advantageously eliminates several steps in the manufacturing process including cutting open a hollow silicone shape, inserting a foam inner piece into the opening created by the cutting, and then gluing the opening closed when finished. Cutting the hollow shape is necessitated by the size of the inner portion relative to the surrounding tubular anatomical structure. Forcing a foam insert in through an opening in the hollow silicone shape would result in the silicone tearing during the process. Hence, the present invention solves many problems to create an ideal simulated tissue structure. Furthermore, removal of silicone material from a mandrel 30 is complicated because the silicone is notoriously sticky and complex shapes such as fallopian tubes with ectopic pregnancy can be exceedingly difficult to remove from the mandrel without incurring damage to the work-piece. The addition of the foam insert to the mandrel greatly reduces the difficult of removing the silicone part from the mandrel because part of the silicone part is attached to the foam insert which easily slides off the mandrel instead of to the mandrel directly. Portions of silicone attached to an anatomical portion 30 or cylindrical portion of the mandrel 30 can be first bunched near the foam inner portion and then the inner portion 18 can easily slide off of the mandrel 30. As previously mentioned, the foam can represent a separate component entirely such as a cyst, fibroid or tumor or just serve as a filler material or tissue layer of different density to help certain anatomy to retain a three-dimensional shape or define and replicate certain anatomical characteristics. Additionally, having the silicone cure on the foam adds an element of difficulty to simulated training procedures which can be desirable in certain situations as dissection between tissue planes is not always easy. The present invention provides a simulated tissue structure with all of these advantages. Also, as mentioned previously, variants can include different material selection for the inner portion 18 including varying densities of foam and plastics can be used depending on the desired feel of the anatomical component.

The simulated tissue structure 10 of the present invention is particularly suited for laparoscopic procedures and may be employed with a laparoscopic trainer; however, the invention is not so limited and the simulated tissue structure 10 of the present invention can be used alone to practice various surgical procedures equally effectively.

Figure 14A:
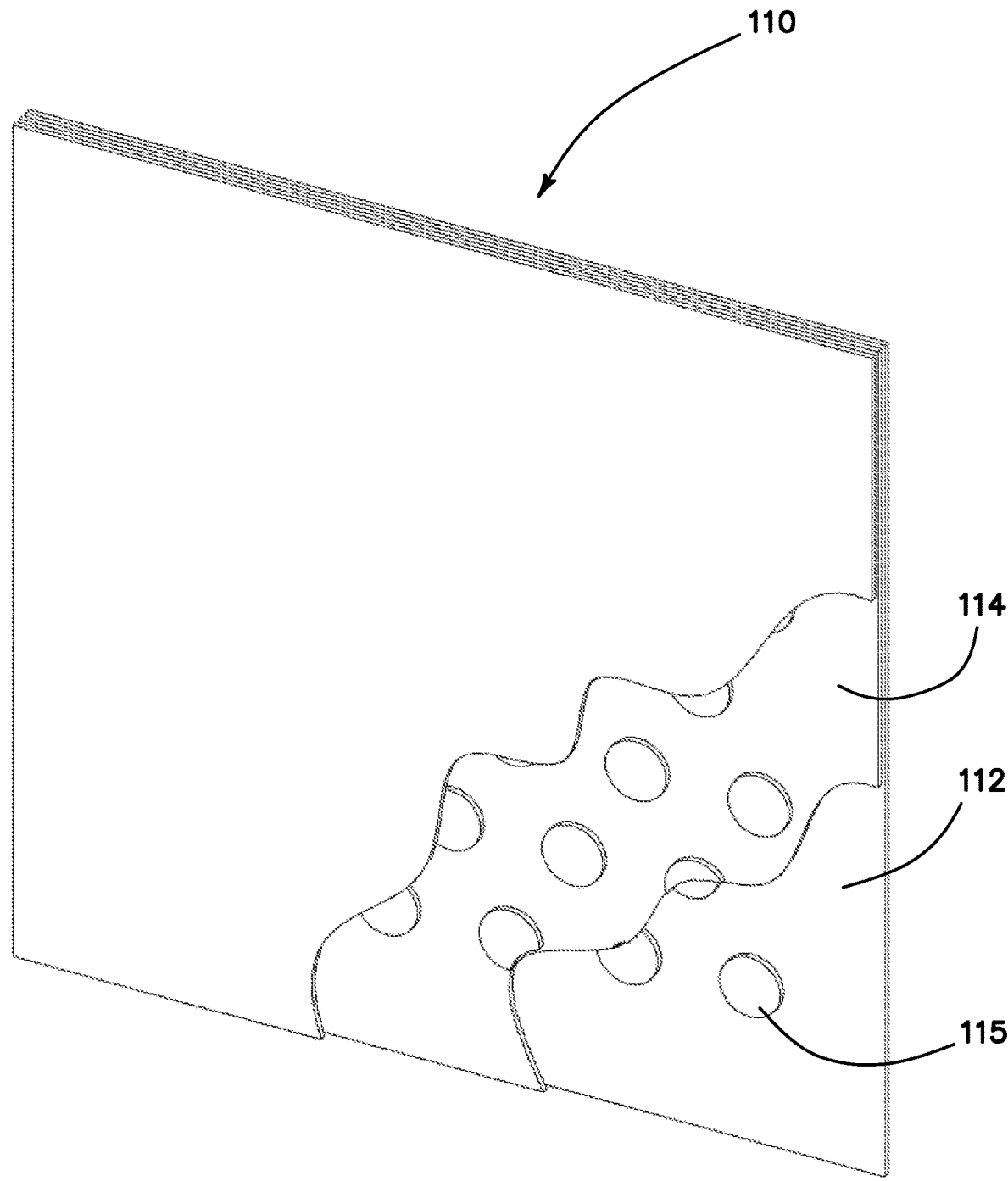
FIG. 14A is a top perspective, partial sectional view of a simulated tissue structure according to the present invention.
Figure 14B:
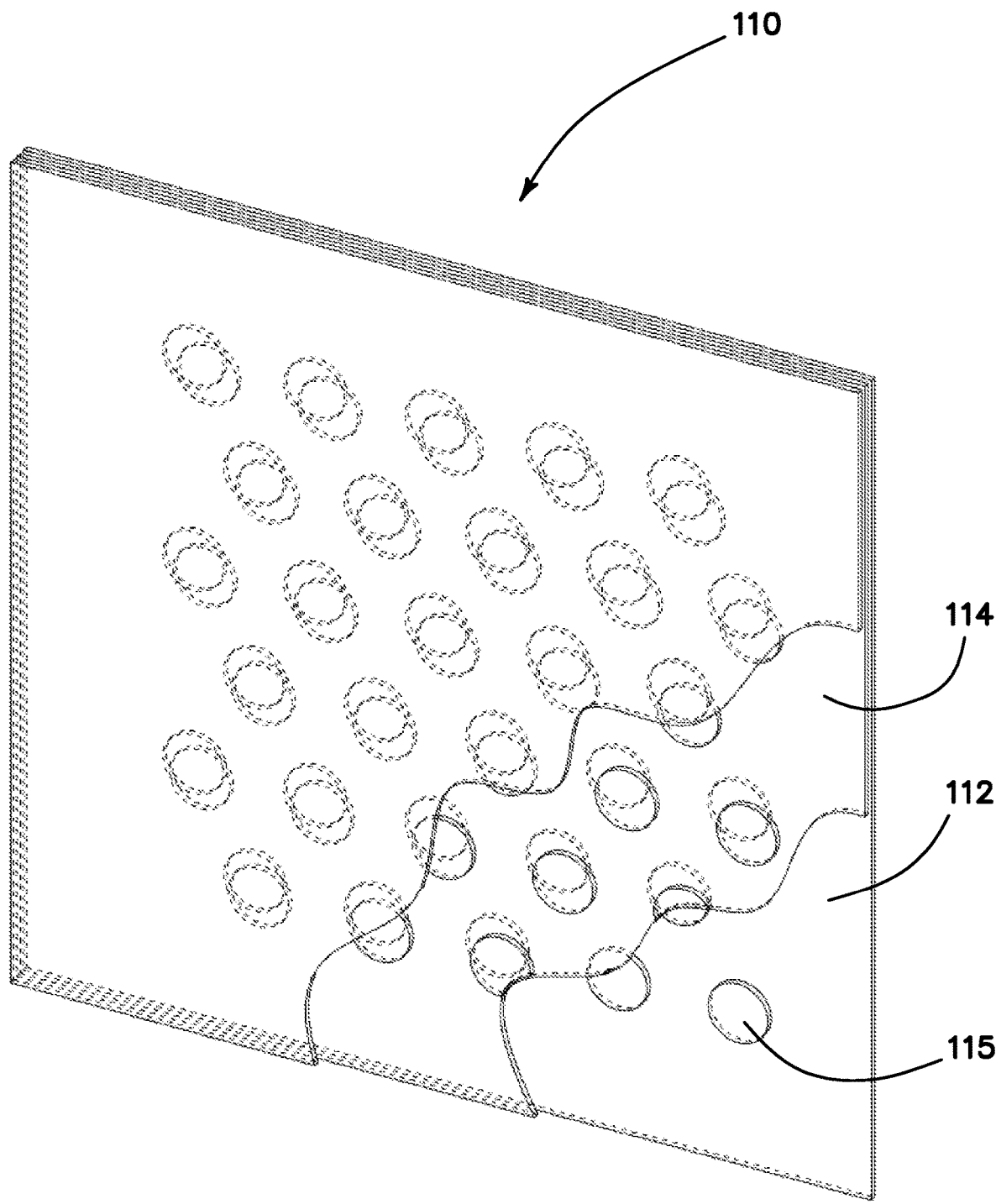
FIG. 14B is a top perspective, partial sectional, transparent view of a simulated tissue structure according to the present invention.

Turning now to FIGS. 14A-14B, there is shown a simulated tissue structure 110 according to the present invention. The simulated tissue structure 110 includes at least a first layer 112 and a second layer 114 and at least one screen or stencil layer 115 located between the first layer 112 and second layer 114. The first layer 112 and the second layer 114 are typically made of silicone and formed into planar sheets with each layer having a first side and a second side and defining a substantially uniform thickness therebetween. The first and second layers 112, 114 are substantially identical and planar and, in one variation, at least one of the first and second layers 112, 114 is transparent or translucent such that the at least one screen layer 116 that is located between the first layer 112 and the second layer 114 is visible through the one of the first and second layers 114, 116. The screen layer 116 comprises an application of resist, release, adhesive, silicone, hydrogel or other material that is applied using a screen, stencil, plate, mask or other image transfer method. FIGS. 14A-14B, in particular, illustrate three layers of silicone and a total of two screen layers located between the three layers of silicone wherein each screen layer is located between two adjacent silicone layers. The process of making the simulated tissue structure 110 involves casting sheets of silicone or other elastomeric material to form the base layers and using a screen, stencil, or other image transfer method to apply a resist, adhesive, silicone or other material to form the functional stencil layers, the functional layer being applied to a cured base layer which is then overlaid with an uncured base layer and repeating the process after the uncured base layer has cured to build up a thickness of material with desired properties for surgical simulation.

One version of this process involves using a stencil to apply mold release or resist to silicone sheets in a desired pattern. By using stencils, screens, or lithographic plates, resist coverage can be tailored in a specific pattern such as dots, halftone or other pattern to give a specific area a percentage of adhesion or relative adhesion between two sheets of material. For example, if a stencil includes a pattern that is approximately 50% open and it is used to apply a stencil layer of resist material to a silicone layer of equal area, the adhesion of the adjacent silicone layer will be reduced by approximately 50%. The pattern of mold release/resist is applied to a first surface of a previously-cured sheet of silicone via the stencil, screen or other plate. This prepared sheet is then laid on top of an uncured sheet of silicone that may or may not be resident inside a mold. The combination of the cured silicone sheet with a stencil layer and the uncured silicone layer is then given time to cure. Upon curing, a sandwiched construct results having variable interface characteristics across the interface plane due to the stencil layer. This method, when repeated, with multiple layers builds up a specified thickness of simulated tissue with desired properties including variability of X-Y plane interface, properties along the Z-axis, in addition to and/or separate from material properties and visual characteristics. A higher percentage of area covered by dots of mold release/resist via the stencil, plate or screen will build up a tissue that feels softer and easier to pull apart. A lower percentage of area covered by mold release/resist dots via the stencil, plate or screen will build up a solid block that feels harder and is more monolithic and will be more difficult to cut or pull apart using surgical instruments.

In another variation, instead of applying resist or mold release via a stencil, plate or screen to a layer of cured silicone, silicone or other adhesive is applied via the stencil, plate, mask, or screen in a particular pattern or halftone to a layer of cured silicone which can then be used to join two previously cured silicone sheets creating two layers that are selectively adhered having variable adhesion along the interface plane and subsequently built up with additional layers to create a multiple layer construct having variable adhesion in the interfacing planes along the Z-axis. Hence, the stencil layer is a functional layer, the function of which may be selected from the group of adhesion, release, and color.

The pattern on the stencil, plate or screen is not limited to dots and material may be applied creating stencil layers for a simulated tissue structure where lines, webs, ovals, squares, curves or other shapes of various thicknesses and colors are created by the stencil layer, for example, to mimic vasculature, musculature, fatty layers or other complex organs and tissues in a two-dimensional layer and intercommunicating with adjacent layers in a three-dimensional construct in which structures transition and continue across multiple layers. This method is used to build an overall desired thickness of material of tissue structure to be used in surgical simulation.

In addition, each of these techniques, applying resist or adhesive using a stencil, screen or plate employing printmaking methods, can be used with textured sheets of silicone and casting dishes to further tailor the feel and response of the material. Also, color can be introduced to simulate different anatomical layers and constructs. The addition of color aids the user in navigation during surgical simulation as well as assessment after the simulation exercise is completed. For example, a surgeon practicing an incision will know that the incision through one or more base layers is too deep if a certain color such as red becomes visible wherein the red color is provided in a functional layer serving the function of a visual indicator for training purposes. Of course, color may be employed in at least the functional layer to provide various surgical markers, anatomy, and targets such as tumors and the like. Similarly, for example, after the simulation exercise is completed, an assessment of the layers can be made to ascertain the accuracy of a procedure for purposes of training and evaluation. For example, layers can be separated and examined to see if an incision penetrated too deeply or to see if care was taken to separate layers carefully without unnecessary cutting into unwanted anatomy.

In one variation, a block of simulated tissue is created using the resist method described above to create a block of simulated tissue comprising a plurality of layers where the layers gradually transition from flesh tone to white to red. When working with this multi-layered simulated tissue structure having a gradation of color and/or interface adhesion properties, dissection in the flesh tone and white layers would be positively regarding with respect to the simulation exercise. Also, positive regard would be attributed in the evaluation to respect for tissue techniques that illustrate the surgeon's skill to separate instead of cutting muscle fibers in the making of an incision through the abdomen for example. The variable adhesion characteristics of the simulated tissue model are used to facilitate the training of the separation of muscle fibers and other respect for tissue techniques. Colored layers can be used in the post-exercise assessment by examining the construct to see if cuts extend through the white layer(s) and into the red layer(s), for example. If the red layer(s), for example, have been cut, the surgeon and the assessor will know that they have gone too far and continued training is required. The present invention advantageously improves the feel and functionality of a simulated tissue structure especially in a training environment while providing live feedback to the surgeon and assessment means to the trainer especially in regard to dissection.

By creating stencils, screens, masks or plates such as silk screens or lithographic plates to be used to create simulated tissue for specific human or animal anatomy, specific, desirable properties can be achieved. By controlling the percent area and shape of adhesion or resist between two or more layers of silicone or KRATON or hydrogel, etc., a higher degree of realism can be achieved in surgical simulation and provide a way to train surgeons that was not previously possible.

Figure 15:
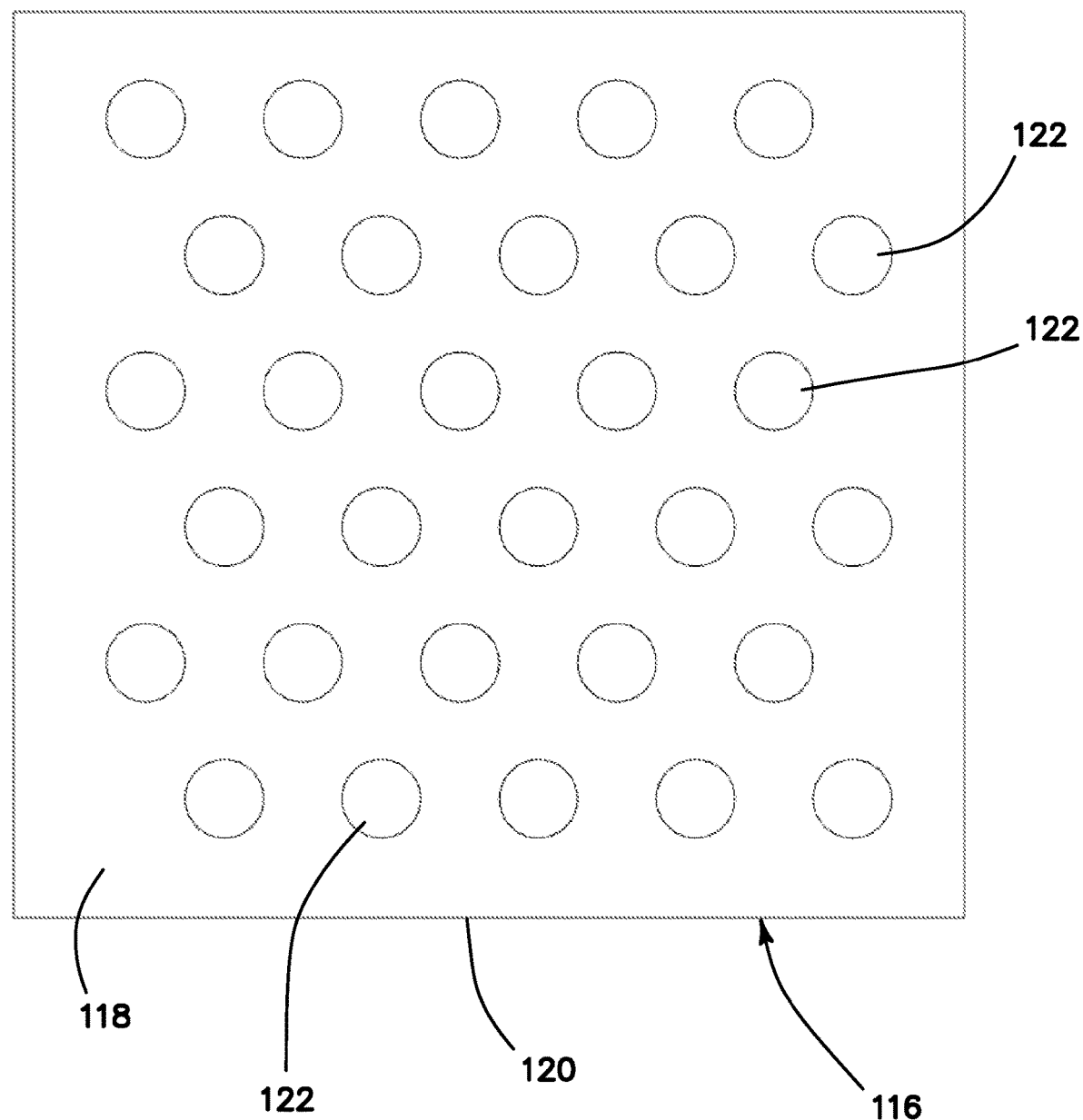
FIG. 15 is top view of a stencil according to the present invention.

Turning now to FIG. 15, there is shown a stencil 116 according to the present invention. The stencil 116 may also be called a plate, screen, mask or other similar article which is used interchangeably to describe the same stencil 116 throughout the specification. The stencil 116 includes a top surface 118 oppositely located and interconnected to a bottom surface 120. A plurality of holes 122 are formed in the stencil 116. The holes 122 extend through the top surface 118 to the bottom surface 120. The holes 122 are formed into a pattern as shown in FIG. 15. The pattern in FIG. 15 is uniform across the entire stencil 16. Resolution of the stencil 116 is defined as the number of lines per inch or the number of dots per inch measured parallel with the stencil's angle which lies in the plane of the stencil 116 such as a count taken along a zero angle that would be equated with nine o'clock of a clock drawn on the surface of the stencil or any other angle.

Figure 16:
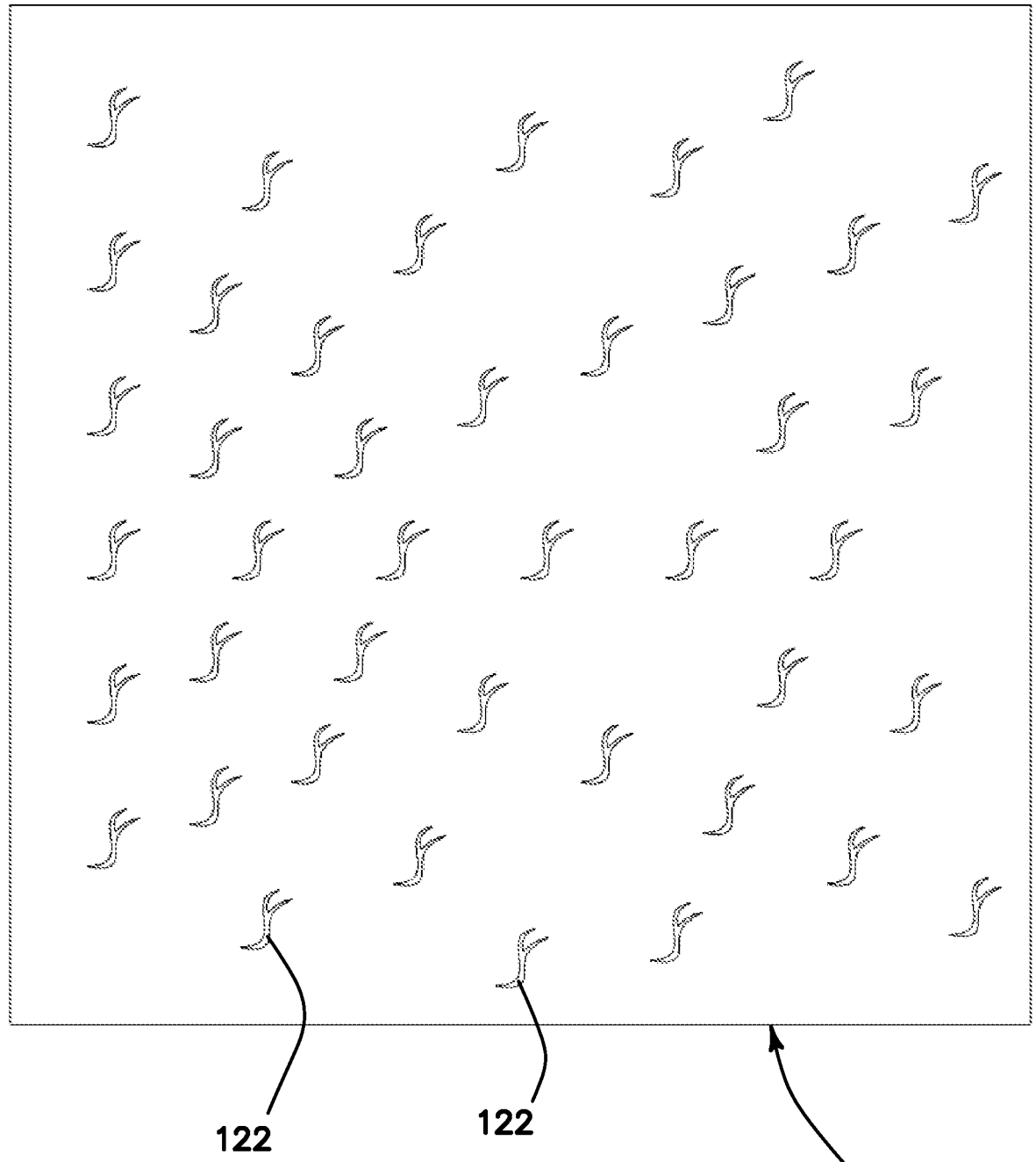
FIG. 16 is a top view of a stencil according to the present invention.
Figure 17:
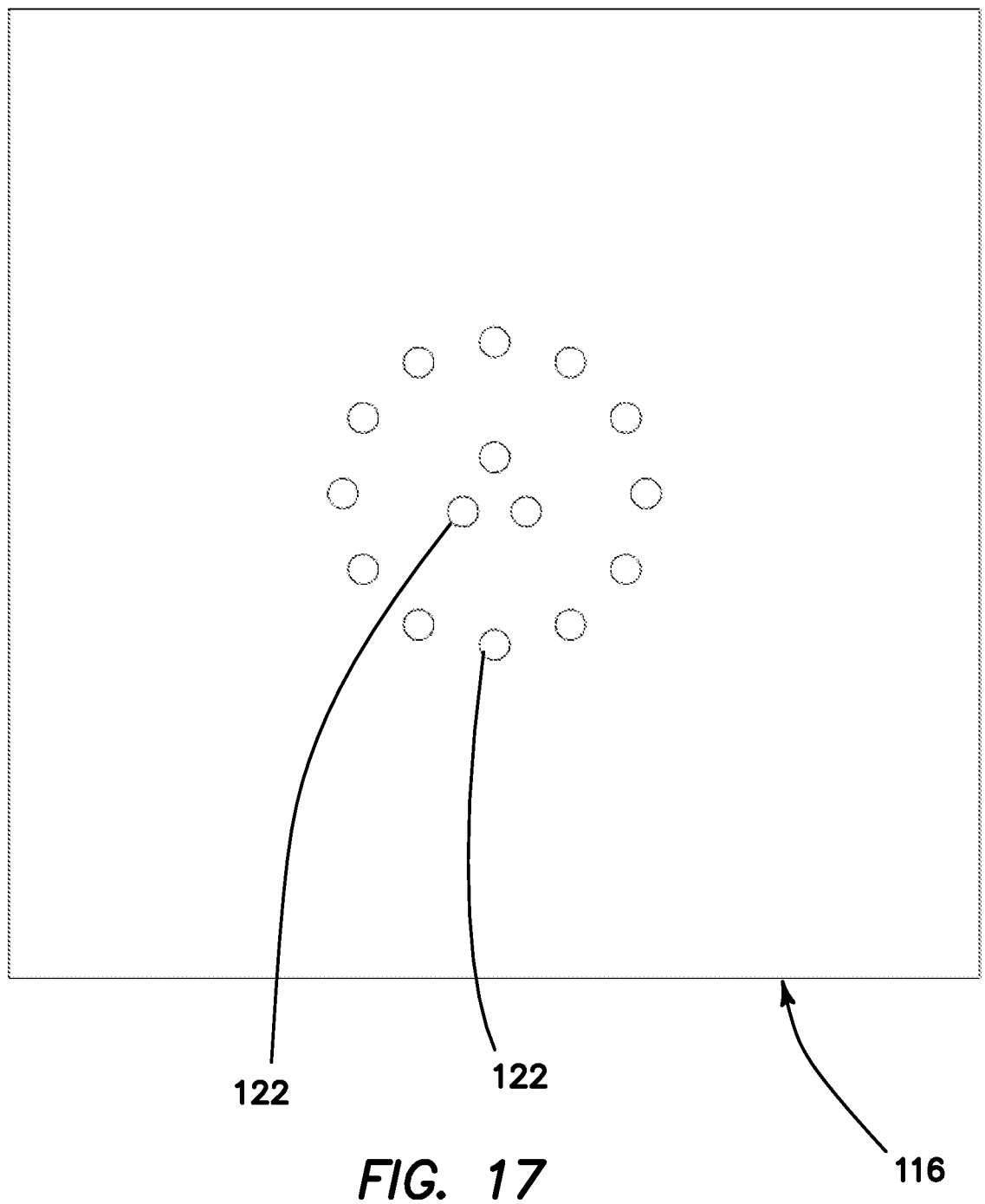
FIG. 17 is a top view of a stencil according to the present invention.
Figure 18:
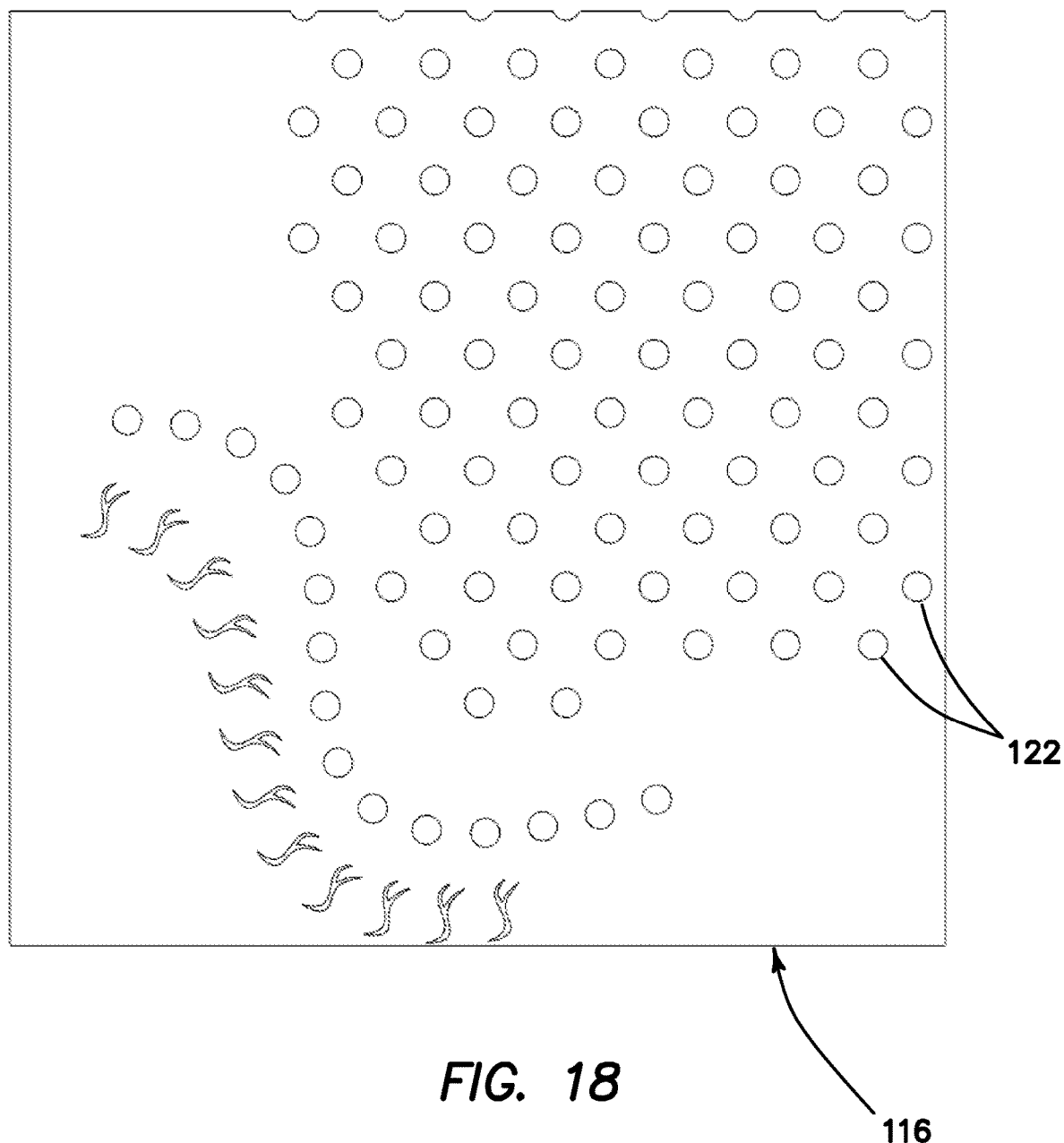
FIG. 18 is a top view of a stencil according to the present invention.

The holes 122 shown in FIG. 15 are circular in shape. However, the invention is not so limited and the holes 122 can be made to have any desired shape. For example, the holes 122 can be round, elliptical or square. For example, FIG. 16 illustrates a stencil 116 that has a plurality of holes 122 shaped like small curves. The repetitive pattern of curved holes 122 is provided evenly across the stencil 116 and mimic vasculature or other anatomically correct visual representation seen in real surgery. The pattern of holes 122 shown in FIG. 17 is limited to only a portion of the stencil 116 and, for example, is formed into a shape of a circle made of circular holes 122 in the center of the stencil 116 with three additional circular holes 122 in the center of the larger circle. The pattern and number of holes 122 are formed for a particular purpose in the creation of the simulated tissue structure. For example, the holes 122 may be shaped to represent an anatomical aspect of interest. An exemplary anatomical aspect may include vasculature such as capillaries and accordingly the stencil 116 would have a plurality of small curves formed randomly or in a pattern into the stencil 116. Such a stencil 116 may be used to meter a blue or red-colored silicone, for example, to provide a functional layer having representative structure as well as color. Another example may include a stencil 116 configured to impart features of muscle. As such, the holes 122 in the stencil 116 may be elongate, straight, substantially parallel to each other and angled to represent the muscular striations found in a layer of muscle. Such a stencil 116 may be employed to meter a layer of red silicone or hydrogel material or multiple layers may be formed by stacking a hydrogel layer metered via the stencil 116 and a colored silicone layer 115 directly over the hydrogel layer and separated by a cured layer of silicone in between the two functional layers formed by the stencil 116. Alternatively, layers of silicone are formed via the stencil 116 and sandwiched by one or more hydrogel layers. The functional layer made of hydrogel is configured to conduct electricity for simulating electro-surgery on the simulated tissue structure 110. A stencil 116 having a complex configuration of holes 122 of various shapes, patterns and arrangements are shown in FIG. 18. In FIG. 18, an even pattern of circular holes 122 appear in the upper right hand corner of the stencil 116 and a curved arrangement of holes 122 shaped like small curves are formed in the lower left hand corner of the stencil 116 and separated by a curve formed of circular holes 122. A custom stencil 116 is formed to create a custom aspect or feature in one layer of a multiple layer simulated tissue structure. Also, multiple stencils may be employed at the same interface to create a custom arrangement of properties for that interface. The properties include but are not limited to material characteristics, adhesion qualities, colors and shapes. The stencil 116 may have a thickness selected for the type, amount and desired thickness of the resulting stencil layer.

Figure 19:
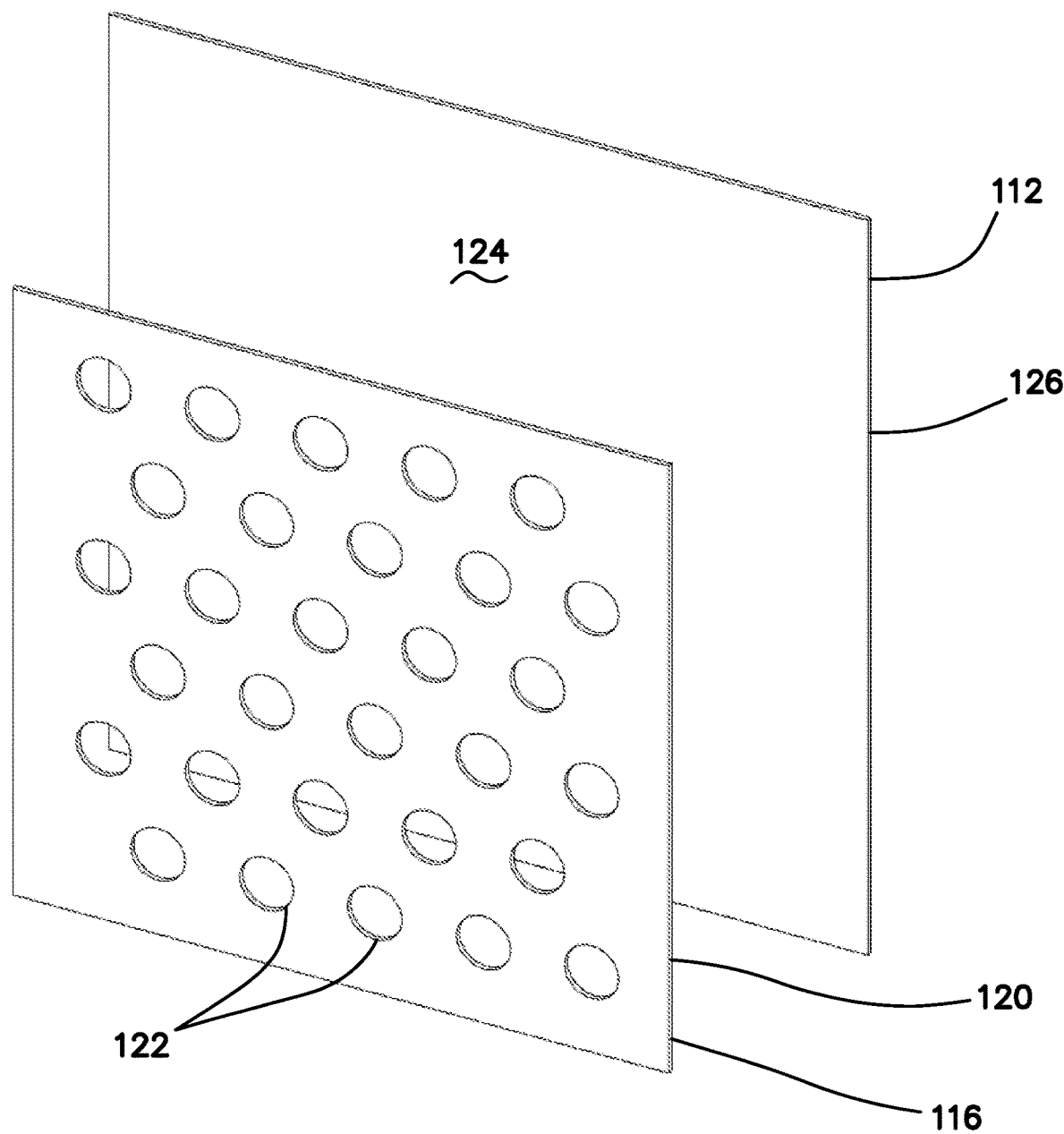
FIG. 19 is a top perspective view of a stencil and a portion of a simulated tissue structure according to the present invention.
Figure 20:
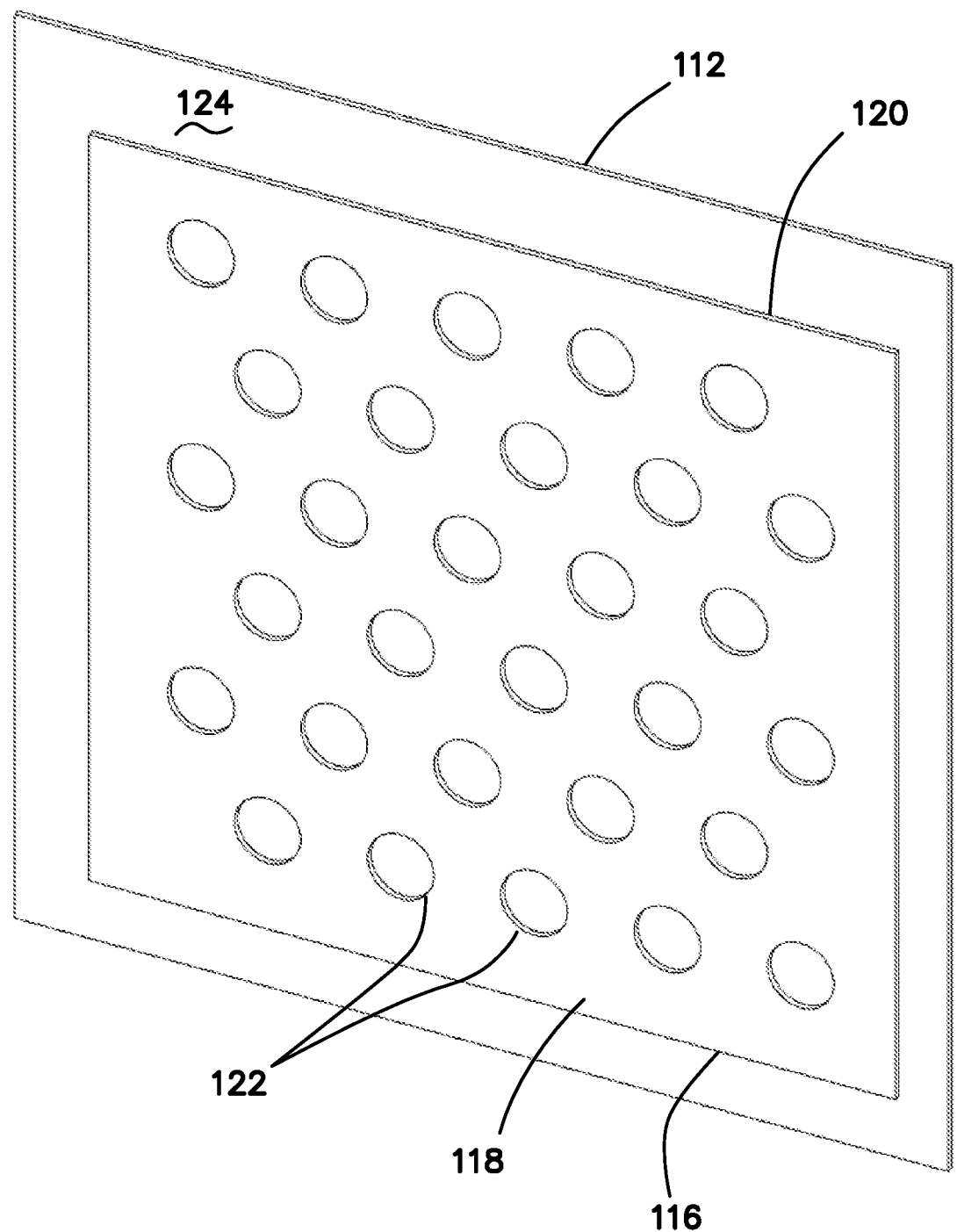
FIG. 20 is a top perspective view of a stencil and a portion of a simulated tissue structure according to the present invention.
Figure 21:
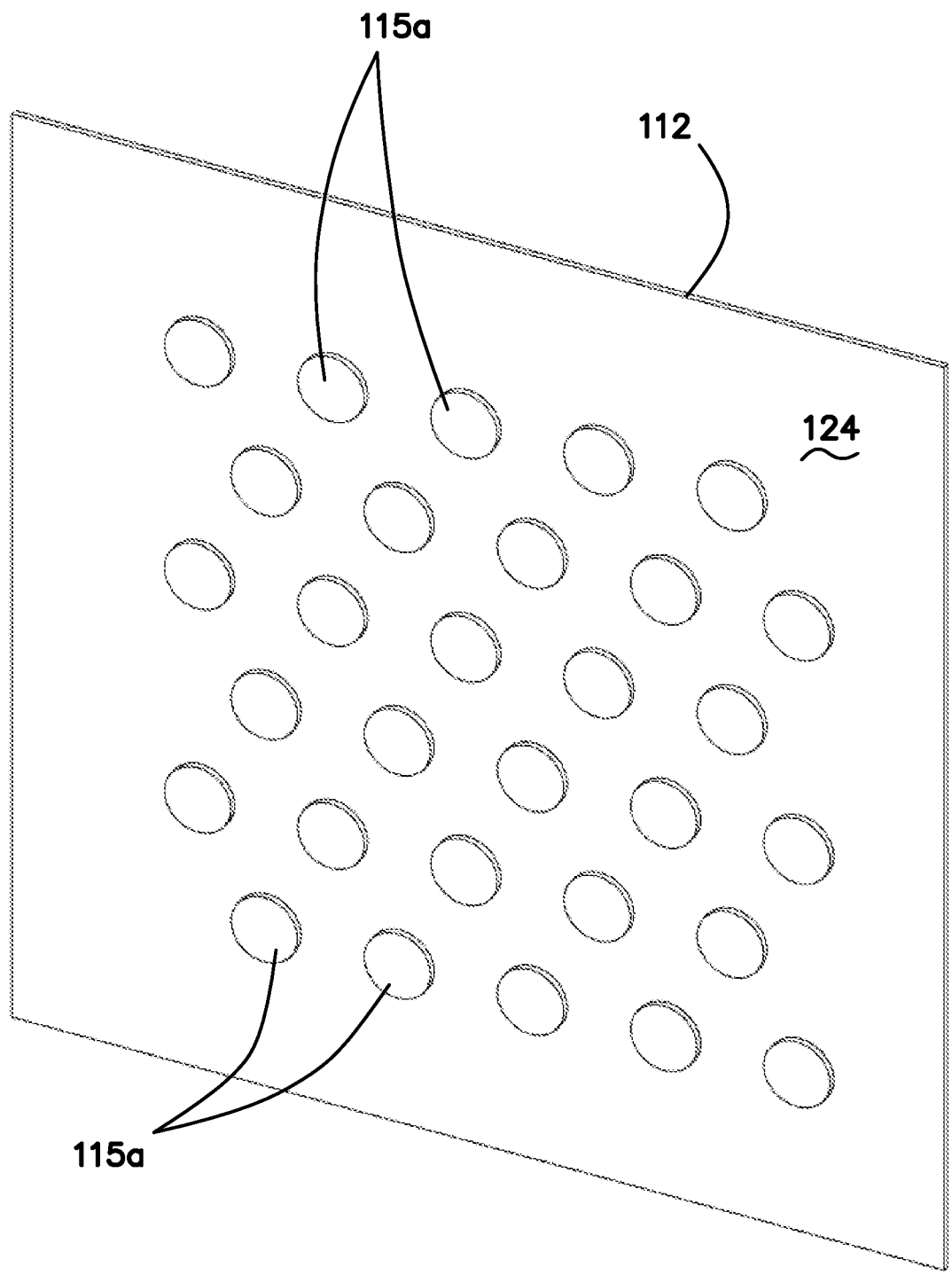
FIG. 21 is top perspective view of a simulated tissue structure according to the present invention.

Turning now to FIG. 19, there is shown a first base layer 112 having a top surface 124 interconnected to and oppositely disposed from a bottom surface 126. The top surface 124 is substantially planar and parallel to the substantially planar bottom surface 126. A stencil 116 is shown spaced apart from the first layer 112 and oriented such that the bottom surface 120 of the stencil 116 faces the top surface 124 of the first layer 112. The stencil 116 includes a plurality of holes 122 that are round and formed into an even pattern across the stencil 116. The shape and pattern of the holes 122 are illustrative and not intended to be limiting. In the next step, illustrated in FIG. 20, the stencil 116 is laid onto the first sheet or first layer 112 such that the bottom surface 120 of the stencil 116 contacts or faces the top surface 124 of the first layer 112. A mold release, resist, grease, powder, lubrication, or other material is applied onto the stencil 116 such that the material passes through the holes 122 and is applied to the top surface 124 of the first layer 112. The stencil 116 is removed leaving behind a pattern of applied material or first stencil layer 15A on the first layer 112 as shown in FIG. 21 in the same pattern and shape as the pattern and shape of holes 122 on the stencil 16. In this example, the first stencil layer 15A includes a plurality of patterned dots. Alternatively, instead of release material, adhesive material may be employed such as glue or silicone or other adhesive and applied to the first layer 112 via the stencil 116. Furthermore, the material applied via the stencil 116 may be an electrically conductive material such has hydrogel or material having conductive properties/filament. Also, the material may include fiber or mesh to improve the suture-holding ability of the layer. The first layer 112 is a cured layer of silicone such as platinum cured room temperature vulcanization silicone (PCRTVS) rubber. The first layer 112 may also be made of KRATON, any elastomer or hydrogel or other conductive material or polymer material. The first stencil layer 115A is allowed to cure either before or after the stencil 116 is removed. FIG. 21 illustrates at least a portion of a simulated tissue structure 110 with the stencil 116 removed from the construct. Any of the material applied with the stencil 116 may include color appropriate to the anatomy being mimicked or the visual effect that is desired to be created employing transparencies and color combinations. In one aspect of the invention, the structure of FIG. 21 is a completed simulated tissue structure. In another aspect of the invention, one or more additional stencil layers 115 of the same or different material can be applied via the same or different stencil 116 either directly above the previously applied stencil layer 115A or offset from the previously applied stencil layer 115A.

Figure 22:
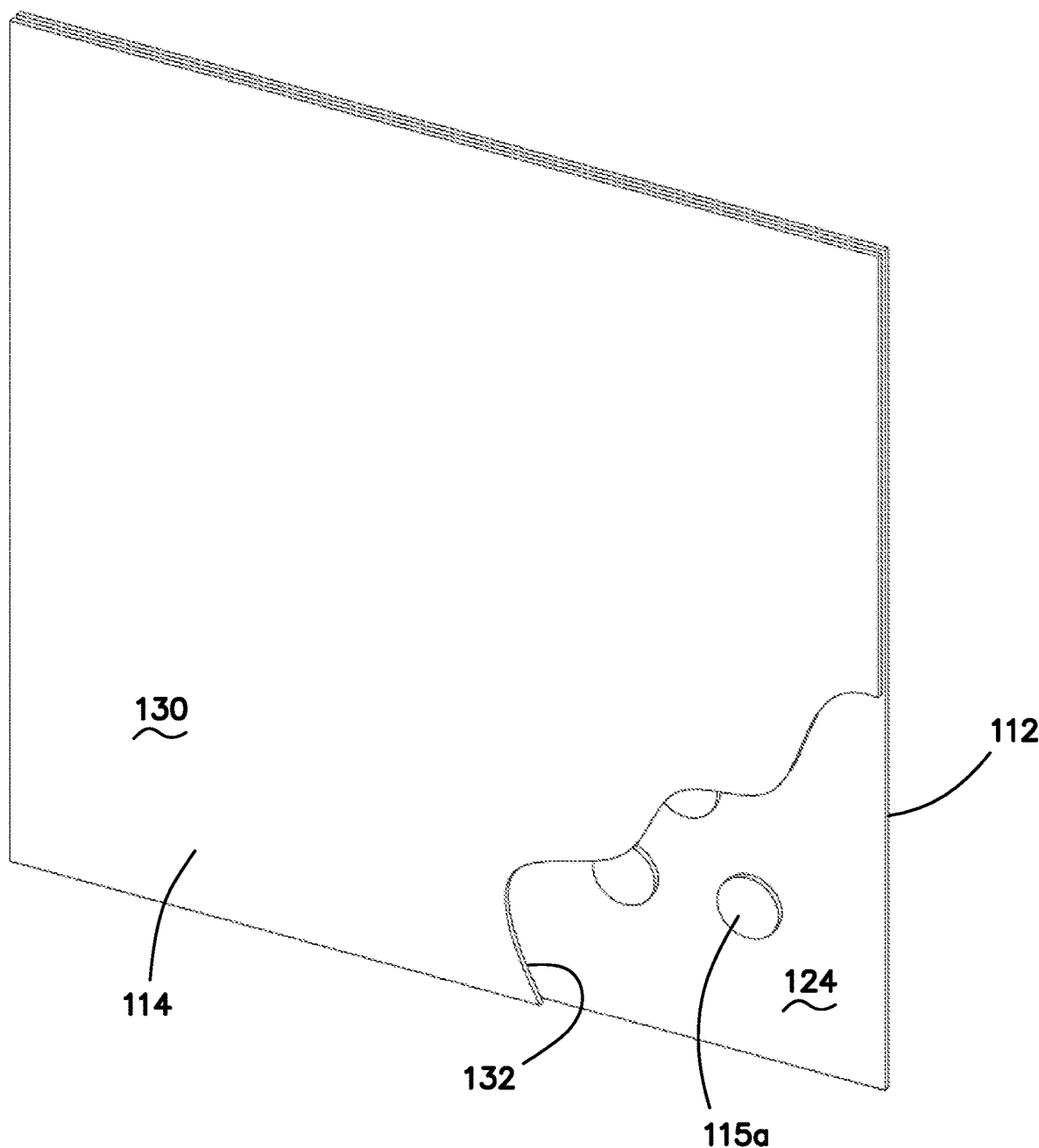
FIG. 22 is a top perspective, sectional view of a portion of a stimulated tissue structure according to the present invention.
Figure 23:
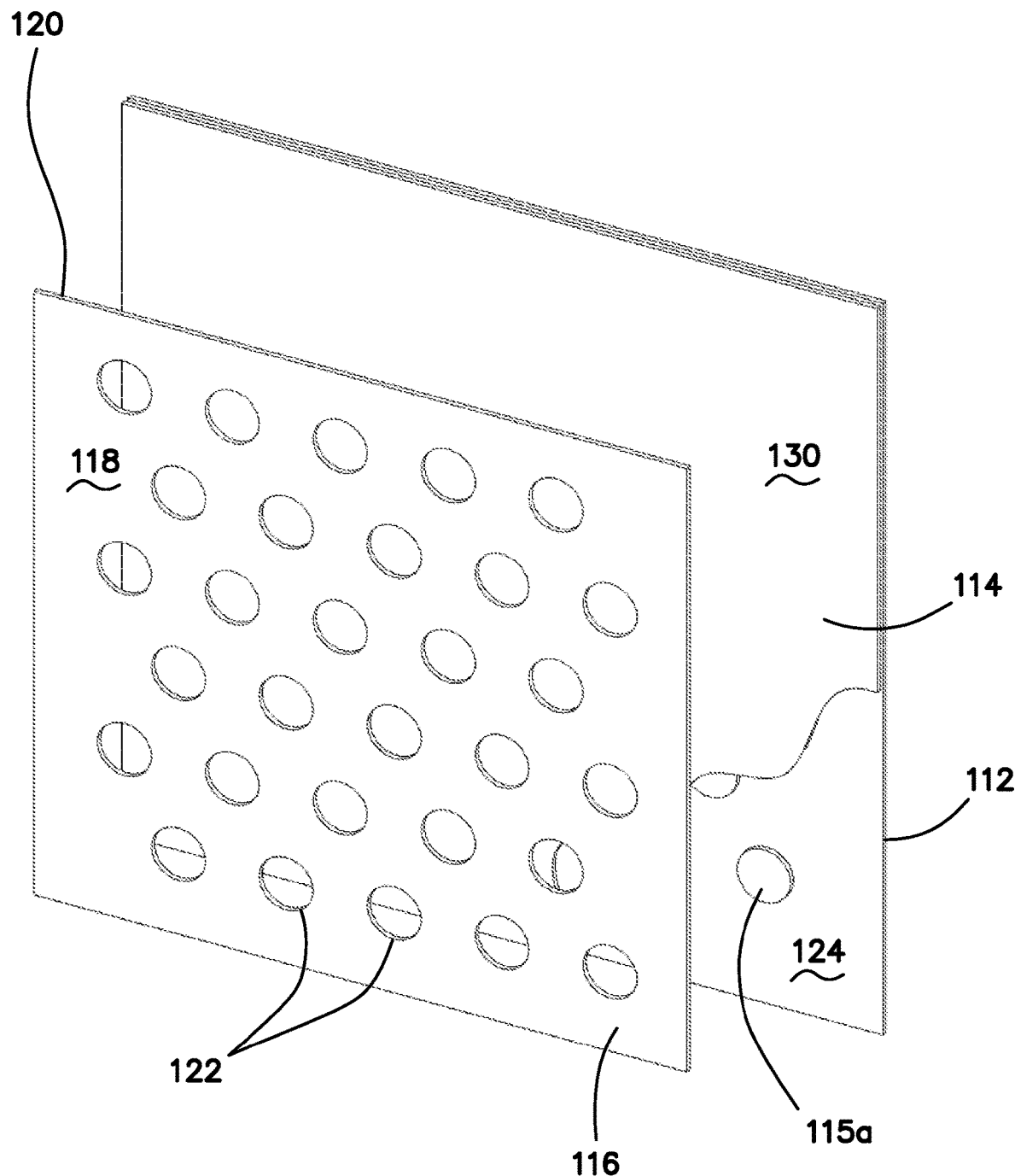
FIG. 23 is a top perspective, sectional view of a portion of a simulated tissue structure and a stencil according to the present invention.
Figure 24:
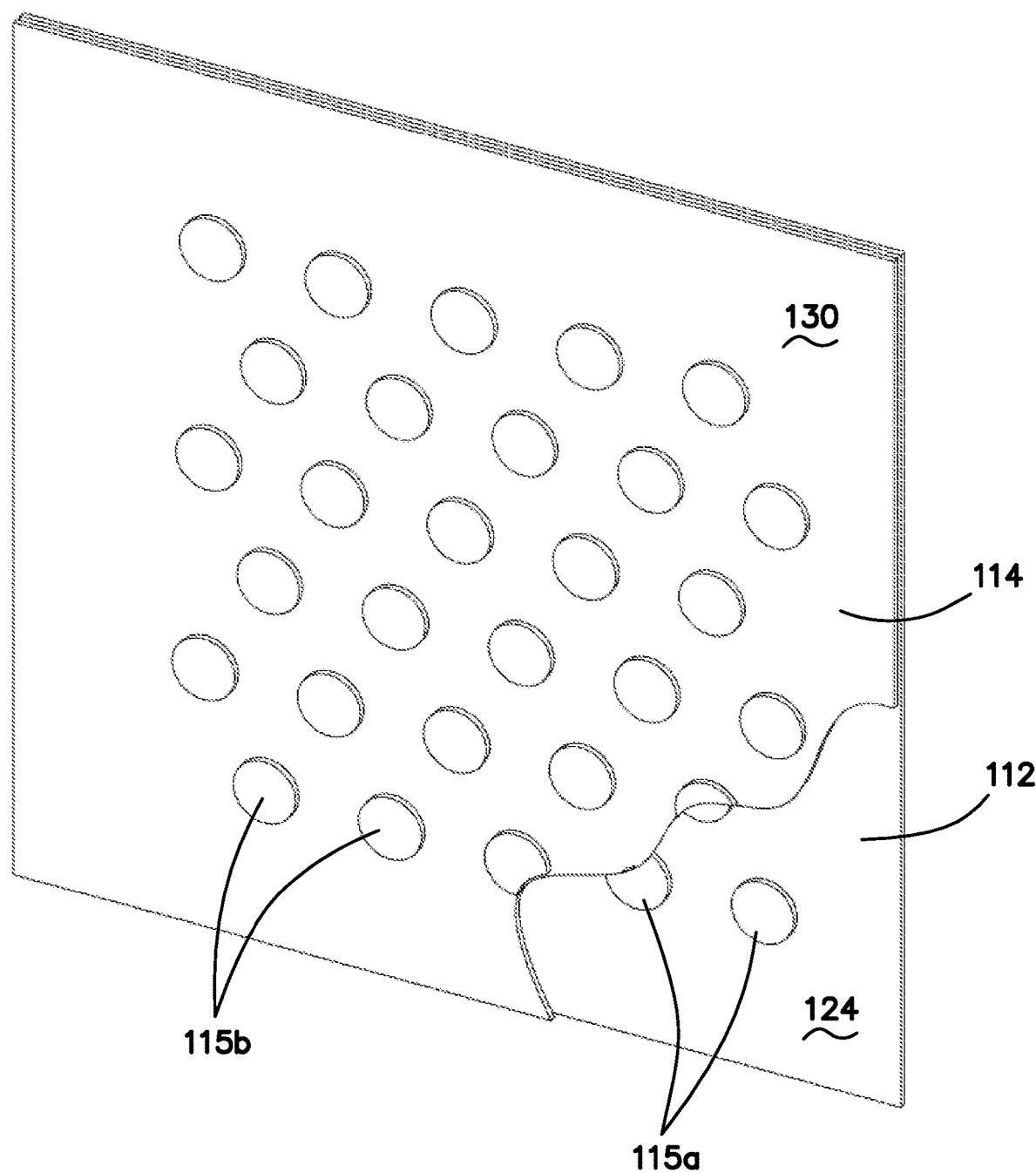
FIG. 24 is a top perspective, sectional view of a simulated tissue structure according to the present invention.

The next step of the method of forming a simulated tissue structure according to the present invention is shown in FIG. 22 wherein the combination of the first base layer 112 and the one or more stencil layer 115A, such as the combination shown in FIG. 21, is placed in juxtaposition with a second base layer 114. In one variation, the second base layer 114 is uncured silicone, PCRTVS, that is applied onto the first stencil layer 115A and the top surface 124 of the first layer 112 and allowed to cure to form a sandwich comprising of the first layer 112 and the second layer 114 with the one or more first stencil layer 15A located therebetween. Still referencing FIG. 22, the second layer 114 includes a top surface 130 interconnected with a bottom surface 132. If the first stencil layer 115A includes an adhesive function, the first layer 112 and the second layer 114 will have strong points of adhesion in the location of the patterned first stencil layer 115A. If the first stencil layer 115A includes a resist or release functionable material, the first layer 112 and the second layer 114 will have locations where the first layer 112 and the second layer 114 are more readily and easily separable in the locations of the patterned stencil layer 115A. That is, the bottom surface 132 of the second layer 114 will be removable or separable from the top surface 124 of the first layer 112 in the locations of the first stencil layer 115A. The resulting simulated tissue structure 110 may be considered complete at this stage of manufacture or built up or progressed into a multi-layered structure by taking the completed sandwich of FIG. 22 and placing it in juxtaposition in parallel planar fashion with a stencil 116 as shown in FIG. 23. The stencil 116 may be the same or different stencil 116 than the one used in juxtaposition with the first layer 112. If the same stencil 116 is used it may be placed directly above or offset from the position of the previous stencil 116 or oriented at an angle relative to the previous stencil 116. The second stencil 116 may have a different pattern of holes 122 relative to the first stencil 116 and the holes 122 may have shapes and sizes that are different from the pattern, shapes and sizes of the previous stencil 116. The bottom surface 120 of the stencil 116 is placed in juxtaposition or in contact with the second layer 114 such that the bottom surface 120 of the stencil 116 faces the outer surface of the second layer 114. In one variation, the first stencil layer 115A is visible through the second layer 14 because the second layer 114 is transparent or translucent. With the stencil 116 in position, a mold release, resist, grease, powder, lubrication or other material is applied onto the stencil 116 such that the material passes through the holes 122 of the second stencil 116 and is applied to the top surface 130 of the second layer 114. The stencil 116 is removed leaving behind a pattern of applied material or second stencil layer 115B on the second layer 114 as shown in FIG. 24. In this example, the second stencil layer 115B includes a plurality of patterned dots that are offset from the first pattern of dots as a result of printing material via the first stencil 116. Alternatively, instead of release material, adhesive material may be employed such as glue or silicone or other adhesive and applied to the second layer 114 via the stencil 116. Furthermore, the material applied via the stencil 116 may be an electrically conductive material such has hydrogel or material having conductive filament. Also, the material may include fiber or mesh. The desired interface properties are applied via the stencil 116 to the second layer 114 for the interface between the second layer 114 and a third layer 134.

Figure 25:
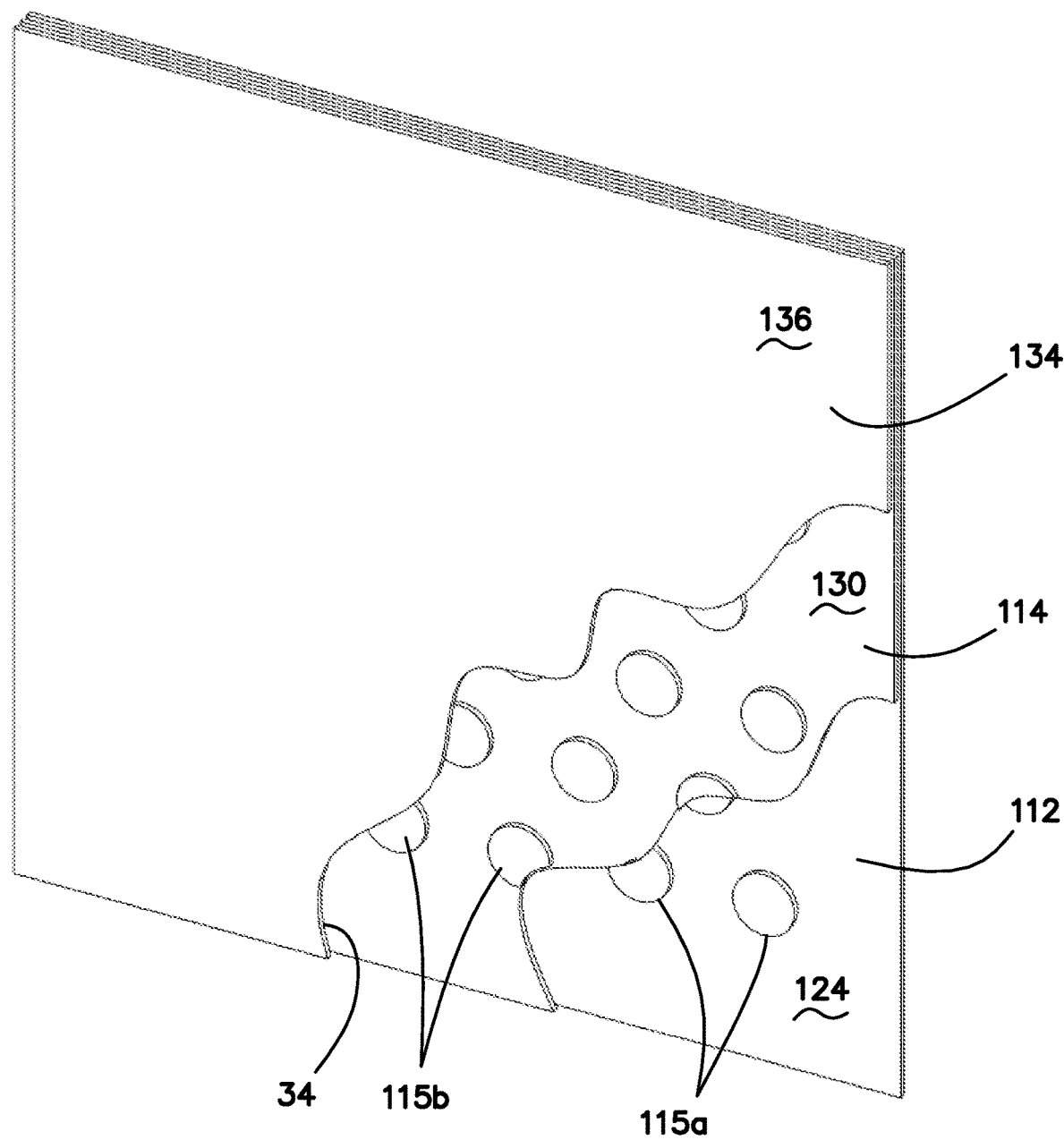
FIG. 25 is a top perspective, sectional view of a portion of a simulated tissue structure according to the present invention.
Figure 26:
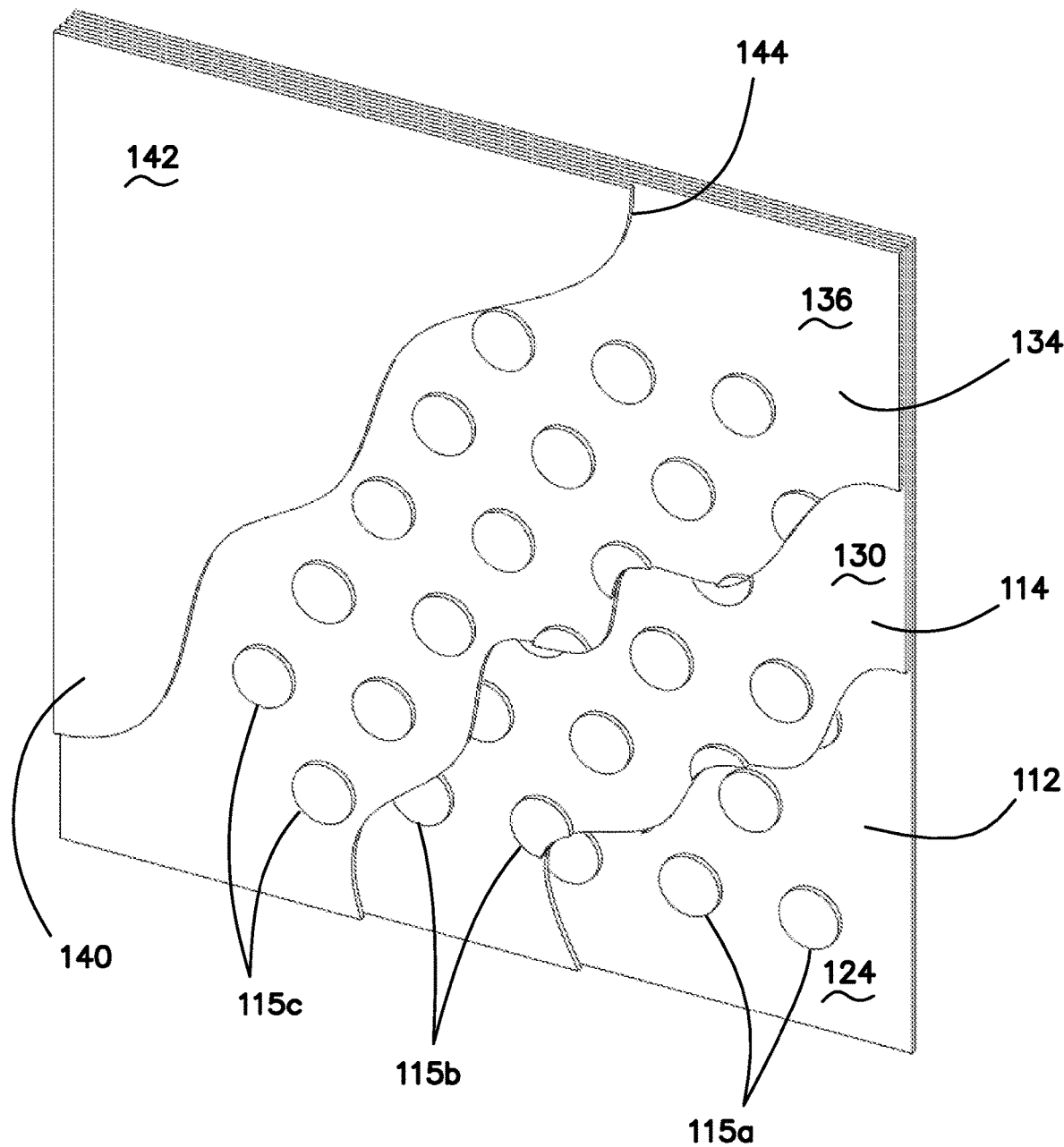
FIG. 26 is a top perspective, sectional view of a simulated tissue structure according to the present invention.

The next step of the method of forming the simulated tissue structure according to the present invention is shown in FIG. 25 wherein the combination of the first base layer 112, first stencil layer 115A, second base layer 114, and second stencil layer 115B is placed in juxtaposition with a third base layer 134. In one variation, the third base layer 134 is uncured silicone, PCRTVS, that is applied onto the second stencil layer 115B and the top surface 130 of the second base layer 114 and allowed to cure. The stencil 116 is removed to form a sandwich of the first layer 112 and the second layer 114 with the first stencil layer 115A located therebetween and a third layer 134 with a second stencil layer 115B located between the second layer 114 and the third layer 134. The third layer 134 includes a top surface 136 interconnected with a bottom surface 138 defining a substantially uniform thickness. If the second stencil layer 115B includes an adhesive, the second layer 114 and the third layer 134 will have strong points of adhesion in the location of the patterned second stencil layer 115B. If the second stencil layer 115B includes a resist or release material, the second layer 114 and the third layer 134 will have locations where the second layer 114 and the third layer 134 are more readily and easily separable in the locations of the dots of material of the second stencil layer 115B. That is, the bottom surface 138 of the third layer 134 will be removable or separable from the top surface 130 of the second layer 114. Hence, a custom arrangement of interface properties between multiple layers is created. The resulting simulated tissue structure 110 may be considered complete at this stage of manufacture or it may be built up or progressed further into a multi-layered structure by taking the completed sandwich of FIG. 25 and placing it in juxtaposition with another stencil 116 to form a third stencil layer 115C as shown in FIG. 26. Stencil layers 15A and 15B are visible in the sandwiched construction shown in FIG. 26 because the second layer 114 and the third layer 134 are transparent or translucent silicone layers in one variation.

Still referencing FIG. 26, a stencil 116 is laid onto the third sheet or third layer 134 such that the bottom surface 120 of the stencil 116 contacts or faces the top surface 136 of the third layer 134. A mold release, resist, grease, powder, lubrication or other material is applied onto the stencil 116 such that the material passes through the holes 122 and is applied to the top surface 136 of the third layer 134. The stencil 116 is removed leaving behind a pattern of applied material or third stencil layer 115C on the third layer 134 as shown in FIG. 26. In this example, the third stencil layer 115C includes a plurality of patterned dots that are offset slightly from the first stencil layer 115A and the second stencil layer 115B. Alternatively, instead of release material, adhesive material may be employed such as glue or silicone or other adhesive and applied to the third layer 134 via the stencil 116. Furthermore, the material applied via the stencil 116 may be an electrically conductive material such has hydrogel or material having conductive filament. Also, the material may include fiber or mesh. The third base layer 134 is a cured layer of silicone such as platinum cured room temperature vulcanization silicone (PCRTVS) rubber. The third layer 134 may also be made of KRATON, any elastomer or hydrogel or other conductive material or polymer material. The third stencil layer 115C is allowed to cure either before or after the stencil 116 is removed. FIG. 26 illustrates at least a portion of a simulated tissue structure 110 with the stencil 116 removed from the construct and a fourth base layer 140 applied. Any of the material applied with the stencil 116 may include color, shape and structure appropriate to the anatomy being mimicked or desired training and assessment goals for the simulated tissue structure 110. In one aspect of the invention, the structure of FIG. 26 is a completed simulated tissue structure. In another aspect of the invention, one or more additional stencil layer 115 of the same or different material or functional characteristic can be applied via the same or different stencil 116 either directly above the previously applied stencil layer 115C or offset from the previously applied stencil layer 115C. As shown in FIG. 26, an interesting pattern of color and/or other material characteristics develops and is built into the simulated tissue structure 110 and are enhanced by the transparency of the intermediate layers. The color pattern created by the different shapes of the stencil holes 122 emerges to mimic real live tissue colorations including tumor colorations that may appear dark in color. Furthermore, performance of surgical techniques, for example, in the location of one or more dark colored, black, brown or dark red dots, mold release in the same or surrounding locations of dots permits the simulated tumor locations to be realistically removed when practicing the procedure utilizing the simulated tissue structure 110 of the present invention. The location or pattern of release/resist or adhesive is predetermined and, in one variation, arranged to teach the surgeon the best path of excision to be taken with a scalpel or other instrument.

Figure 27:
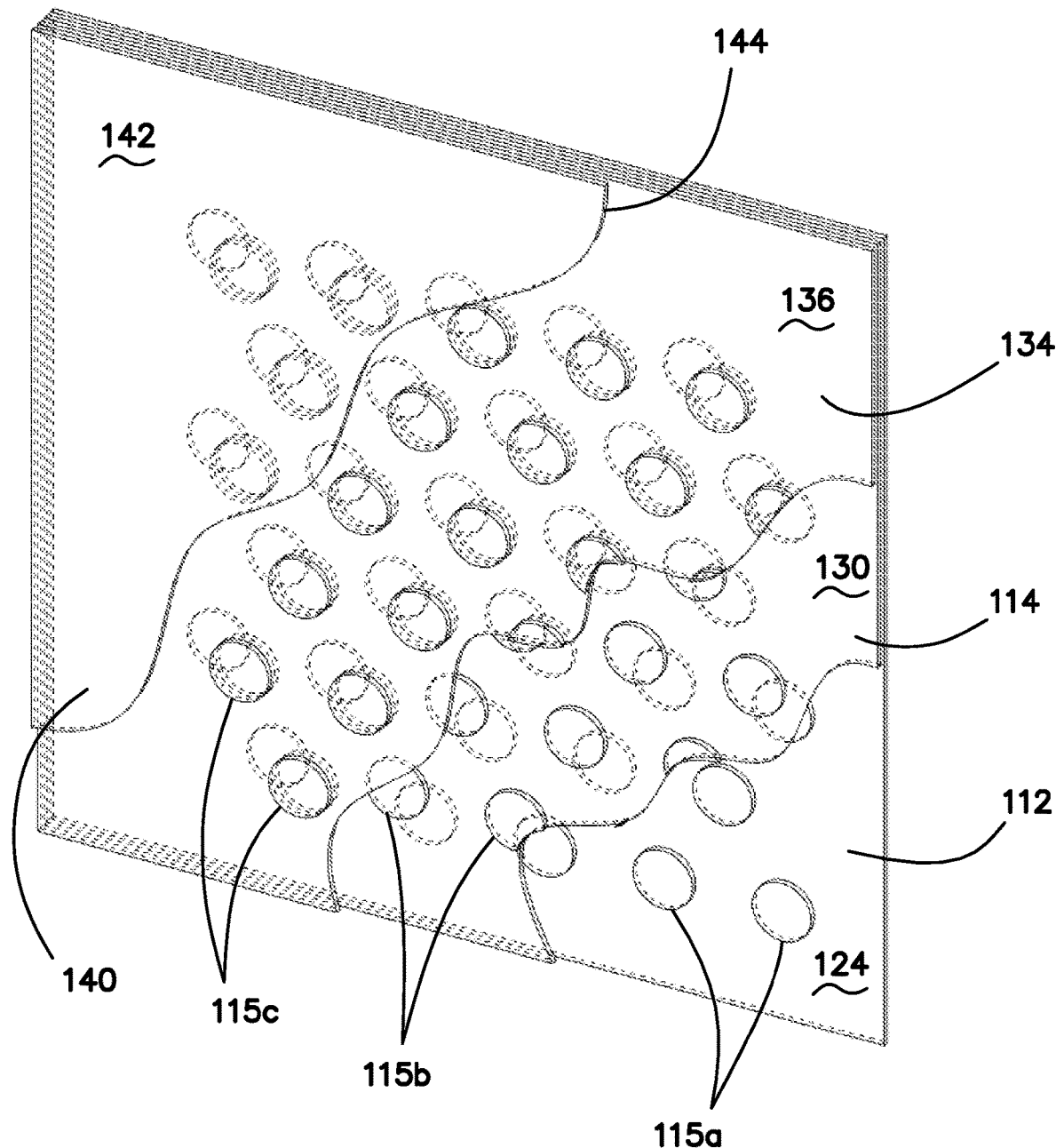
FIG. 27 is a top perspective, transparent, sectional view of a simulated tissue structure according to the present invention.

Still referencing FIG. 26, the sandwiched construct of the first layer 112, second layer 114 and first stencil layer 115A located therebetween and the third layer 134 and third stencil layer 115C located on the top surface 136 of the third layer 134 is placed in juxtaposition with a fourth layer 140. The fourth layer 140 may be a pre-formed, pre-cured sheet of platinum cured room temperature vulcanization silicone (PCRTVS) which is placed onto the top surface 136 of the third layer 134 to sandwich the third stencil layer 115C. Alternatively, the fourth layer 140 of uncured PCRTVS is poured onto the sandwiched construct and allowed to cure and depending on the material of the third stencil layer 115C either adhering strongly in the location of the third stencil layer 115C dots if an adhesive was or being readily separable in the location of the third stencil layer 115C dots if a release or resist was employed. The simulated tissue structure 110 shown in FIGS. 26 and 27 illustrate a final construction in one variation of the invention that includes a first layer 112, a second layer 114, a third layer 134 and a fourth layer 140 with a first stencil layer 115A located between the first layer 112 and second layer 114 and a second stencil layer 115B located between the second layer 114 and third layer 134 and a third stencil layer 115C located between the third layer 134 and the fourth layer 140. In one variation, the layers 112, 114, 134, 140 are transparent to keep the dots of the stencil layers 115A, 115B, 115C at least partially visible through the structure 110. Each of the stencil layers 115A, 115B, 115C may be formed of different colors. For example, the first stencil layer 115A is green, the second stencil layer 115B is blue and the third stencil layer 115C is red. The result is a moire pattern of RGB color space and shape. Also, in one variation, the uppermost layer, which in the case of the construct shown in FIGS. 26 and 27 is the fourth layer 140, is colored a flesh or tan color to be representational of skin.

The layering of the simulated tissue structure 110 may continue as described with further additions of stencil layers 115 and base layers to create a sandwich stack of response appropriate sections and interfaces internal to the construct.

Figure 28:
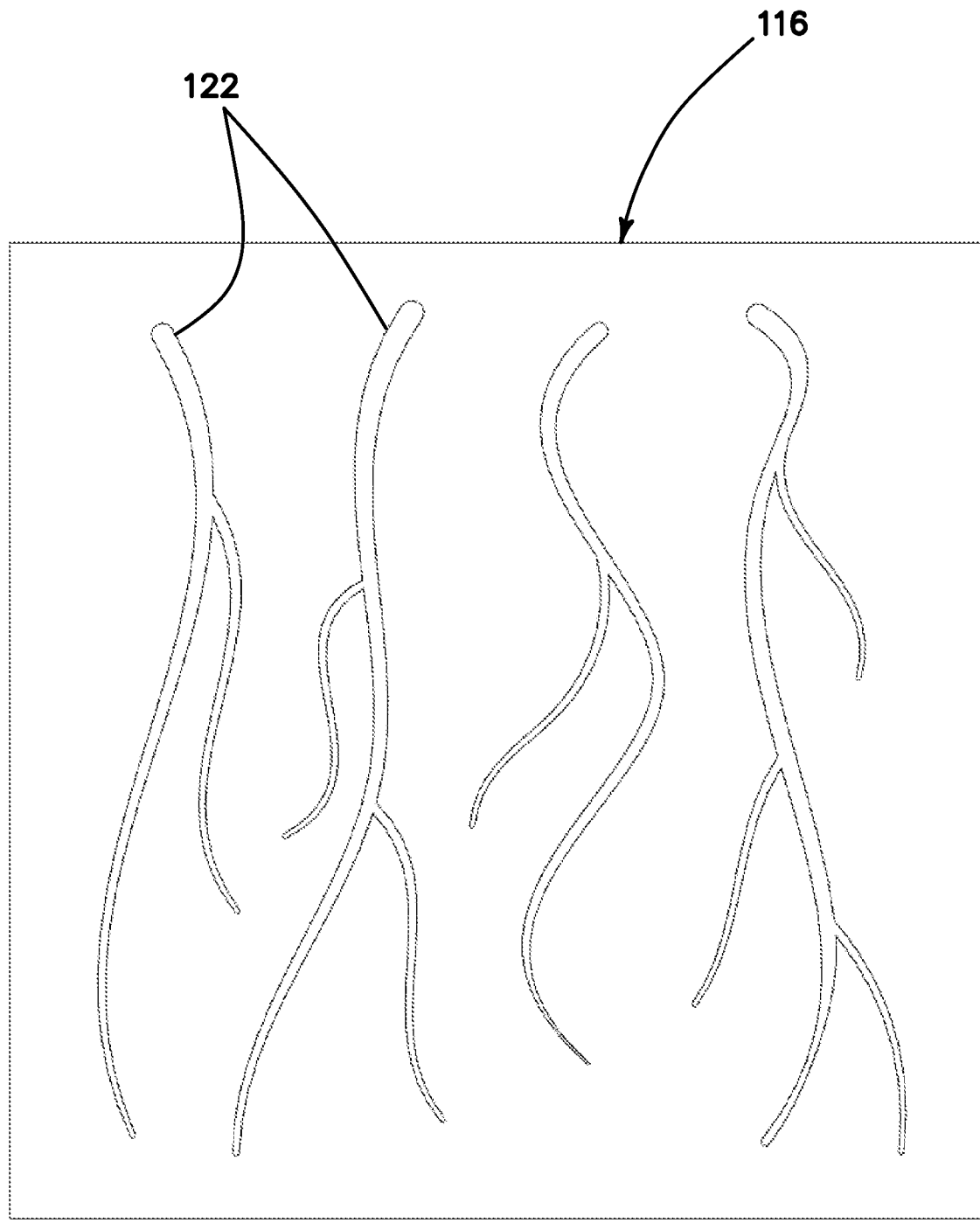
FIG. 28 is a top perspective view of a stencil according to the present invention.

Turning now to FIG. 28, there is shown another variation of a stencil 116 having a plurality of holes 122 configured to mimic the arteries of a human omentum. The stencil 116 of FIG. 28 is used to lay down red-colored silicone in the unique shape of the omentum arteries via the plurality of holes 122 onto a first base layer (not shown). A second base layer may be employed to sandwich the arterial structures of the omentum therebetween to complete the simulated omentum. The stencil 116 is not limited to form arterial structures of the omentum but can be used with unique hole(s) 122 that mimic specific organ/tissue structures or unique shapes for a desired outcome.

Figure 29:
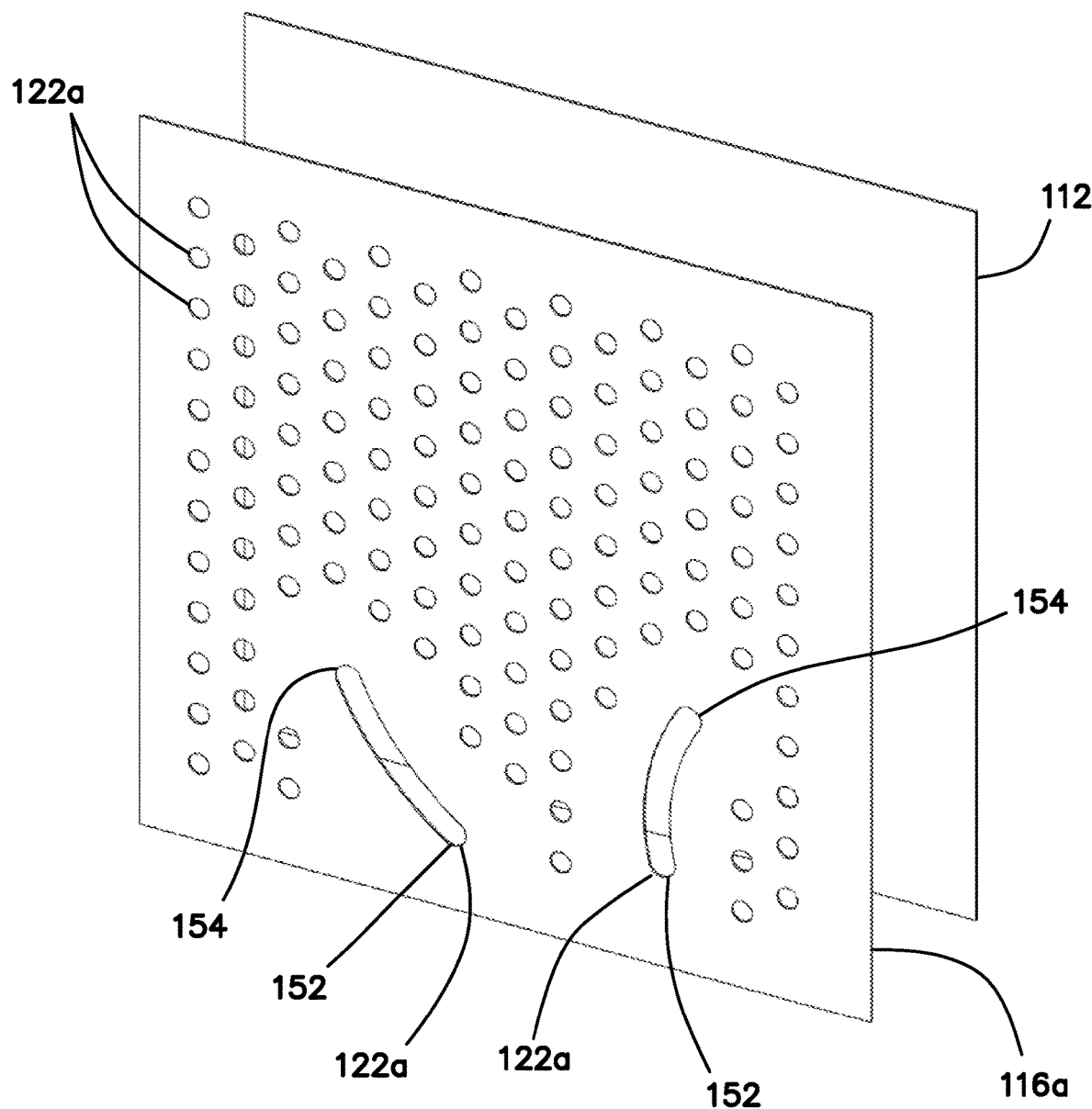
FIG. 29 is a top perspective view of a base layer and stencil according to the present invention.
Figure 30:
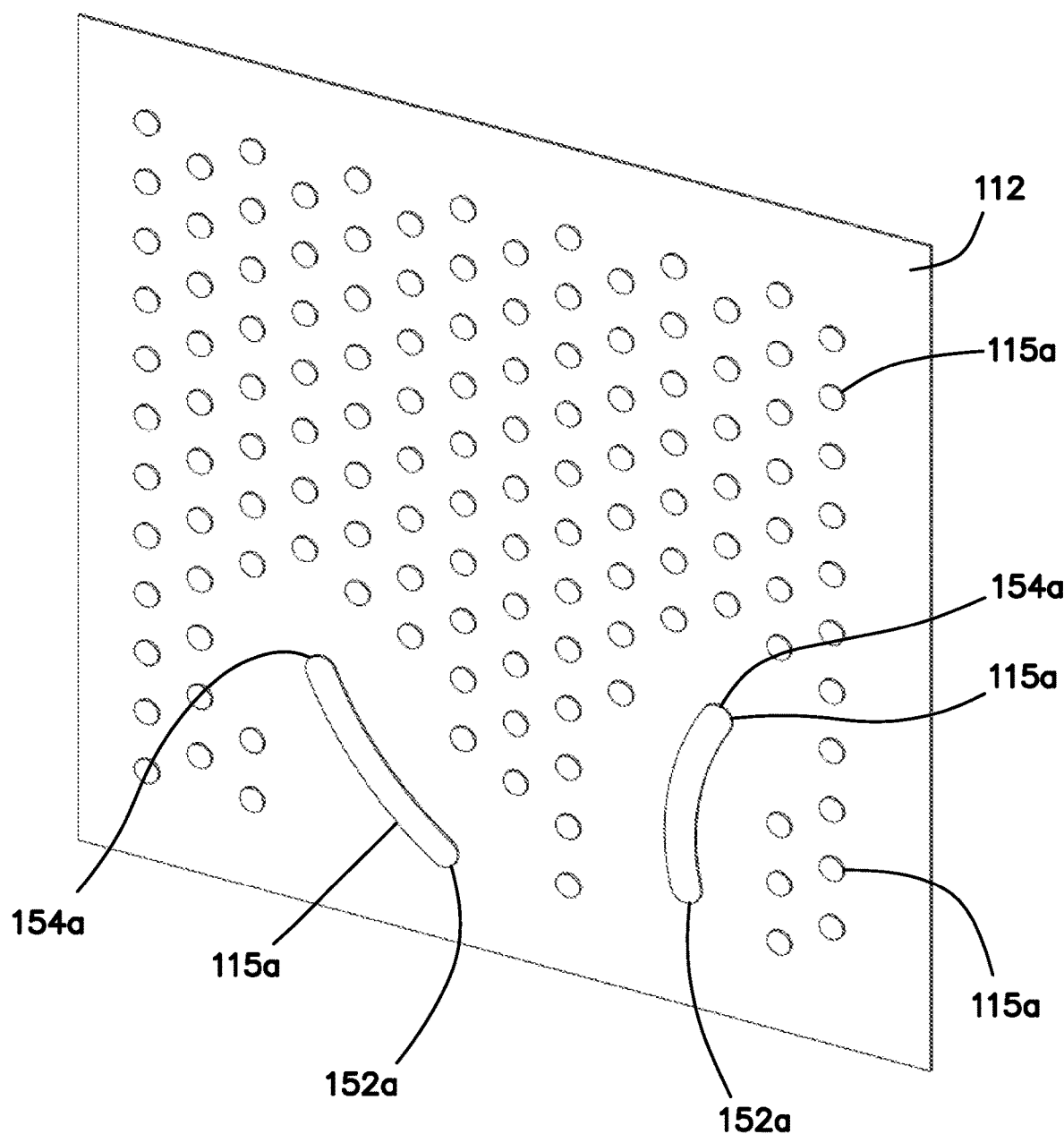
FIG. 30 is a top perspective view of a first base layer and first stencil layer according to the present invention.
Figure 31:
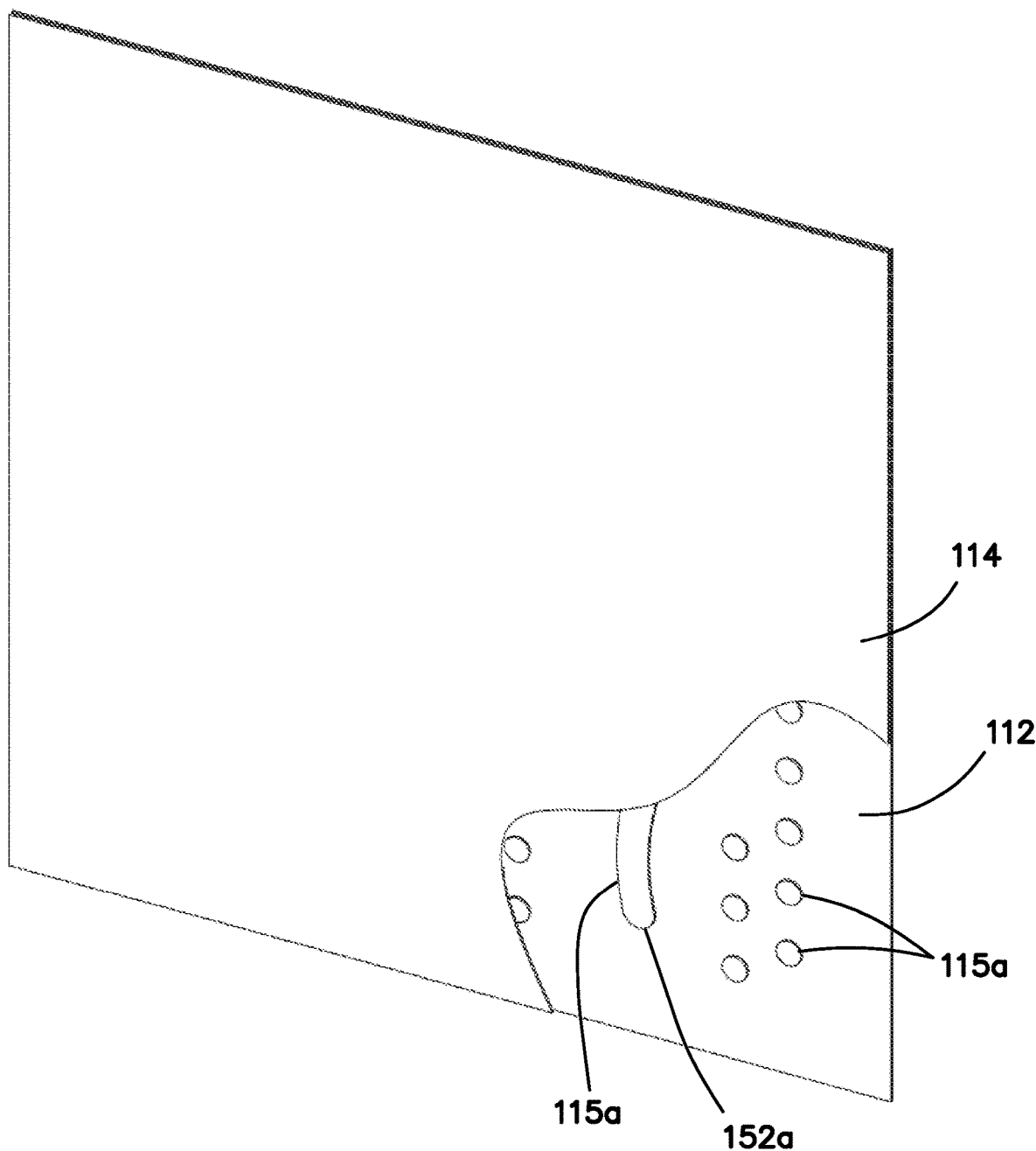
FIG. 31 is a top perspective, sectional view of a first base layer, first stencil layer and a second base layer according to the present invention.
Figure 32:
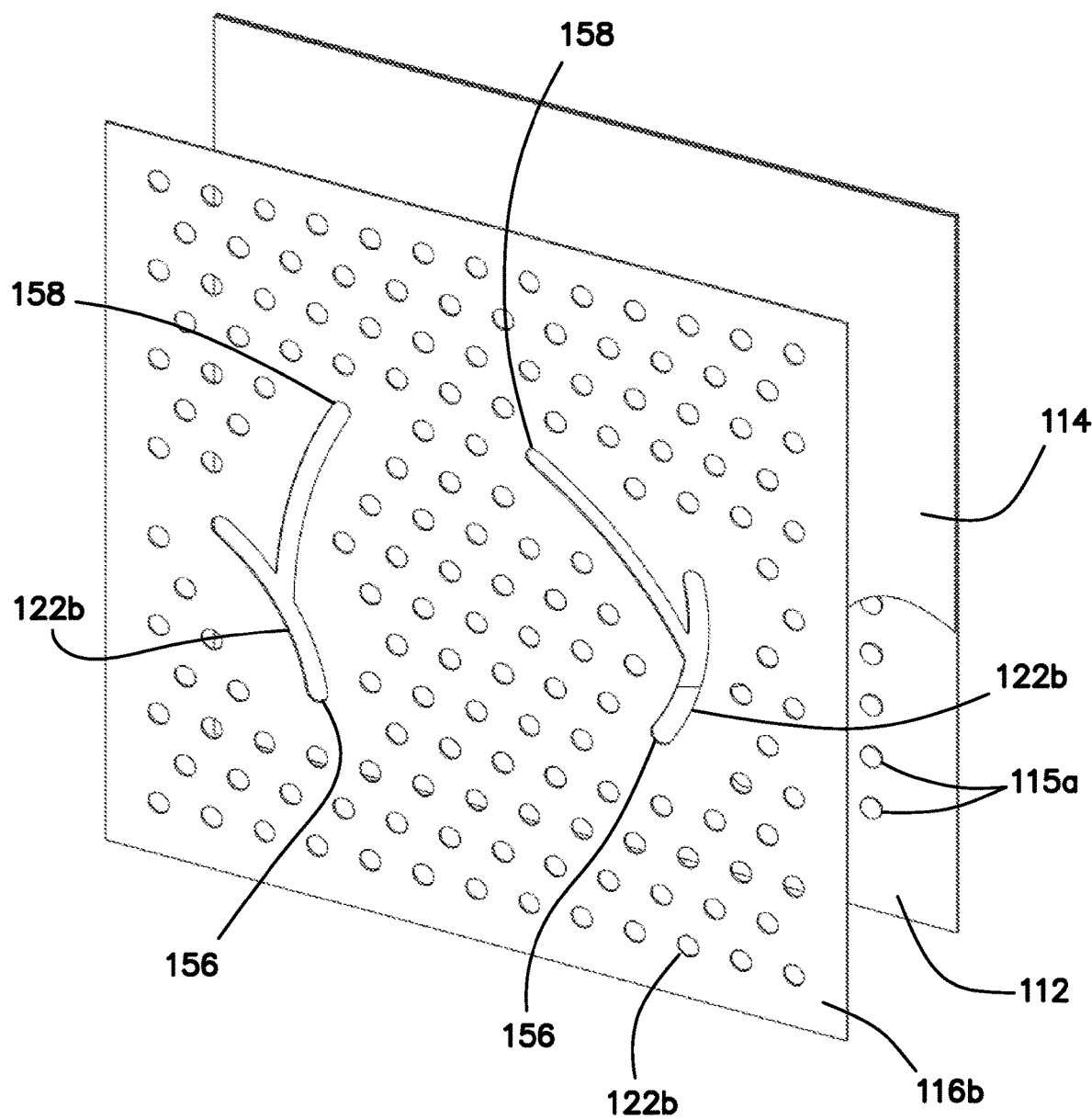
FIG. 32 is a top perspective, sectional view of a first base layer, first stencil layer, a second base layer and a second stencil according to the present invention.
Figure 33:
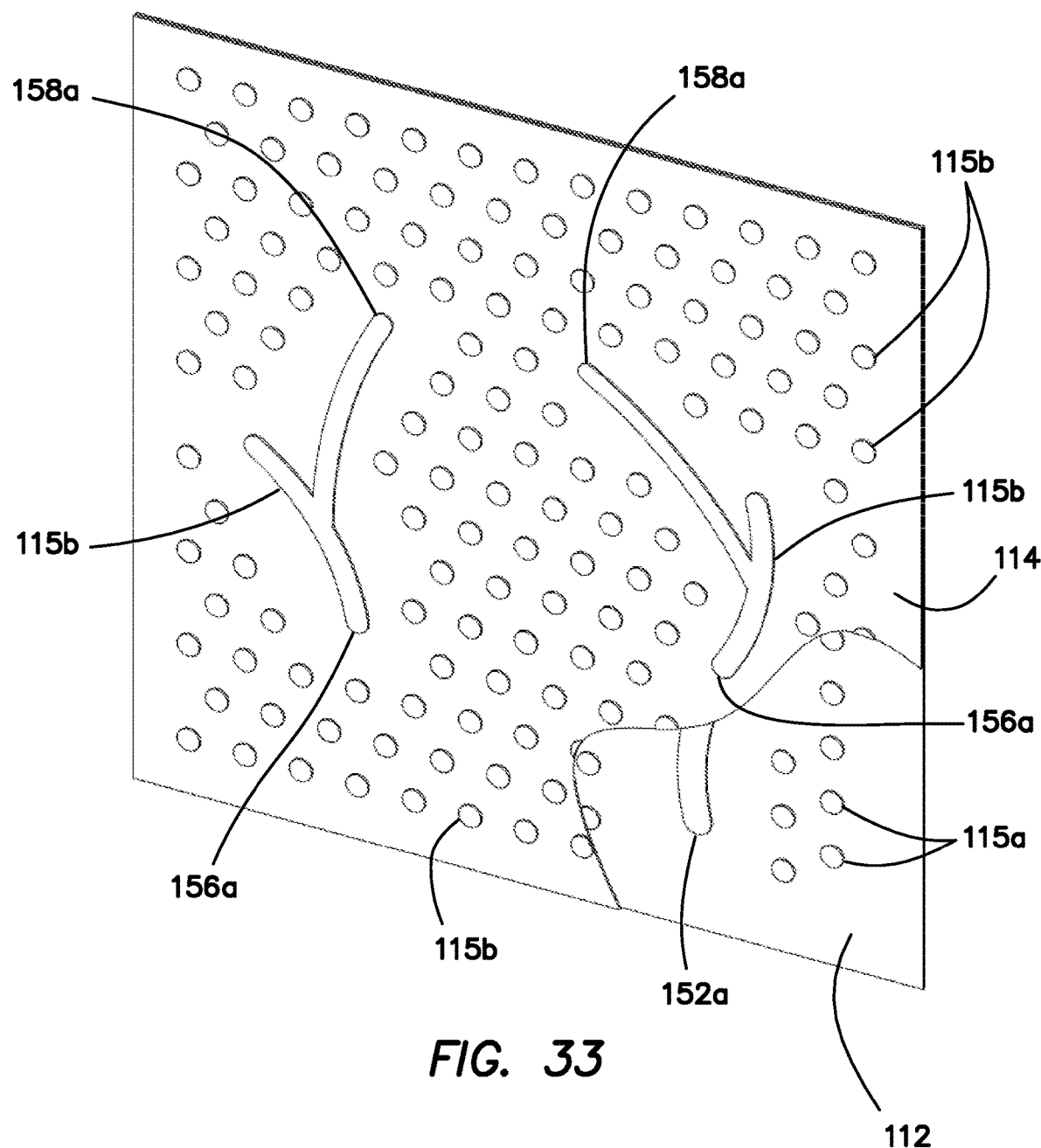
FIG. 33 is a top perspective, sectional view of a first base layer, a first stencil layer, a second base layer and a second stencil layer according to the present invention.
Figure 34:
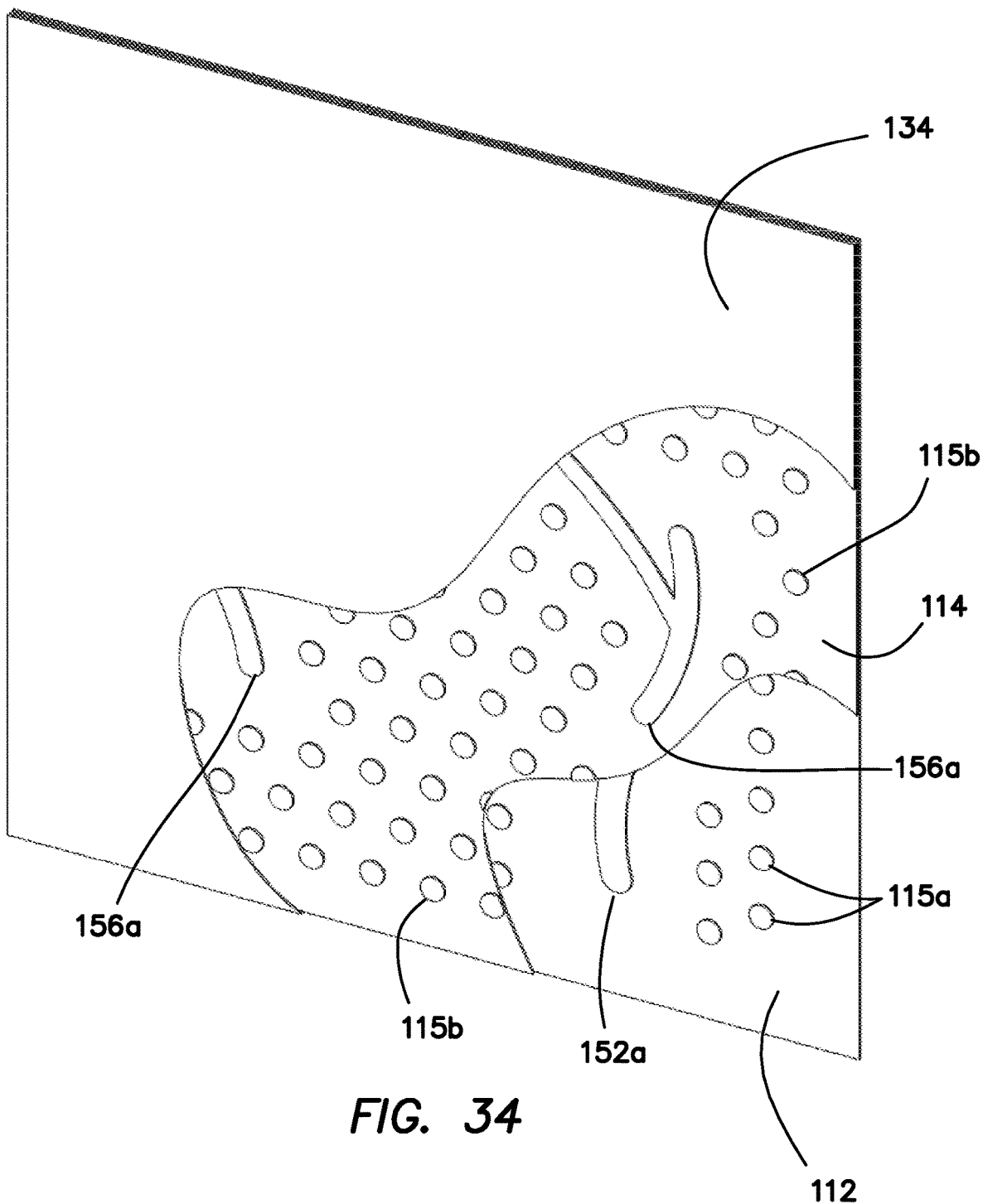
FIG. 34 is a top perspective, sectional view of a first base layer, a first stencil layer, second base layer, second stencil layer and third base layer according to the present invention.
Figure 35:
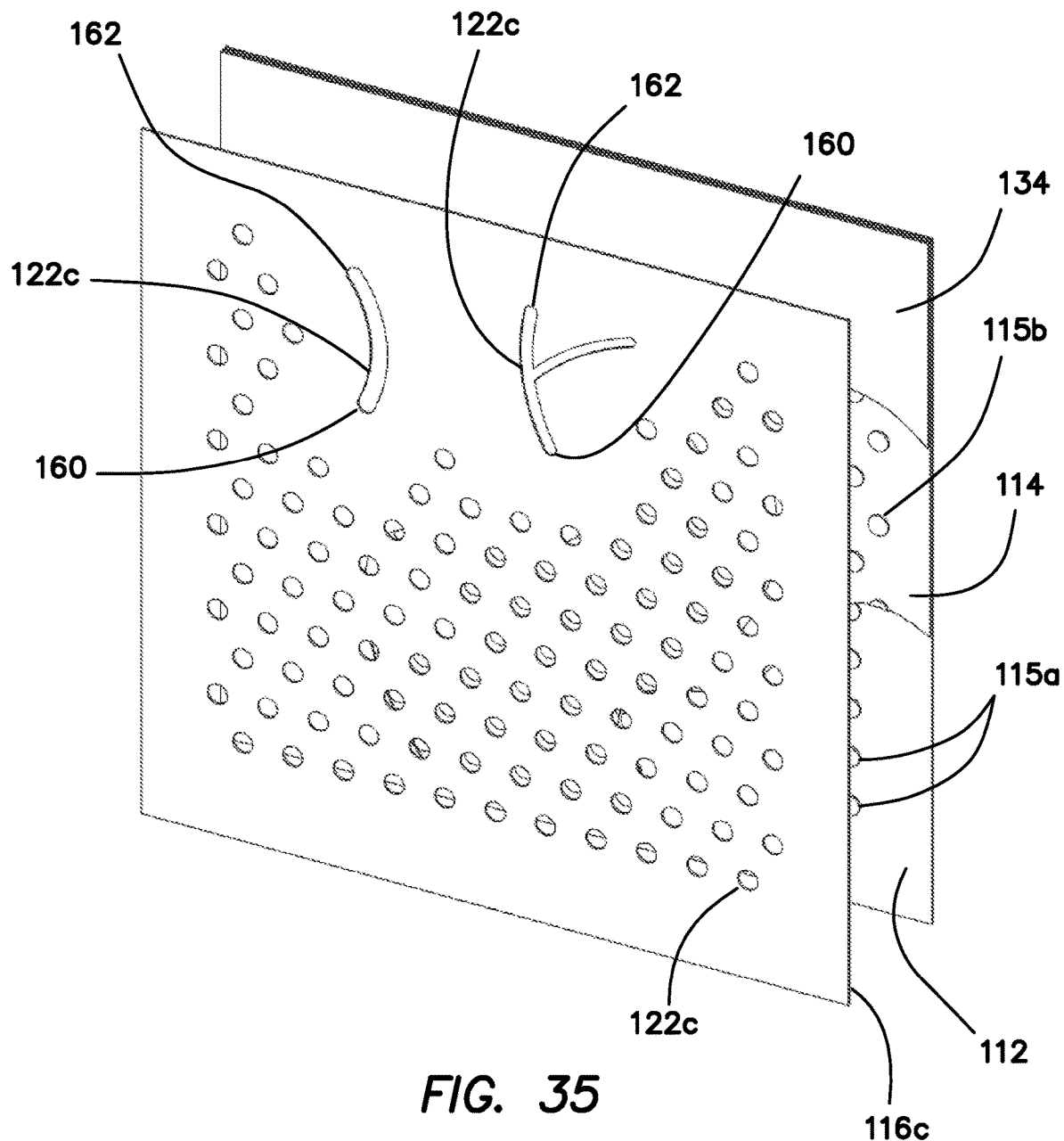
FIG. 35 is a is a top perspective, sectional view of a first base layer, a first stencil layer, second base layer, second stencil layer, third base layer, and third stencil according to the present invention.
Figure 36:
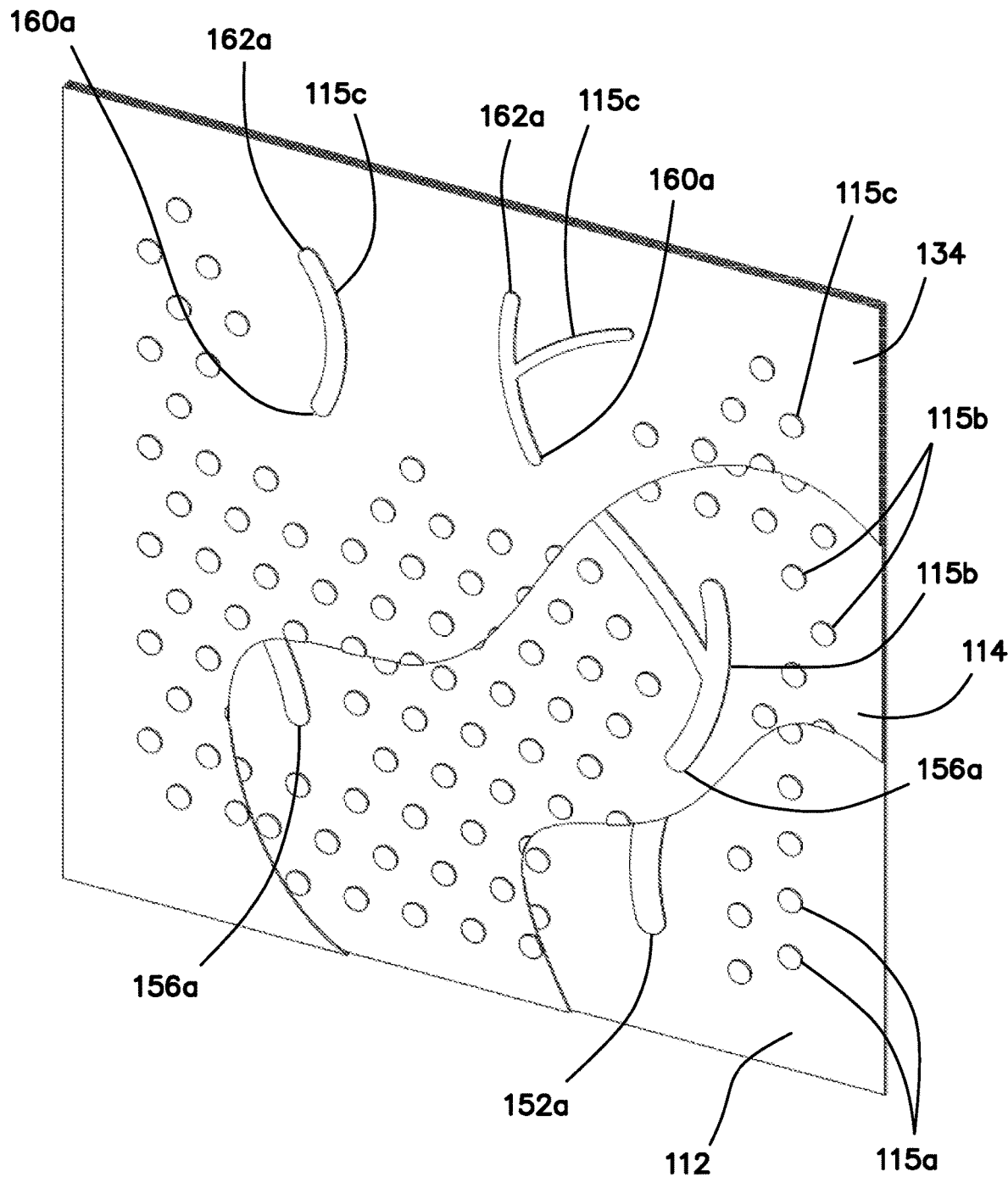
FIG. 36 is a is a top perspective, sectional view of a first base layer, a first stencil layer, second base layer, second stencil layer, third base layer, and third stencil layer according to the present invention.
Figure 37:
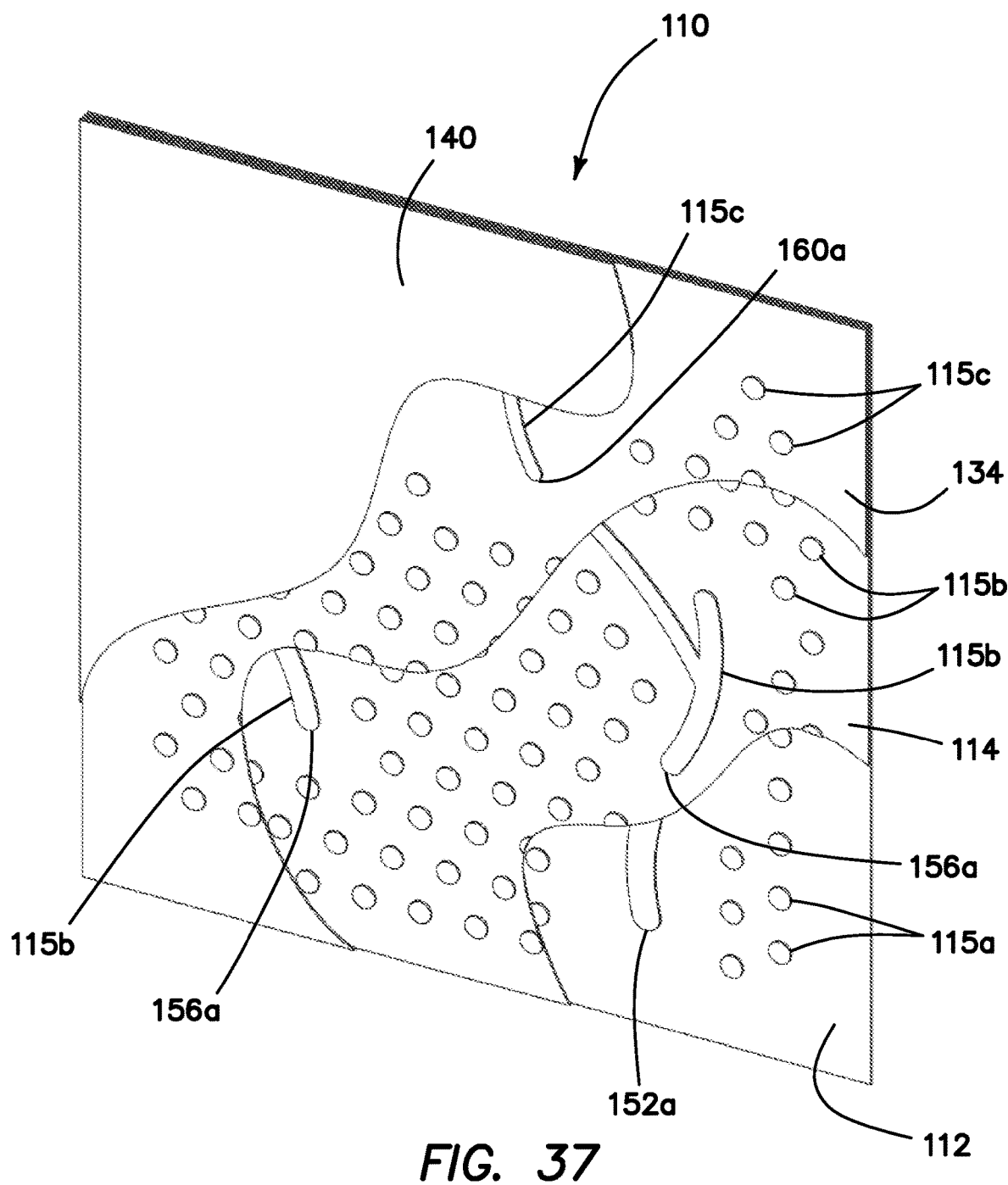
FIG. 37 is a top perspective, sectional view of a simulated tissue structure according to the present invention.
Figure 38:
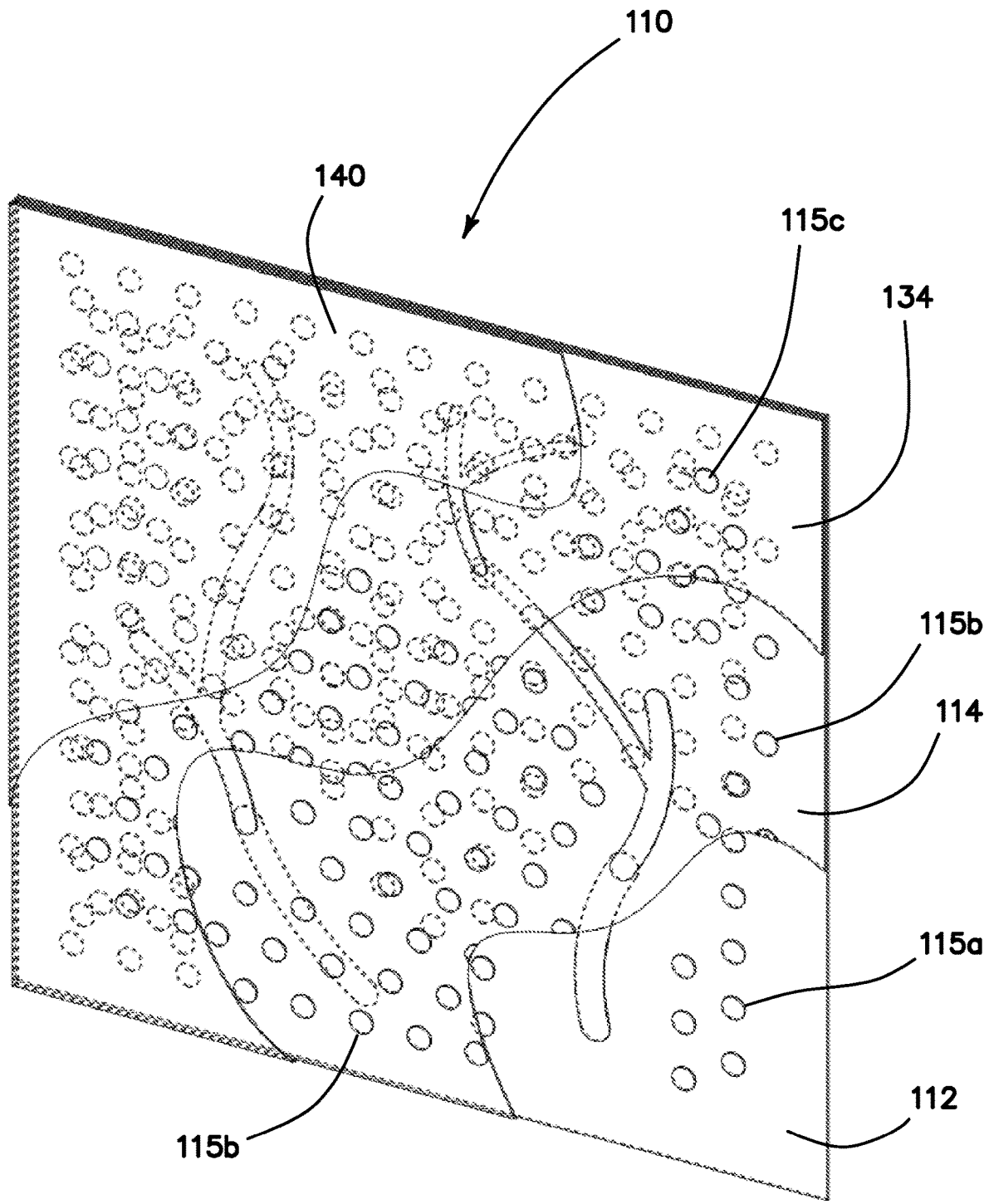
FIG. 38 is a top perspective, transparent, sectional view of a simulated tissue structure according to the present invention.
Figure 39:
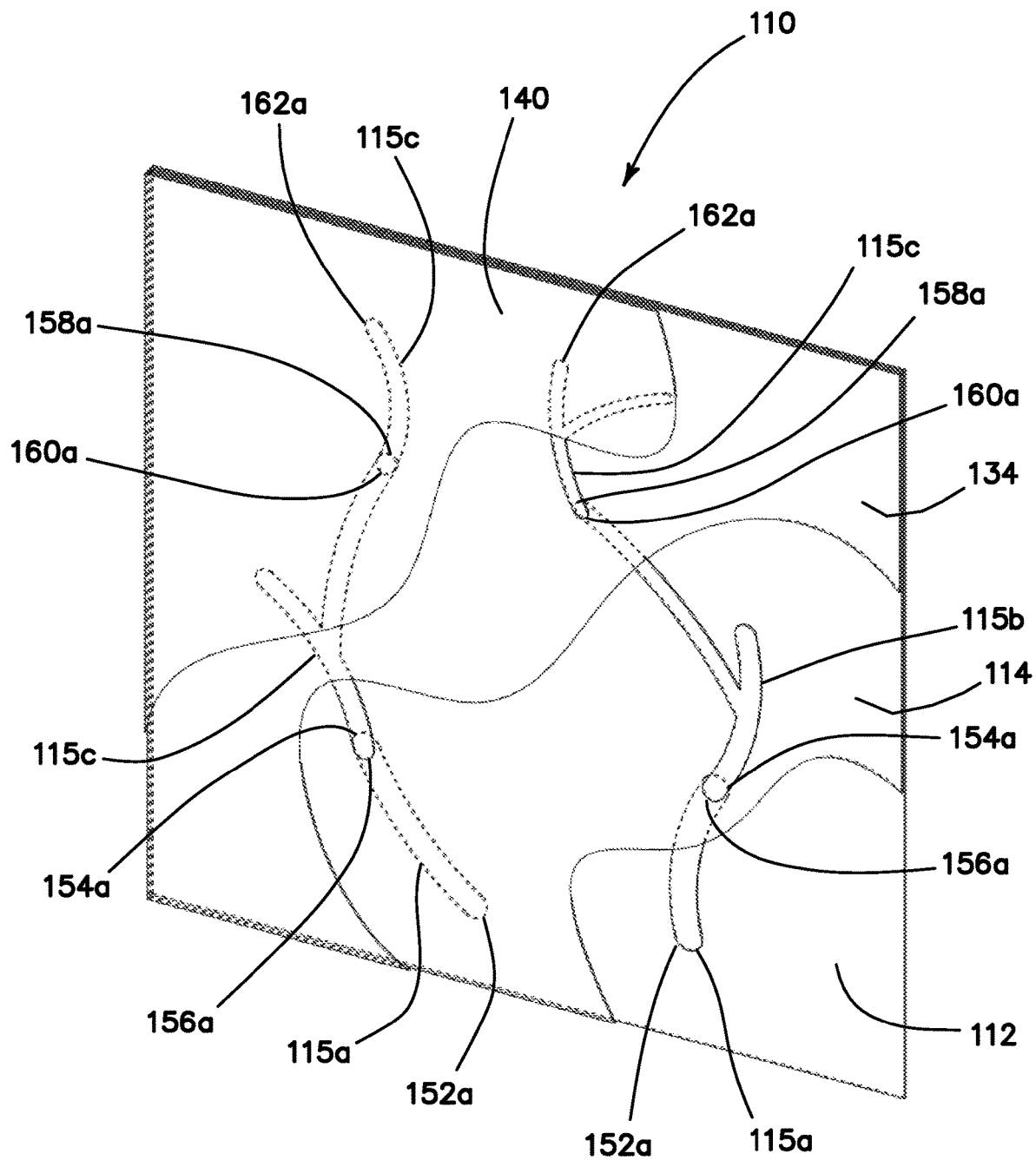
FIG. 39 is a top perspective, transparent sectional view of a simulated tissue structure according to the present invention.

Turning now to FIG. 29, there is shown another variation of a first stencil 116A in juxtaposition with a first base layer 112. The first base layer 112 is a planar sheet of silicone as described above. The first stencil 116A includes at least one hole 122. In particular, the first stencil 116A includes a first set of holes 122 comprising circular holes 122 and elongate holes 122A. Each elongate hole 122A has a first end 152 and a second end 154 defining a shape for applying a first stencil layer 115A of material such as silicone, adhesive, release, hydrogel, conductive material, fiberfill, mesh, filament or any other desired material. In FIG. 30, there is shown a first stencil layer 115A applied to the top surface of the first base layer 112. The holes 122A of the stencil 116A have formed a first stencil layer 115A having elongate structures as well as dots atop the first base layer 112 with each elongate structure having a first end 152A and a second end 154A. The simulated tissue structure is built-up with the overlay of a second base layer 114 over the first stencil layer 115A and first base layer 112 as shown in FIG. 31. The simulated tissue structure is further built-up with an application of a second stencil 116B as shown in FIG. 32. The second stencil 116B includes a plurality of holes 122. In particular, the second stencil 116B includes a first set of holes 122 comprising circular holes 122 and elongate holes 122B. Each elongate hole 122B has a first end 156 and a second end 158 defining a shape for applying a second stencil layer 115B of material such as silicone, adhesive, release, hydrogel, conductive material, fiberfill, mesh, filament or any other desired material. In FIG. 33, there is shown a second stencil layer 115B applied to the top surface of the second base layer 114. The holes 122B of the second stencil 116B have formed a second stencil layer 115B having elongate structures as well as dots atop the second base layer 114 with each elongate structure having a first end 156A and a second end 158A. FIG. 34 illustrates a third base layer 134 applied above the second stencil layer 115B and second base layer 114. FIG. 35 illustrates a third stencil 116C in juxtaposition with the construct of FIG. 34. The third stencil 116C includes a plurality of holes 122C including elongate structures each having a first end 160 and a second end 162. The third stencil 116C is placed atop the third base layer 134 to print a third stencil layer 115C as shown in FIG. 36. The third stencil layer 115C includes a plurality of dots and elongate structures, each having a first end 160A and a second end 160B. A fourth base layer 140 is then overlaid onto the third stencil layer 115C and the third base layer 134 as shown in FIG. 37 to complete the structure 110. A transparent view of the simulated tissue structure 110 in FIG. 38, shows how the plurality of dots formed by the stencil layers 115A, 115B, 115C, created a functional pattern of variable adhesion along the interfaces. Further, FIG. 38 illustrates how the plurality of printed dots of the stencil layers can produce a color pattern especially if any one or more of the base layers 112, 114, 134, 140 are transparent. The resulting unique color pattern creates a realistic view that increases the difficulty of locating anatomical features such as the elongate structures of the layers that may be representative of vasculature, arteries and ducts. The stencils 116A, 116B, 116C are configured to be used in sequential order to print anatomical structure on each base layer such that the anatomical structure not only propagates within the interface in which is printed in the X-Y plane, but also, appears to propagate in the X-Y plane of the entire simulated tissue structure when view along a Z-axis perpendicular to the X-Y plane of the simulated tissue structure as can be seen in FIG. 39. In one variation, the anatomical structure does not cross the base layers but merely overlap at their end points giving the appearance that the anatomical structure is continuous. For example, the first stencil 116A is used to print onto the first base layer 112 at least one anatomical structure that has a proximal end 152A and a distal end 154A and the second stencil 116B is used to print onto the second base layer 114 a continuation of the at least one anatomical structure by printing onto the second base layer 114 the proximal end 156A at or adjacent to or overlapping with the distal end 154A of the anatomical structure previously printed so as to give the appearance of continuity of the anatomical structure across the interfaces when viewed along the Z-axis. Further, the third stencil 116C is used to print onto the third base layer 134 a continuation of the at least one anatomical structure by printing onto the third base layer 134 the proximal end 160A at or adjacent to or overlapping with the distal end 158A of the anatomical structure previously printed to give the appearance of continuity of the anatomical structure along the Z-axis. In another variation, the base layers 114A, 134A are provided with holes in the location of the overlapping ends of the anatomical structure such that when the anatomical structure is printed, wet silicone or other material used in the printing can pour through the hole in the base layers 114A, 134A to remove the discontinuity across the Z-axis. If hydrogel material or other conductive or non-conductive material is used in the printing of the anatomical structure, a conductive/non-conductive, fluidic circuit is printed that may then be connected to a ground and a power source for simulated electro-surgery or other.

The simulated tissue structure 110 formed according to the present invention advantageously introduces functional layers that are printed with a stencil between non-functional base or support layers. In the printing of functional layers, the stencil is used to pattern the material onto the base layers and then the stencil is removed. Each functional layer may serve one or more functional purpose. Also, multiple functional layers may be printed consecutively between two adjacent base layers or different functional layers may be printed at different interface locations. As described above, a stencil layer may serve the function of providing a mechanical interaction between the two base layers. For example, the location of adhesion and/or release as well as the degree of adhesion and/or release may be provided by a functional layer printed in a particular shape, pattern to provide a locus of mechanical interaction and the type of material printed whether release/adhesive or other material provides the type or strength of the mechanical property to create the customized property for that particular interface. Areas of weak mechanical connection can be provided by printing release/resist material or the like. Areas of strong mechanical attachment between base layers can be provided by printing uncured silicone onto a base layer of cured silicone, or printing adhesive, glue and the like. Another purpose served by a functional layer is providing a pathway for electrical conductivity such as for creating a simulated tissue structure suitable for practicing electro-surgery. In such a case, a hydrogel would be printed onto a base layer via the stencil. A fluidic circuit of hydrogel may be patterned to interconnect the dots or other pattern of the functional layer and to further connect the functional layer to a ground or power source. Creating a circuit may be provided by printing a conductive material other than hydrogel that includes conductive filaments or the like to impart pathways for conductivity as well as providing non-conductive areas/pathways. Another functional purpose that the functional layer may provide is suturability. In such a case, the stencil is used to lay down silicone with mesh, fiber and the like to strengthen areas for holding sutures. Another function for the stencil layer may be dissection. For example, a polyfill material may be employed and applied via a stencil onto a dry or wet silicone base layer to embed the polyfill material between the base layers in specific locations and then an adjacent wet layer of silicone may applied to create a functional interface that is easy to dissect or separate by cutting through the polyfill fibers. The functional layer may serve to provide realistic coloring to a layer or when used in conjunction with transparent or semi-transparent base layers where the color patterns can overlap with other color functional layers to create an overall effect. Also, as described above a functional layer may be used to lay down anatomical structures between and/or across base layers. Unique shapes representative of various anatomical structures may be formed using a stencil including but not limited to for example printing the shape and color of Toldt's fascia, omentum, anatomical landmarks/structures and the like. In another variation of the present invention, the stencil is not removed from the construct but left in to become an integral piece of the simulated tissue structure. For example, the stencil may be shaped to represent an anatomical bony structure or cartilage and located between two base layers in which an adjacent base layer is applied while uncured so as to interlock with the adjacent base layer to embed the stencil. In another variation, the stencil does not represent an anatomical structure when left in but is designed and configured to impart structural rigidity to the resulting structure. In yet another variation, the stencil is not employed to apply an intermediate functional layer between two base layers, but instead, serves to merely permit the application of an adjacent uncured silicone base layer through the holes of the stencil for attachment to the adjacent base layer in select areas defined by the stencil openings.

The simulated tissue structure 110 of the present invention is particularly suited for laparoscopic procedures and may be employed with a laparoscopic trainer; however, the invention is not so limited and the simulated tissue structure 110 of the present invention can be used alone to practice first entry surgical procedures equally effectively.

It is understood that various modifications may be made to the embodiments of the artificial tissue simulations and methods of making them disclosed herein. Therefore, the above description should not be construed as limiting, but merely as exemplifications of preferred embodiments. Those skilled in the art will envision other modifications within the scope and spirit of the present disclosure.

We claim:

1. A simulated tissue structure comprising:
   a planar first base layer having a first side and a second side defining a substantially uniform thickness therebetween;
   a planar second base layer having a first side and a second side defining a substantially uniform thickness therebetween; the second side of the second base layer facing the first side of the first base layer; the second base layer being adhered to the first base layer; and
   at least one functional layer comprising a functional material located between the first base layer and the second base layer,
   wherein the functional layer is formed via a stencil having at least one hole for applying the functional material.

2. The simulated tissue structure of claim 1 wherein the functional layer comprises a material configured to increase adhesion between the first base layer and the second base layer.

3. The simulated tissue structure of claim 1 wherein the functional layer comprises a material configured to decrease adhesion between the first base layer and the second base layer.

4. The simulated tissue structure of claim 1 wherein the functional layer comprises colored silicone and one or more of the first base layer and the second base layer is transparent or partially transparent.

5. The simulated tissue structure of claim 1 wherein the functional layer comprises colored silicone in the shape of an anatomical structure.

6. A simulated tissue structure comprising:
   a planar first base layer having a first side and a second side defining a substantially uniform thickness therebetween;
   a planar second base layer having a first side and a second side defining a substantially uniform thickness therebetween; the second side of the second base layer facing the first side of the first base layer; the second base layer being adhered to the first base layer; and
   at least one functional layer comprising a functional material located between the first base layer and the second base layer, wherein:
   the functional layer is formed via a stencil having at least one hole for applying the functional material, the at least one hole comprises a plurality of holes formed into a desired pattern.

7. The simulated tissue structure of claim 1 wherein the functional material is selected from the group consisting of uncured silicone, adhesive, resist, release, polyfill, hydrogel, conductive material, mesh, and filament.

8. The simulated tissue structure of claim 1 wherein the functional material is configured to provide customized mechanical properties at an interface between the first base layer and the second base layer.

9. The simulated tissue structure of claim 1 wherein the at least one functional layer is configured to provide a locus of mechanical interaction between the first and second base layers.

10. The simulated tissue structure of claim 9 wherein the locus of mechanical interaction is provided using a specific pattern for adhesion or release.

11. The simulated tissue structure of claim 6 wherein the functional layer comprises a material configured to increase or decrease adhesion between the first base layer and the second base layer.

12. The simulated tissue structure of claim 6 wherein the functional material is selected from the group consisting of uncured silicone, adhesive, resist, release, polyfill, hydrogel, conductive material, mesh, and filament.

13. The simulated tissue structure of claim 6 wherein the functional material is configured to provide customized mechanical properties at an interface between the first base layer and the second base layer.

14. The simulated tissue structure of claim 6 wherein the at least one functional layer is configured to provide a locus of mechanical interaction between the first and second base layers.

15. The simulated tissue structure of claim 14 wherein the locus of mechanical interaction is provided using a specific pattern for adhesion or release.

16. A method of making a simulated tissue structure comprising the steps of:
    providing a planar first base layer;
    providing a first stencil having at least one hole;
    applying the first stencil onto the first base layer;
    applying a first stencil layer onto the first base layer via the first stencil;
    removing the first stencil;
    providing a planar second base layer;
    applying a second base layer over the stencil layer and first base layer; and
    adhering the second base layer to the first base layer.

17. The method of claim 16 wherein the step of applying a stencil layer includes the step of applying a material selected from the group consisting of uncured silicone, adhesive, resist, release, polyfill, hydrogel, conductive material, mesh, and filament.

18. The method of claim 16 wherein the step of applying a second base layer includes applying uncured silicone and further including the step of curing the silicone.

19. The method of claim 16 further including the steps of:
    providing a second stencil having at least one hole;
    applying the second stencil over the first stencil layer and first base layer; and
    applying a second stencil layer onto the first base layer and/or the first stencil layer via the second stencil.

20. A simulated tissue structure produced by the method of claim 16.

* * * * *